US012793314B2

(12) United States Patent
Zarkesh et al.

(10) Patent No.: US 12,793,314 B2
(45) Date of Patent: Nov. 10, 2026

(54) SYSTEMS AND METHODS FOR VIDEO GENERATION VIA LANGUAGE-BASED THREE-DIMENSIONAL INTERACTIVE ENVIRONMENT CONSTRUCTION

(71) Applicant: Polyup Inc., Saratoga, CA (US)

(72) Inventors: Amir Masoud Zarkesh, Saratoga, CA (US); Kamran Elahian, Los Altos, CA (US); Arash Keshmirian, Martinez, CA (US); Alex Zakharenkov, Davis, CA (US); Zohre Elahian, Los Altos, CA (US); Johnathan Valencia, Fort Lauderdale, FL (US)

(73) Assignee: Polyup Inc., Saratoga, CA (US)

( * ) Notice: Subject to any disclaimer, the term of this patent is extended or adjusted under 35 U.S.C. 154(b) by 108 days.

(21) Appl. No.: 19/010,835

(22) Filed: Jan. 6, 2025

(65) Prior Publication Data

US 2025/0218096 A1 Jul. 3, 2025

Related U.S. Application Data

(63) Continuation-in-part of application No. 18/779,392, filed on Jul. 22, 2024, now Pat. No. 12,229,913, which is a continuation-in-part of application No. 18/364,866, filed on Aug. 3, 2023, now abandoned.

(60) Provisional application No. 63/582,927, filed on Sep. 15, 2023, provisional application No. 63/515,023, filed on Jul. 21, 2023.

(51) Int. Cl.
*G06T 13/40* (2011.01)
*G06T 15/00* (2011.01)

(52) U.S. Cl.
CPC ............ *G06T 13/40* (2013.01); *G06T 15/005* (2013.01)

(58) Field of Classification Search
None
See application file for complete search history.

(56) References Cited

U.S. PATENT DOCUMENTS

2007/0146360 A1 6/2007 Clatworthy et al.
2019/0107927 A1 4/2019 Schriber et al.
(Continued)

FOREIGN PATENT DOCUMENTS

WO 2022087186 A1 4/2022

OTHER PUBLICATIONS

U.S. Appl. No. 18/779,392, Notice of Allowance mailed Oct. 4, 2024, 13 pgs.
(Continued)

*Primary Examiner* — David H Chu
(74) *Attorney, Agent, or Firm* — Polygon IP, LLP

(57) ABSTRACT

A computing system may include a communication interface configured to receive from a first client machine a natural language description of a three-dimensional environment. A path embedding generator may determine a path language representation of a three-dimensional virtual environment based on the natural language description and via a large language model interface. The path language representation may be generated in accordance with a path language definition and may include one or more entities to include within the three-dimensional virtual environment. The path language representation may include a script governing behavior of the one or more entities and including one or more events. A video may be rendered based on the path representation.

20 Claims, 34 Drawing Sheets

(56) References Cited

U.S. PATENT DOCUMENTS

| | | | |
|---|---|---|---|
| 2020/0193718 A1 | 6/2020 | Schriber et al. |
| 2024/0177426 A1 | 5/2024 | Ullal et al. |

OTHER PUBLICATIONS

Arora, Saurabh, and Prashant Doshi. "A survey of inverse reinforcement learning: Challenges, methods and progress." Artificial Intelligence 297 (2021): 103500.

Cavazza, Marc, Srikanth Bandi, and Ian Palmer. "Situated AI in video games: Integrating NLP, path planning, and 3D animation." AAAI 1999 Spring Symposium on Artificial Intelligence and Computer Games. 1999. (Year: 1999).

International Application Serial No. PCT/US24/38959, Search Report and written Opinion mailed Oct. 10, 2024, 11 pgs.

Kovalev, Aleksei Konstantinovich, and Aleksandr Igorevich Panov. "Application of pretrained large language models in embodied artificial intelligence." Doklady Mathematics. vol. 106. No. Suppl 1. Moscow: Pleiades Publishing, 2022.

Magnenat-Thalmann, N., et al., "Human body deformations using joint-dependent local operators and finite element theory," Making Them Move: Mechanics, Control, and Animation of Articulated Figures, 1991.

Sarkisyan, Christina, et al. "Evaluation of Pretrained Large Language Models in Embodied Planning Tasks." International Conference on Artificial General Intelligence. Cham: Springer Nature Switzerland, 2023.

Theodorou, Evangelos, Jonas Buchli, and Stefan Schaal. "A generalized path integral control approach to reinforcement learning." The Journal of Machine Learning Research 11 (2010): 3137-3181.

Ullrich, Sebastian, Helmut Prendinger, and Mitsuru Ishizuka. "MPML3D: Agent authoring language for virtual worlds." Proceedings of the 2008 International Conference on Advances in Computer Entertainment Technology. 2008. (Year: 2008).

1600

SYSTEMS AND METHODS FOR VIDEO GENERATION VIA LANGUAGE-BASED THREE-DIMENSIONAL INTERACTIVE ENVIRONMENT CONSTRUCTION

CROSS-REFERENCE TO RELATED APPLICATIONS

This application claims priority to U.S. patent application Ser. No. 18/779,392 by Zarkesh, titled "Systems and Methods for Language-Based Three-Dimensional Interactive Environment Construction and Interaction", filed Jul. 22, 2024, which claims priority to U.S. Provisional Patent Application 63/582,927 by Zarkesh, titled "Enhancing Interactions and Task management for Avatars Using Feynman Path Integrals, Path Language, Large Language Models, and Cross-Environment History", filed Sep. 15, 2023, and to U.S. patent application Ser. No. 18/364,866 by Zarkesh, titled "Avatar Interaction and Task Management Using Path Language and Large Language Models", filed Aug. 3, 3023, which claims priority to U.S. Provisional Patent Application 63/515,023 by Zarkesh, titled "Avatar Interaction and Task Management Using Path Language and Large Language Models", filed on Jul. 21, 2023, all of which are incorporated herein by reference in their entirety and for all purposes.

FIELD OF TECHNOLOGY

This patent application relates generally to artificial intelligence and machine learning, and more specifically to the use of artificial intelligence and machine learning to construct and facilitate interactions with virtual environments.

BACKGROUND

Artificial intelligence systems are increasingly sophisticated. However, many recent advances in artificial intelligence systems are adapted to specific contexts, such as language, image data, and structured data. Despite recent advances, artificial intelligence and reinforcement techniques for less structured contexts are limited. Conventional artificial intelligence and reinforcement learning techniques for agents (e.g., robots) navigating three-dimensional environments are typically inaccurate, highly specific, and cumbersome to deploy. Similarly, conventional artificial intelligence and reinforcement learning techniques do not support generating interactive virtual environments that can be populated and navigated by autonomous agents, avatars, and other entities. Accordingly, what is needed are improved techniques for artificial intelligence and reinforcement learning that are applicable to developing and navigating virtual environments.

SUMMARY

Techniques and mechanisms described herein include computing systems, methods, and non-transitory computer readable media having instructions stored thereon for providing an interactive three-dimensional virtual environment. In some embodiments, a communication interface may be configured to receive from a first client machine a natural language description of a three-dimensional environment. A path embedding generator may be configured to determine a path language representation of a three-dimensional virtual environment based on the natural language description and via a large language model interface. The path language representation may be generated in accordance with a path language definition. The path language representation may include one or more entities to include within the three-dimensional virtual environment. The path language representation may include a script governing behavior of the one or more entities. The script may include one or more events. An event of the one or more events may correspond to a verb object within the path language definition. An entity of the one or more entities may correspond to an entity object within the path language definition. A video engine configured to determine a video of the three-dimensional virtual environment based on the path language representation of the three-dimensional virtual environment. A storage system may be configured to store configuration information for the three-dimensional virtual environment and to provide the video for transmission to and presentation at a second client machine via the Internet upon request.

In some embodiments, the path embedding generator includes an agentic pipeline that includes a plurality of generative language model agents. Aach of the plurality of generative language model agents may be configured to generate natural language output text based on natural language input text.

In some embodiments, an agent of the plurality of generative language model agents includes an agent prompt. The agent prompt may include a plurality of text portions corresponding to a plurality of named components within a normal form agentic AI data model. The normal form agentic AI data model may include a plurality of references to and between the plurality of named components.

In some embodiments, the path embedding generator includes one or more generative language model meta agents. One or more of the plurality of generative language model agents are updated by executing the one or more generative language model meta agents. In some embodiments, updating one or more of the plurality of generative language model agents may involve updating one or more of the plurality of text portions.

In some implementations, the natural language description includes one or more emoji. An emoji of the one or more emoji may corresponds with the entity, with the entity being determined by a generative language model based on the emoji.

In some embodiments, the natural language description includes one or more emoji. An emoji of the one or more emoji corresponds with the verb. The verb is determined by a generative language model based on the emoji.

In some embodiments, the path embedding generator includes an agentic pipeline that includes a plurality of generative language model agents. Each of the plurality of generative language model agents may be configured to generate natural language output text based on natural language input text.

In some embodiments, an emoji of the one or more emoji corresponds with a modifier within the path language definition. The path language representation includes the modifier.

In some embodiments, the verb may be associated with a three-dimensional rigid movement through space. Presentation of the three-dimensional virtual environment at the second client machine may include movement of the entity through the three-dimensional virtual environment in a manner corresponding with the three-dimensional rigid movement through space.

In some embodiments, the natural language description may include an entity description portion describing the entity. The path embedding generator may be configured to search an entity database to identify the entity based on the entity description portion. The animation rig includes a plurality of joints and a plurality of regions connecting the joints. The verb may be associated with an animation definition defining an animation based on movement of the plurality of joints. Presentation of the three-dimensional virtual environment at the second client machine may include animation of the entity in accordance with the animation definition.

In some embodiments, the animation rig may be specific to the entity. Alternatively, or additionally, the animation rig may be a default animation rig that is scaled to a size corresponding with the three-dimensional model of the entity.

In some embodiments, the natural language description may include a verb description portion describing the verb. The path embedding generator may search a verb database to identify the verb based on the verb description portion.

In some implementations, the three-dimensional virtual environment may include a background setting providing a visual representation of a background region of the three-dimensional virtual environment.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, methods, and computer program products for three-dimensional environment construction and interaction. These drawings in no way limit any changes in form and detail that may be made by one skilled in the art without departing from the spirit and scope of the disclosed implementations.

DETAILED DESCRIPTION

1. Introduction

Figure 1:
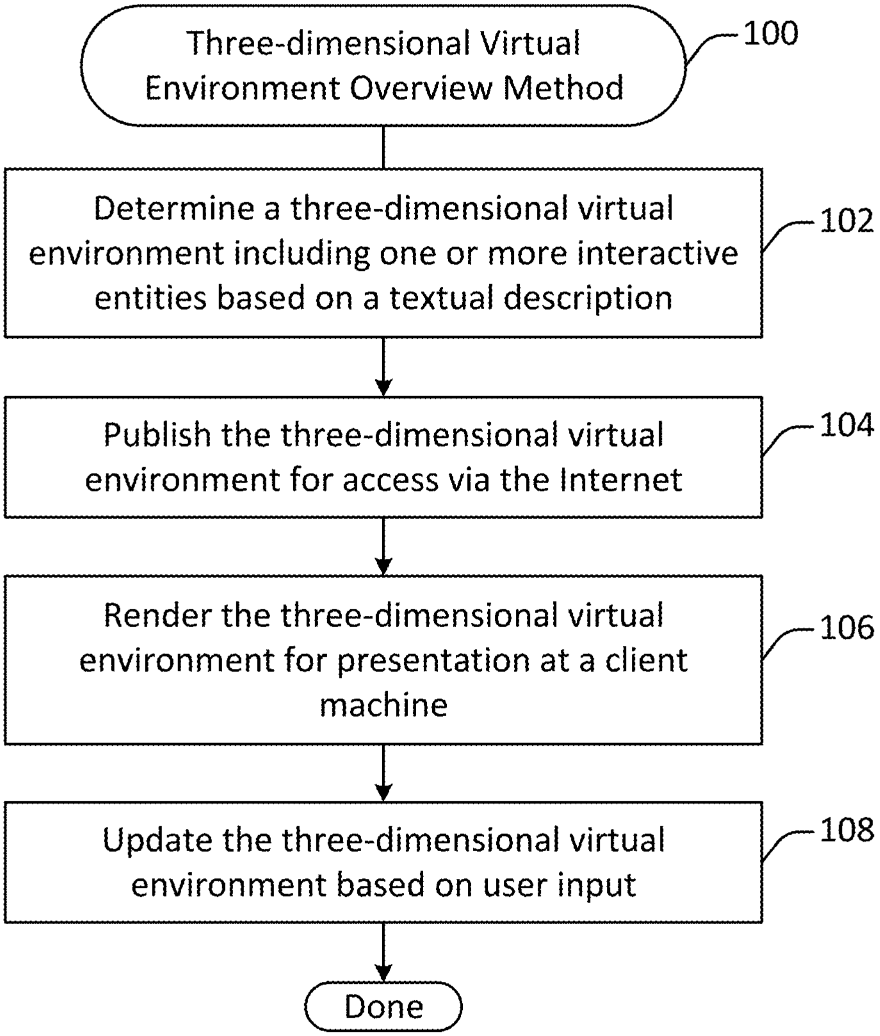
FIG. 1 illustrates an overview method for providing a three-dimensional virtual environment, performed in accordance with one or more embodiments.

Techniques and mechanisms described herein provide for the generation and presentation of interactive three-dimensional virtual environments, which are also referred to herein as MODs. An interactive three-dimensional virtual environment may include a virtual representation of a three-dimensional environment. The three-dimensional virtual environment may be populated by entities, such as avatars, animals, plants, objects, and the like. Some or all of these entities may be animated.

According to various embodiments, configuration information for presenting a three-dimensional virtual environment may be generated at least in part by a large language model based at least in part on user input, such as natural language. Some or all of the configuration information may be represented in a path large language model that serves as an embedding of the concepts for presenting the three-dimensional virtual environment.

According to various embodiments, the natural language input, which may include elements such as nouns, verbs, emoji, adjective, adverbs, and more may be used to generate one or more path large language model embeddings. For instance, a three-dimensional virtual environment may include a background setting, one or more entities, and a script governing actions that are performed by or on the entities within the environment when one or more triggering conditions are satisfied.

According to various embodiments, information for generating the three-dimensional virtual environment may then be provided to a client machine via the Internet. A user at the client machine may interact with the three-dimensional virtual environment, for instance via user input provided as text, voice, and/or touch. The three-dimensional virtual environment may then be updated at the client machine based on the input and in accordance with the configuration information.

Consider a user that would like to create an interactive three-dimensional virtual environment. Conventional approaches to creating an interactive three-dimensional virtual environment such as a game, simulation, or other such virtual environment involve complex tools such as game development studios, programming environments, and the like, which typically require specialized skills and experience to use effectively. Moreover, the use of such tools requires considerable time.

In contrast, techniques and mechanisms described herein provide for the creation of an interactive three-dimensional virtual environment based on user input provided in natural language, which may include voice input or text input. For instance, a user may simply describe one or more elements of a three-dimensional virtual environment, and the system may create the three-dimensional virtual environment automatically based on the input. For example, the user may describe the environment, one or more entities to be included within the environment, one or more actions or behaviors associated with the entities, one or more interactions between the entities, one or more interactions between the entities and the environment, or the like. Some such information may be provided at least in part using emojis, which may facilitate more nuanced characterization of the environment, the entities within the environment, and/or the actions performed by or on the entities.

Techniques and mechanisms described herein are directed toward utilizing a Path Large Language Model (PLLM) for tracking or managing the interactions of an avatar within an environment. This Path Language describes how an avatar interacts with various components within an embodied environment and how it is controlled, for instance by a human. Such techniques and mechanisms have a broad range of applications in complex task management, robotics, metaverses, video game playing, video game designing, and other tasks that require high-level interaction of an avatar within an embodied environment.

In some embodiments, a base or foundational Large Language Model (LLM) is fine-tuned to learn a new Path Language. Alternatively, a Path Language definition may be provided to an LLM in an input prompt, potentially along with one or more examples illustrating the usage of the Path Language. Regardless of the approach, the resulting model, which includes both the base or foundational LLM along with one or more elements associated with tuning the base or foundational LLM (e.g., one or more additional weights, hyperparameters, neural networks, etc.) and/or with definitions and examples for the Path Language within an input prompt, is referred to herein as a PLLM.

Artificial intelligence (AI) and machine learning (ML) technologies have advanced significantly over recent years, impacting diverse fields like natural language processing, image recognition, and game theory. Of particular interest are Large Language Models (LLMs) like GPT-4, which are capable of generating human-like text, understanding context, and responding to prompts intelligently. While these models offer impressive capabilities, their application to avatars has been relatively unexplored.

Existing models such as VOYAGER introduced the concept of LLM-powered embodied lifelong learning avatars, able to explore virtual environments like Minecraft continuously, developing skills and making consistent discoveries without human intervention. While these technologies marked significant strides in AI exploration and autonomy, their design has several limitations. For instance, their learning and operation heavily depend on predefined tasks or objectives, potentially limiting the avatar's capacity for creativity and unstructured learning. Furthermore, these technologies do not incorporate player or user interactions at a deep linguistic level, missing out on a rich dimension of environmental interaction and experience.

More recent AI technologies have explored the concept of reinforcement learning with reward functions to incentivize certain outcomes or behaviors. However, traditional approaches typically focus on simple, atomic actions and often struggle with complex tasks that involve many steps or high-level reasoning.

In contrast to conventional techniques, various embodiments of techniques and mechanisms described herein provide for sophisticated and capable avatars, which can learn from past experiences, predict future scenarios, and continually improve their interactions with their environment. Such techniques and mechanisms are applicable in a variety of contexts, including robotic automation, assistive technologies, and video game design and development. In these technical domains, the ability of an AI avatar that runs autonomously or is controlled by a user to learn and adapt to complex tasks, understand player or user interactions, and generate new environments or tasks can significantly improve the system's performance, versatility, and user experience.

In some embodiments, avatar-environment interaction tracking and task management may be performed via a Path Large Language Model (PLLM). The path language describes how an avatar interacts with different elements in an embodied environment as it is controlled by an external actor or acts autonomously. By utilizing the Feynman Path Integral concept, PLLM calculates the probability of successful paths or subpaths based on multiple observed paths. This formulation enhances the avatar's ability to understand and navigate complex, multi-step tasks, expanding its capabilities beyond existing models.

Techniques and mechanisms described herein refer to avatars. The term "avatar" refers to a virtual or physical entity under autonomous or external control. The avatar may be located within an embodied environment. The term "embodied environment" may refer to a physical or virtual environment.

In some environments, an "avatar" may not actually appear within an embodied environment. Instead, control may be achieved by, for instance, the user tapping, swiping, clicking, typing, conversing, controlling physical objects, or otherwise providing user input to interact with the embodied environment. In such configurations, the term “avatar” may refer, for instance, to the user’s perspective of the embodied environment.

In some embodiments, an embodied environment may be a model of a physical environment. For instance, in a robotics context, one or more sensors may be used to construct a simulated model of a physical environment. Then, a model of a robot may be positioned within the simulated model. This embodied environment may be used to perform operations such as predicting the actions and behavior of entities within the physical environment, determining instructions (e.g., for movement) to provide to the robot, predicting the consequences of such instructions, and the like.

In some embodiments, an embodied environment may be an entirely virtual environment. For example, in a metaverse, avatars of humans may navigate a virtual environment and interact with other avatars and/or other aspects of the virtual environment based on user input. As another example, in a game, a human player may provide user input to control the actions of a virtual avatar within a virtual game environment.

For the purpose of exposition, consider the example of a virtual environment in the context of a game. In a game-playing scenario, a period of gameplay consists of a sequence of interactions that the avatar has with the environment. This sequence of interactions may be modeled as a path through the virtual environment, starting with a certain part of the environment and ending with a different part of the environment. The end point may be, for example, a goal, a failure condition, or some other terminating condition. The path may be determined based on user input.

As another example, consider a robot attempting to navigate a physical space to perform a task or complete an objective. To aid in instructing the robot, the robot and the physical space may be modeled as an avatar navigating a virtual space. In this context, a period of time may be modeled as a sequence of interactions that the avatar has with the virtual space. As with gameplay, this sequence of interactions may be modeled as a path through the virtual environment, starting with a certain part of the environment and ending with a different part of the environment. The end point may be, for example, the completion or failure of the task or objective.

According to various embodiments, the PLLM may employ a technique such as the Feynman path integral concept to compute the probability of paths or subpaths through an embodied environment. For instance, data may be gathered from multiple observed paths. Observed paths may be identified as successful paths or failed paths, or may be categorized or labeled in some other way. The avatar may not only move through the embodied environment, but may also interact with the environment. Accordingly, techniques and mechanisms described herein may be applicable to a wide range of applications, such as robotics and gaming, that feature high-interaction embodied environments.

Techniques and mechanisms described herein have a wide range of applications, for instance in the gaming and robotics industries. In some embodiments, for instance in the field of robotics, the PLLM may be employed to direct operations across various sectors, such as manufacturing, healthcare, and logistics. By learning from previous robotic operations and continuously adjusting decisions, the PLLM enhances efficiency and effectiveness in complex robotic tasks, contributing to improved outcomes and optimized processes.

In some embodiments, for instance in the gaming domain, the PLLM may be used to dynamically generate unique experiences based on previous interactions, adjusting the avatar’s actions to maximize success, engagement, retention, or other desirable characteristics. For example, as more data is gathered, the game paths become richer and more informative, enabling game developers to gain insights into player behavior patterns, optimize game design, and create more immersive and engaging experiences. As another example, designers can interact with the PLLM, receiving valuable assistance in creating new games or modifying existing ones. For instance, the PLLM can generate new paths and interactions based on feedback and suggestions from designers, facilitating collaborative and iterative game development processes.

According to various embodiments, techniques and mechanisms described herein may be used in conjunction with any of a variety of LLM architectures, providing for enhanced versatility and adaptability of the system. By working with a wide range of LLM architectures, the PLLM can leverage the advancements and specific capabilities of different models, enhancing its overall performance and expanding its potential applications beyond gaming and robotics. This versatility enables various embodiments of techniques and mechanisms to be utilized in fields such as simulation and prediction models, risk assessment, autonomous vehicle navigation, and complex system management.

According to various embodiments, the PLLM may be constructed based not only on natural language, but also based on emoji. An emoji is a small digital image or icon used to express an idea, an emotion, an action, or some other concept. Emoji may be used to provide additional nuance in the definition of elements within the PLLM. For example, the word “happy” may encompass a range of gradations, whereas the Unicode includes many different emoji expressing various types and gradations of the emotion “happiness”.

According to various embodiments, an emoji may be used to define one or more elements of a PLLM. For instance, a verb, a noun, an adjective, an emotion, or an adverb may each be expressed as an emoji. As one example, an emoji may be used to identify an entity (i.e., a noun). Footballs, cats, and grapes are all examples of emojis corresponding to nouns.

As another example, an emoji may be used to identify an action (i.e., a verb). Swimming, running, jumping, and dancing are all examples of emojis corresponding to actions. As yet another example, an emoji may be used to identify an adjective or an adverb. Happy, sad, and angry are all examples of emoji that may be used to modify a noun or a verb.

FIG. 1 illustrates an overview method 100 for providing a three-dimensional virtual environment, performed in accordance with one or more embodiments. The method 100 may be performed at any suitable computing system, such as a server system configured to construct the three-dimensional virtual environment based on interactions from a client machine and/or serve the three-dimensional virtual environment to a client machine via the Internet. An example of such a system is discussed with respect to Section 2.

A three-dimensional virtual environment including one or more interactive entities is determined at 102 based on a textual description. In some embodiments, the textual description may be provided via an interactive messaging interface. For instance, the textual description may be provided via an SMS message, an email message, a chat interface within a dedicated mobile application, a chat interface within a web application, or any other suitable mechanism for sending text-based messages.

According to various embodiments, the textual description may characterize the environment that is to be created. For instance, the textual description may describe the environment itself, one or more entities to include within the environment, one or more properties or characteristics of the entities, one or more interactions between the entities, one or more interactions between an entity and the environment, and/or any other attributes of the three-dimensional virtual environment.

In some embodiments, the three-dimensional virtual environment may be created based in part on additional information beyond the textual description. For example, a user may select, or the system may determine, a background environment in which to situate the entity or entities. As another example, a user may provide feedback, such as via a graphical user interface, to edit a three-dimensional virtual environment created by the system. Additional details regarding the configuration of a three-dimensional virtual environment are discussed throughout the application, for instance in Section 3.

The three-dimensional virtual environment is published for access via the Internet at 104. In some embodiments, publishing the three-dimensional virtual environment may involve any of various interactions for making the three-dimensional virtual environment accessible. For instance, the three-dimensional virtual environment may be stored in a manner accessible to a web server and addressable via a uniform resource locator (URL).

The three-dimensional virtual environment is rendered at 106 for presentation at a client machine. In some embodiments, rendering the three-dimensional virtual environment may involve transmitting one or more instructions from the server system to the client machine, for instance in response to a request by the client machine to access the three-dimensional virtual environment. The client machine may then execute the instructions to generate the three-dimensional virtual environment at the client machine. Additional details regarding a process for rendering a three-dimensional virtual environment at a client machine are discussed throughout the application, for instance in Section 4.

The three-dimensional virtual environment is updated at 108 based on user input. According to various embodiments, the user may interact with the three-dimensional virtual environment via touch input, voice input, text input, and/or any other process or mechanism for providing user input. Additional details regarding a process for animating entities within the three-dimensional virtual environment as well as updating a three-dimensional virtual environment based on user input are discussed throughout the application, for instance with respect to Section 4.

2. System Architecture

Figure 2:
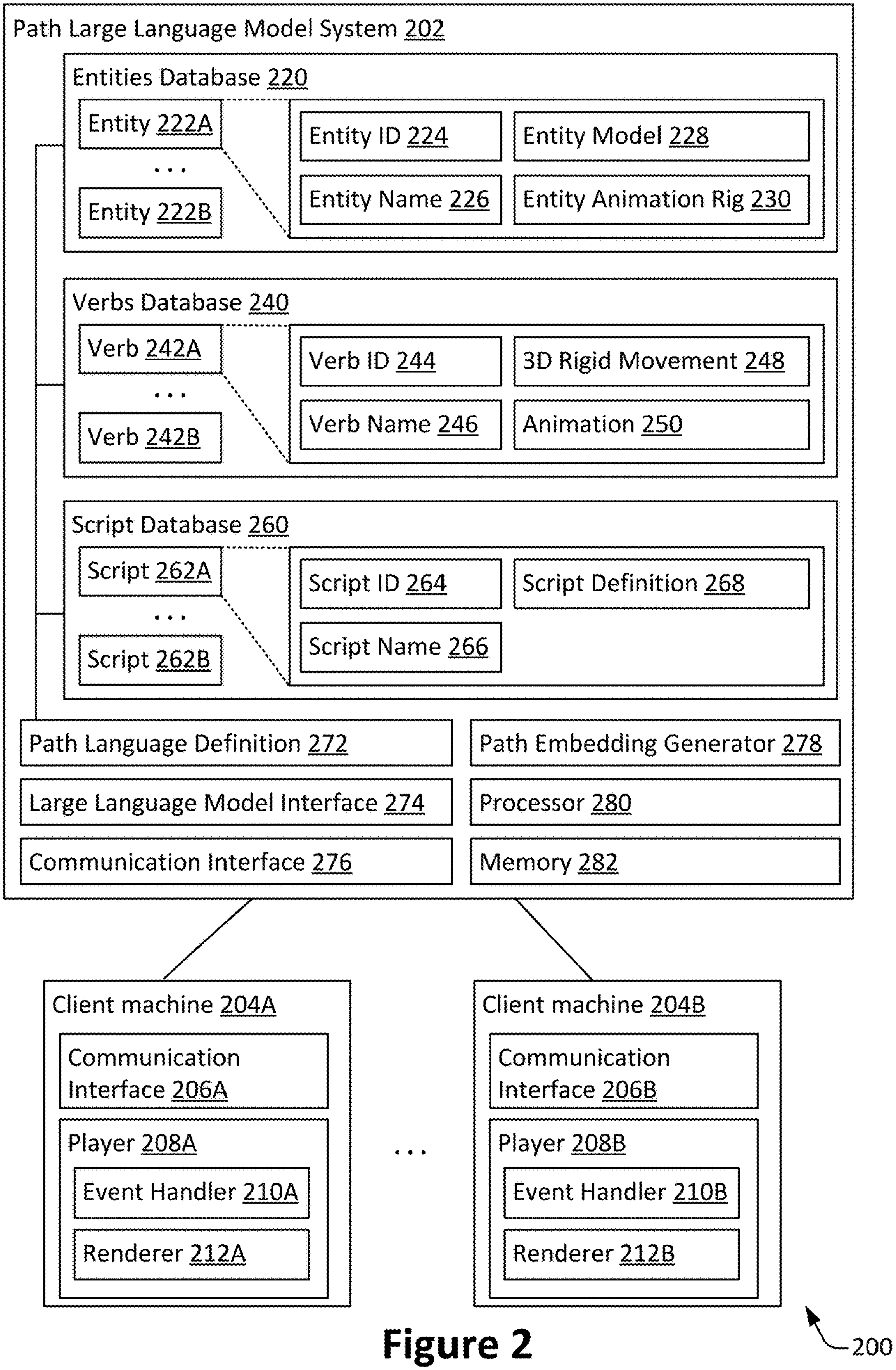
FIG. 2 illustrates a path large language model ecosystem, configured in accordance with one or more embodiments.

FIG. 2 illustrates a path large language model ecosystem 200, generated in accordance with one or more embodiments. The path large language model ecosystem 200 includes a path large language model system 202 in communication with one or more client machines 204A through 204B. The client machines include a client communication interface (206A, 206B) and a player (208A, 208B), which includes an event handler (210A, 210B) and a renderer 212B. The path large language model system 202 includes a path language definition 272, a large language model interface 274, a communication interface 276, a path embedding generator 278, a processor 280, and memory 282. The path language definition 272 may build upon entities and verbs stored in an entities database 220 and a verbs database 240. The entities database 220 includes entity database entries 222A through 222B. An entity database entry includes an entity ID 224, an entity name 226, an entity model 228, and an entity animation rig 230. The verbs database 240 includes verb database entries 242A through 242B. A verb database entry includes a verb ID 244, a verb name 246, a 3D rigid movement 248, and optionally an animation 250. The path language definition 272 may define a three-dimensional virtual environment using a script and store the script in a script database 260. The script database 260 may include script database entry 262A through 262B. A script database entry may include a script ID 264, a script name 266, and a script definition 268.

According to various embodiments, a client machine 204A may be any computing device capable of communicating with the path large language model system 202 via the Internet. For example, the one or more client machines 204A may be a mobile phone, a desktop computer, a tablet, a laptop computer, or any other suitable computing device. The one or more client machines 204A may communicate with the path large language model system 202 via the communication interface 206A.

In some embodiments, a client machine 204A may use a player 208A to present a three-dimensional virtual environment. Presenting a three-dimensional virtual environment may include operations such as rendering elements of the three-dimensional virtual environment for presentation on a display screen at the client machine, receiving user input, and updating the three-dimensional virtual environment based on the user input.

According to various embodiments, the client machine 204A may be configured to receive user input in any of various ways. For instance, the client machine 204A may receive user input via text, voice, and/or touch screen input. In some configurations, more than one type of user input may be employed in combination.

According to various embodiments, user input may be received at the client machine 204A to configure and/or interact with a three-dimensional virtual environment. For example, to present a three-dimensional virtual environment, the communication interface 206A may receive a script definition and supporting elements such as one or more three-dimensional model files, image files, audio files, and/or other media from the path large language model system 202. The renderer 212A may then render the three-dimensional virtual environment based on the script definition. User input may be processed via the event handler 210A to determine one or more instructions for updating the three-dimensional virtual environment. A visual and/or audio presentation of the three-dimensional virtual environment may then be updated by the renderer 212A based on the one or more instructions.

According to various embodiments, the player 208A may be configured to execute a script defined based on the path large language model in conjunction with user input received at the client machine to update the presentation of the three-dimensional virtual environment. For instance, an initialized three-dimensional virtual environment may include some number of entities positioned within, and potentially performing actions within, the three-dimensional virtual environment. The user may then provide user input to affect the three-dimensional virtual environment. The event handler 210A may process the user input to update the state of the three-dimensional virtual environment as well as evaluate the state of the three-dimensional virtual environment to determine whether an event defined in the script has occurred. When an event has occurred, the state of the three-dimensional virtual environment may be further updated. The updated state of the three-dimensional virtual environment may then be provided to the renderer 212A for updating the presentation of the three-dimensional virtual environment on a display device at the client machine.

According to various embodiments, the client machine 204A may include one or more components omitted from FIG. 2 for brevity. For example, the client machine 204A may include one or more processors, memory modules, communication busses, user input devices, display screens, speakers, and/or other components. Additional details regarding such components are discussed with respect to the computing device shown in FIG. 3.

According to various embodiments, the path large language model system 202 may be implemented on any of various combinations of computing hardware. For instance, the path large language model system 202 may be implemented on one or more computing devices in a cloud computing system.

In some embodiments, the path large language model system 202 may communicate with a client machine via the communication interface 276. For instance, the path large language model system 202 may interact with a client machine to generate a three-dimensional virtual environment and/or present a three-dimensional virtual environment at the client machine. Such operations may be performed via one or more processors 280 and one or more memory modules 282.

According to various embodiments, the path embedding generator 278 may generate scripts and/or path language embeddings based on user input. For instance, the path embedding generator may receive user input such as text, video, and/or voice via the communication interface 276, and generate a script that reflects the user input. The script may be generated in accordance with the path language definition 272, which may facilitate the presentation of a three-dimensional virtual environment.

The path language definition 272 may be used to specify a script for presenting a three-dimensional virtual environment. A script may be stored as an entry in the script database 260. Such an entry may include a script name 266 that characterizes the script and a unique script ID 264 for accessing the script entry in the script database 260. The script database entry may also include a script definition 268.

According to various embodiments, a script definition 268 may define a three-dimensional virtual environment in a manner consistent with the path language. A script may be stored as a JSON object or any other structured data object.

According to various embodiments, a script definition 268 may include configuration information for presenting the three-dimensional virtual environment. For example, a script definition may specify a background setting for the three-dimensional virtual environment. As another example, a script definition may specify three-dimensional virtual environment setup information such as initial locations and poses for entities within the background setting. As yet another example, a script definition may include one or more events for updating the three-dimensional virtual environment.

According to various embodiments, an event included within a script may specify any of various elements. For example, an event may specify a triggering condition for triggering the event. As another example, an event may specify an action that occurs when the event is triggered. As yet another example, an event may specify one or more actors to whom the action happens.

According to various embodiments, one or more elements within a script, such as an event, may be specified in terms of entities, verbs, adjectives, adverbs, and/or other elements within a path language definition. For example, an actor may be specified based on an entity ID 224A identifying an entity database entry 221A in the entities database table 220. As another example, an action performed by or on an entity may be specified as a verb ID 244 corresponding with a verb database entry 242 included in the verbs database table 240.

According to various embodiments, the entities database 220 may store information about entities that can be represented in a three-dimensional virtual environment. Such entities need not necessarily be predetermined, but rather can be dynamically created based on user input. The creation of entities is discussed in additional detail in Section 3.

In some embodiments, an entity may be associated with an entity ID 224 that uniquely identifies the entity. The entity may also have an entity name 226 that characterizes the entity. The entity model 228 may be a three-dimensional model that is used to represent the entity in the three-dimensional virtual environment. An entity may be associated with an entity animation rig 230 that is used to animate the entity. As discussed with respect to Section 3 and Section 4, various kinds of entities, including entities representing objects traditionally considered inanimate, may be animated and interacted with in accordance with techniques and mechanisms described herein.

According to various embodiments, the verbs database 240 may store information about actions that can be performed by or to entities within a three-dimensional virtual environment. A verb may be associated with a verb ID 244 that uniquely identifies the action. The verb may also have a verb name 246 that characterizes the action.

According to various embodiments, the 3D rigid movement 248 includes information for specifying how an entity model performing the action is to be moved in the three-dimensional virtual environment when the action is performed. The 3D rigid movement 248 may identify a movement through space of a center of mass associated with the three-dimensional model. For instance, a verb such as "walking" may be associated with 3D rigid movement information 248 that identifies a moving through space of the center of mass.

In some embodiments, a three-dimensional virtual environment may optionally be associated with an animation 250. The animation may be specified as a movement through space of one or more joints of the three-dimensional model relative to the center of mass. For instance, a verb such as "walking" may be associated with deformation of the entity model in a manner corresponding to walking. For instance, an entity animated using a human animation rig may include portions corresponding to legs, arms, head, and body. The animation information 250 may specify how such elements are to be moved when performing the action associated with the verb 242A.

In particular embodiments, an animation may be a superposition of other animations. For example, animations corresponding to walking and spinning may be combined to create a new type of movement.

According to various embodiments, various types of verbs are possible. Examples of verbs may include, but are not limited to: playing a sound, playing a music file, showing an image, playing a clip (e.g., graphics interchange format "GIF" file, a Giphy, a sticker, or another type of brief animation), playing a video, and/or animation via an animation rig.

According to various embodiments, potentially any entity may perform potentially any verb. For example, any entity may play a sound or a music clip simply by producing the audio. As another example, any entity may show an image or a video by projecting the image or video onto a side or surface of the entity by changing the texture in three dimensions. For instance, an image or video may be scaled or distorted to appear to be located on the side of a building, a bookshelf, an animal, or any other entity.

According to various embodiments, a verb may be modified by a modifier such as an adverb, which may represented text and/or an emoji. For example, an adverb such as "slowly" may be applied to the playing of a sound to indicate that the sound should be played slowly. Similarly, the adverb "slowly" may be applied to a walking animation to reduce the speed through space (i.e., the 3d rigid movement speed) and the animation speed of the animation.

In some embodiments, a verb may be specific to a particular entity animation rig. For example, some verbs may include 3D rigid movement and/or animation information specific to a default human animation rig. However. Other verbs may include 3D rigid movement and/or animation information specific to other animation rigs, such as rigs that are specific to particular entities. Thus, a verb database entry 242A may include other information not shown in FIG. 2, such as an entity animation rig identifier.

More generally, the path large language model system 202 may include various information not explicitly shown in FIG. 2 for the purpose of brevity. For example, the path large language model system 202 may include one or more repositories storing information related to background settings, adjectives, adverbs, and/or other such information associated with a path language definition 272. Such information is discussed in additional detail in Section 5. As another example, the path large language model system 202 may store information about user accounts and the users associated with user accounts. For instance, a three-dimensional virtual environment may be linked with a user account associated with its creation.

Figure 3:
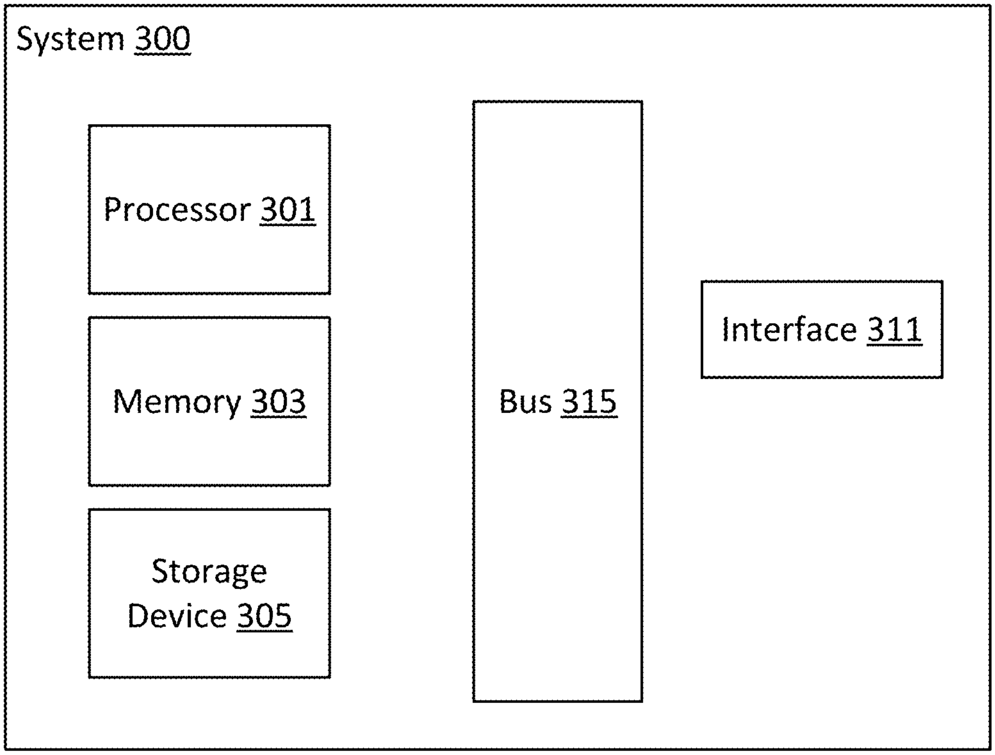
FIG. 3 illustrates one example of a computing device, configured in accordance with one or more embodiments.

FIG. 3 illustrates one example of a computing device, configured in accordance with one or more embodiments. According to various embodiments, a system 300 suitable for implementing embodiments described herein includes a processor 301, a memory module 303, a storage device 305, an interface 311, and a bus 315 (e.g., a PCI bus or other interconnection fabric.) System 300 may operate as variety of devices such as one or more components of a path large language model system 202, a client machine (204A, 204B), or any other device or service described herein. Although a particular configuration is described, a variety of alternative configurations are possible. The processor 301 may perform operations such as those described herein. Instructions for performing such operations may be embodied in the memory 303, on one or more non-transitory computer readable media, or on some other storage device. Various specially configured devices can also be used in place of or in addition to the processor 301. The interface 311 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

3. Configuring a Three-Dimensional Virtual Environment

Figure 4:
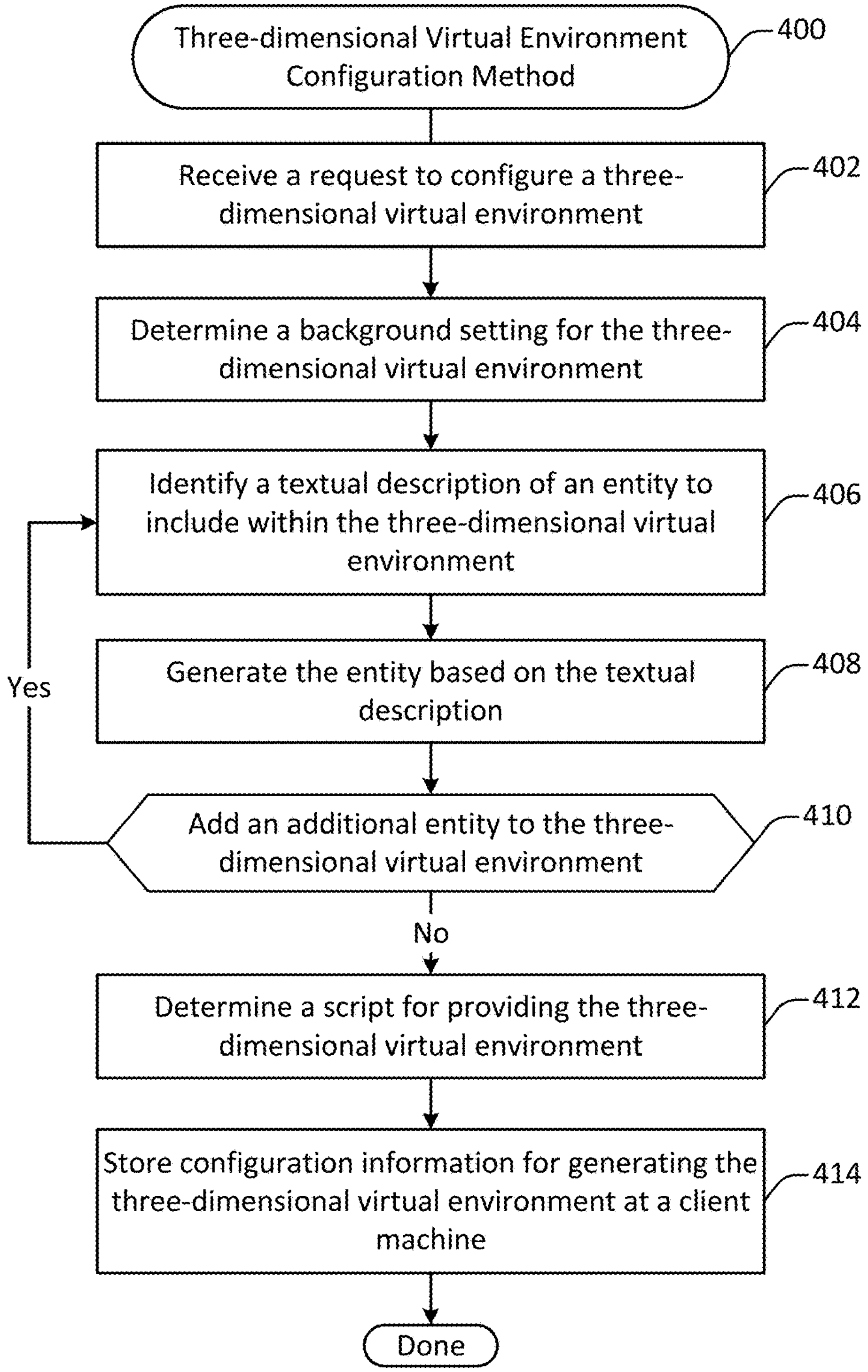
FIG. 4 illustrates a method for configuring a three-dimensional virtual environment, performed in accordance with one or more embodiments.

FIG. 4 illustrates a method 400 for configuring a three-dimensional virtual environment, performed in accordance with one or more embodiments. The method 400 may be performed at any suitable computing system, such as a server system configured to construct the three-dimensional virtual environment based on interactions from a client machine and/or serve the three-dimensional virtual environment to a client machine via the Internet. An example of such a system is discussed with respect to Section 2.

A request to configure a three-dimensional virtual environment is received at 402. According to various embodiments, the request may be received at the server system via any of various communication channels. Examples of such channels may include, but are not limited to: a mobile application, a web application, a messaging service, and combinations thereof.

The request may be received from a client machine in communication with the server system. According to various embodiments, any of a variety of client machines may be employed. For instance, the client machine may be a mobile device, a desktop computer, a tablet computer, a laptop computer, or any other type of computing device capable of communicating with the server system.

In some embodiments, the request may include input for determining some or all of the information discussed with respect to the method 400. Alternatively, or additionally, some or all of the information discussed with respect to the method 400 may be determined later, for instance via interaction between the server system and a client machine.

A background setting for the three-dimensional virtual environment is determined at 404. According to various embodiments, the background setting may include elements such as background scenery, structural objects, and the like for providing a three-dimensional virtual environment. For example, the background setting may specify imagery corresponding to background scenery such as a city scape, a natural landscape, a building interior, or other such surroundings for providing a three-dimensional virtual environment. As another example, the background setting may include one or more stationary foreground elements such as rocks, lakes, rivers, water, bridges, trees, buildings, or the like that may serve as obstacles, occlusions, or other aspects of the three-dimensional virtual environment.

In some embodiments, the background setting may be selected based on user input. For example, the user may select a background setting from a set of preconfigured background settings. As another example, a background setting may be generated automatically based on a textual description of the background setting. As yet another example, a background setting may be provided by a user, for instance in the form of a three-dimensional model and/or other elements.

A textual description of an entity to include within the three-dimensional virtual environment is identified at 406. In some embodiments, the textual description may be provided as part of the request received at 402 or may be provided as part of an interactive design process in which the user participates. The textual description may describe any object or collection of objects that may be represented in a virtual world. For example, the textual description may state: "Add a book that is walking down the street but jumps when it gets wet", "The video should have a box that hip-hop dances when the music plays".

In some embodiments, the text may include one or more emojis. An emoji may be specified in Unicode, text convention, or a different (e.g., proprietary) encoding. Emoji-based input may facilitate more nuanced descriptions of objects and their properties and actions. For example, a textual description without emoji may state "Add a book. It does not like water." However, an emoji may be used to more easily and accurately specify the book's precise reaction to water. For instance, in the Unicode specification, the emoji "U+1F62C" corresponds to a grimacing face, the emoji "U+1F644" corresponds to a face with rolling eyes, the emoji "U+1F92F" corresponds to an exploding head, and the emoji "U+1F620" corresponds to an angry face. In the absence of an emoji, the system may have difficulty determining a user's intent from the sentence "It does not like water." However, the use of emoji allows the user to more precisely specify the entity's reaction to water. Thus, the user may provide text input such as: "Add a U+1F4D6 that U+1F620 if it gets wet," where "U+1F4D6" is the emoji corresponding to an open book.

According to various embodiments, a user may specify an emoji in any of various ways. For example, an emoji may be specified by selecting it, for instance in a client-side and/or server-provided user interface component. Such emoji may then be converted to Unicode when the input is analyzed as text. As another example, an emoji may be specified by using text corresponding to an emoji, such as ":-)" for "happy". Such input may be left alone in text or may be converted to Unicode, depending on whether a suitable conversion is available. As yet another example, an emoji may be specified directly as Unicode by the end user.

The entity is generated at 408 based on the textual description of the entity. According to various embodiments, the entity may be generated based on a description of the entity provided in natural language and/or one or more emoji.

In some embodiments, the natural language and/or emoji may include one or more characteristics for animating the three-dimensional model are determined. In some embodiments, characteristics for animating the three-dimensional model may be determined based on the textual input provided by the user. For example, the user may describe an entity as "happy", "sad", or "in a hurry" via text. As another example, the user may provide one or more emoticons characterizing an emotion or other characteristic to be exhibited by the entity. Such information may then be included the entity configuration information.

According to various embodiments, the characteristics for animating the three-dimensional model may include information such as an initial location for positioning the three-dimensional model, an initial pose for rendering the three-dimensional model, a description of the manner in which the three-dimensional model is to be animated, and/or any other information related to the rendering of the three-dimensional model.

In some embodiments, the natural language and/or emoji may include one or more characteristics for interacting with the entity. The one or more characteristics for interacting with the entity may include ways in which the entity responds to user input. For instance, an entity that "likes" water may smile or clap when it gets wet, while an entity that "hates" water may frown or get angry in the same situation. As with the one or more characteristics determined at 2012, such information may be determined based on textual input provided by the user. Additional details regarding a process for generating an entity are discussed with respect to the method 500 shown in FIG. 5.

A determination is made at 410 as to whether to add an additional entity to the three-dimensional virtual environment. In some embodiments, the determination may be made based on user input. For instance, the user may indicate that all desired entities have been added. Alternatively, or additionally, the determination may be made based at least in part on an analysis of user input text that is used to create multiple entities in sequence or in parallel. For example, a user may provide input such as "The video should have a box that hip-hop dances when the music plays and a book that is walking down the street but jumps when it gets wet", which may cause the system to add two entities corresponding with the box and the book.

In particular embodiments, two or more entities may be determined at the same time based on analysis by a generative language model. For instance, a generative language model may be provided with an input prompt that includes the user input and one or more natural language instructions to generate the entity. Additional details regarding such operations are discussed with respect to the method 600 shown in FIG. 6.

A script for providing the three-dimensional virtual environment is determined at 412. According to various embodiments, the script may include one or more events for updating the three-dimensional virtual environment over time. For instance, events may be triggered based on user input, conditions that independently arise within the three-dimensional virtual environment, and/or other information. Additional details regarding the determination of a script are discussed with respect to the method 600 shown in FIG. 6.

Configuration information for generating the three-dimensional virtual environment at a client machine is stored at 414. According to various embodiments, the configuration information may be stored in any suitable location, such as a database system or other storage system accessible to the server system. The configuration information may include any of the information determined as discussed with respect to the method 400. Such information may include, but is not limited to: user input, information identifying the background setting for the three-dimensional virtual environment, one or more models or images associated with entities to include within the three-dimensional virtual environment, a script for governing the three-dimensional virtual environment, three-dimensional virtual environment metadata such as a URI, a name, or a unique identifier, other path language embedding information for the three-dimensional virtual environment, and/or any other relevant information.

Figure 5:
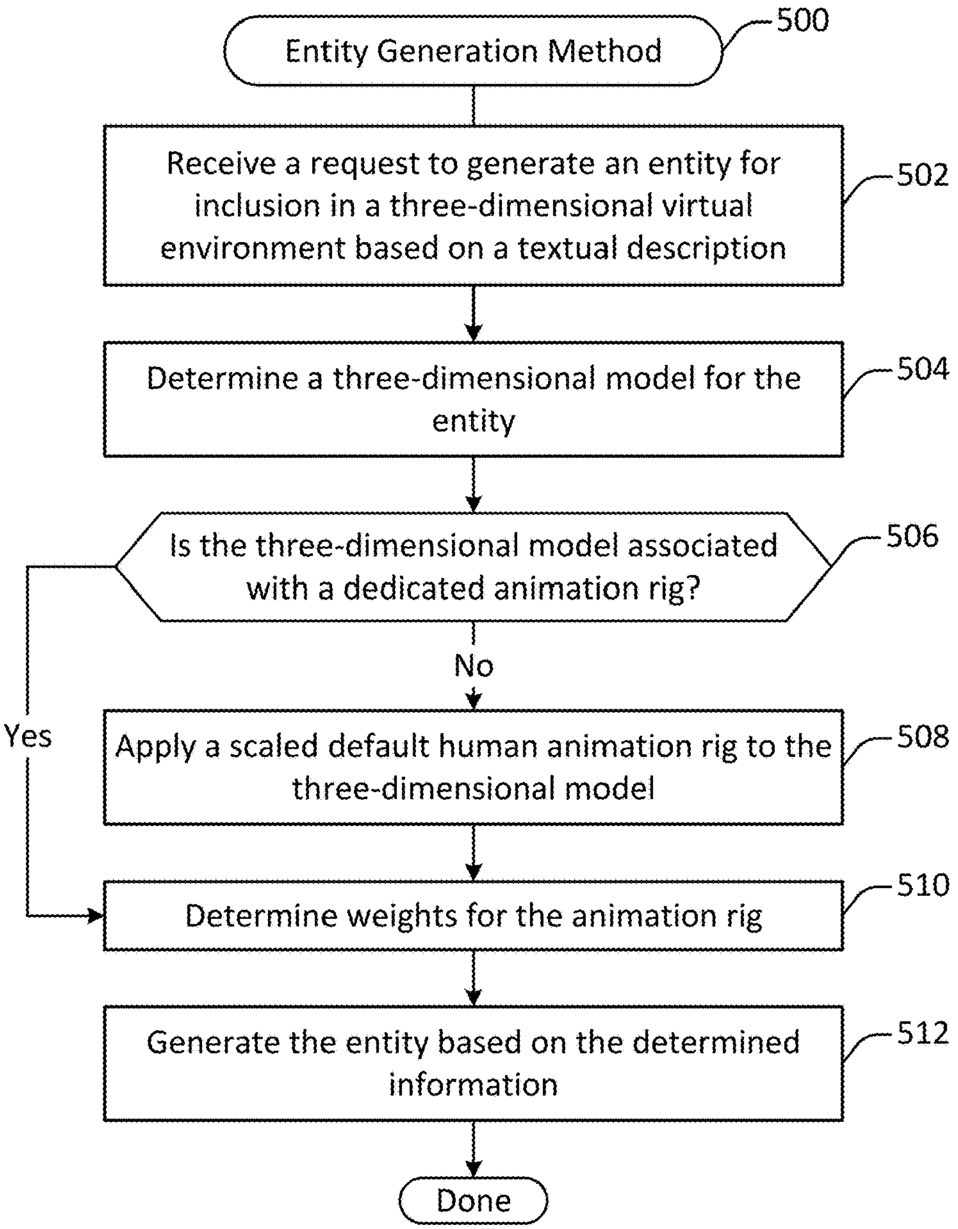
FIG. 5 illustrates a method of generating an entity, performed in accordance with one or more embodiments.

FIG. 5 illustrates a method 500 of generating an entity, performed in accordance with one or more embodiments. The method 500 may be performed at any suitable computing system, such as a server system configured to construct the three-dimensional virtual environment based on interactions from a client machine and/or serve the three-dimensional virtual environment to a client machine via the Internet. An example of such a system is discussed with respect to Section 2.

A request to generate an entity for inclusion in a three-dimensional virtual environment based on a textual description is received at 502. In some embodiments, the request may be generated as discussed with respect to the operation 308 discussed with respect to the method 300 shown in FIG. 3. The request may include or identify the textual description.

A three-dimensional model for the entity is determined at 504. According to various embodiments, the three-dimensional model may be determined in any of various ways. For example, the system may search an internal database of three-dimensional models. As another example, the system may search the Internet, for instance via a general web search or a publicly available database of models, to identify a suitable three-dimensional model. As yet another example, the user may select or provide a three-dimensional model.

In some embodiments, a search query may be determined based on a prompt provided to a generative language model. For example, the generative language model may be provided within an input prompt that includes the user input and a natural language instruction to provide a search query for identifying a three-dimensional model that reflects the user's intent.

In some implementations, one or more machine learning models may be used to select a three-dimensional model. For instance, images of models returned via search results may be evaluated by a pre-trained machine learning classification model to select a model that best matches the search query.

A determination is made at 506 as to whether the three-dimensional model is associated with a dedicated animation rig. The term "animation rig" refers to a division of a three-dimensional model into independently mobile components for the purpose of animating the three-dimensional model. Some three-dimensional models, such as standardized models associated with humans, animals, and the like may include such a rig. However, other such three-dimensional models, particularly those associated with objects traditionally considered inanimate, such as rocks, may lack a dedicated animation rig.

Upon determining that the three-dimensional model is not associated with a dedicated animation rig, a scaled default human animation rig is applied to the three-dimensional model at 508. Applying the scaled default human animation rig may involve, for instance, dividing the three-dimensional model into regions roughly corresponding with the independently movable portions of the default human animation rig, scaled to fit the virtual space occupied by the three-dimensional model. Such operations are discussed in more detail in Section 4.

Figure 10:
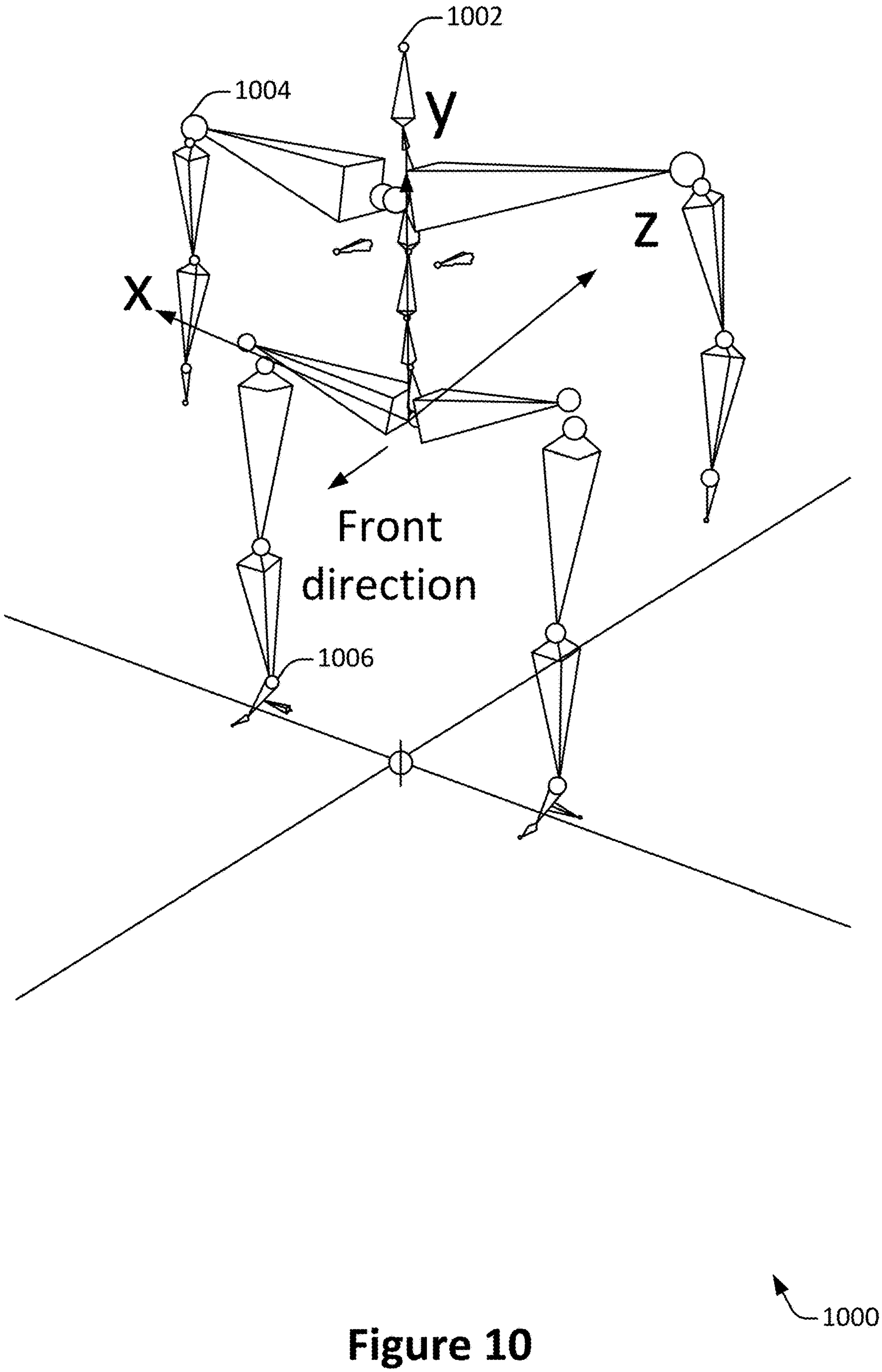
FIG. 10 and FIG. 11 illustrate views of an animation rig, provided in accordance with one or more embodiments.
Figure 11:
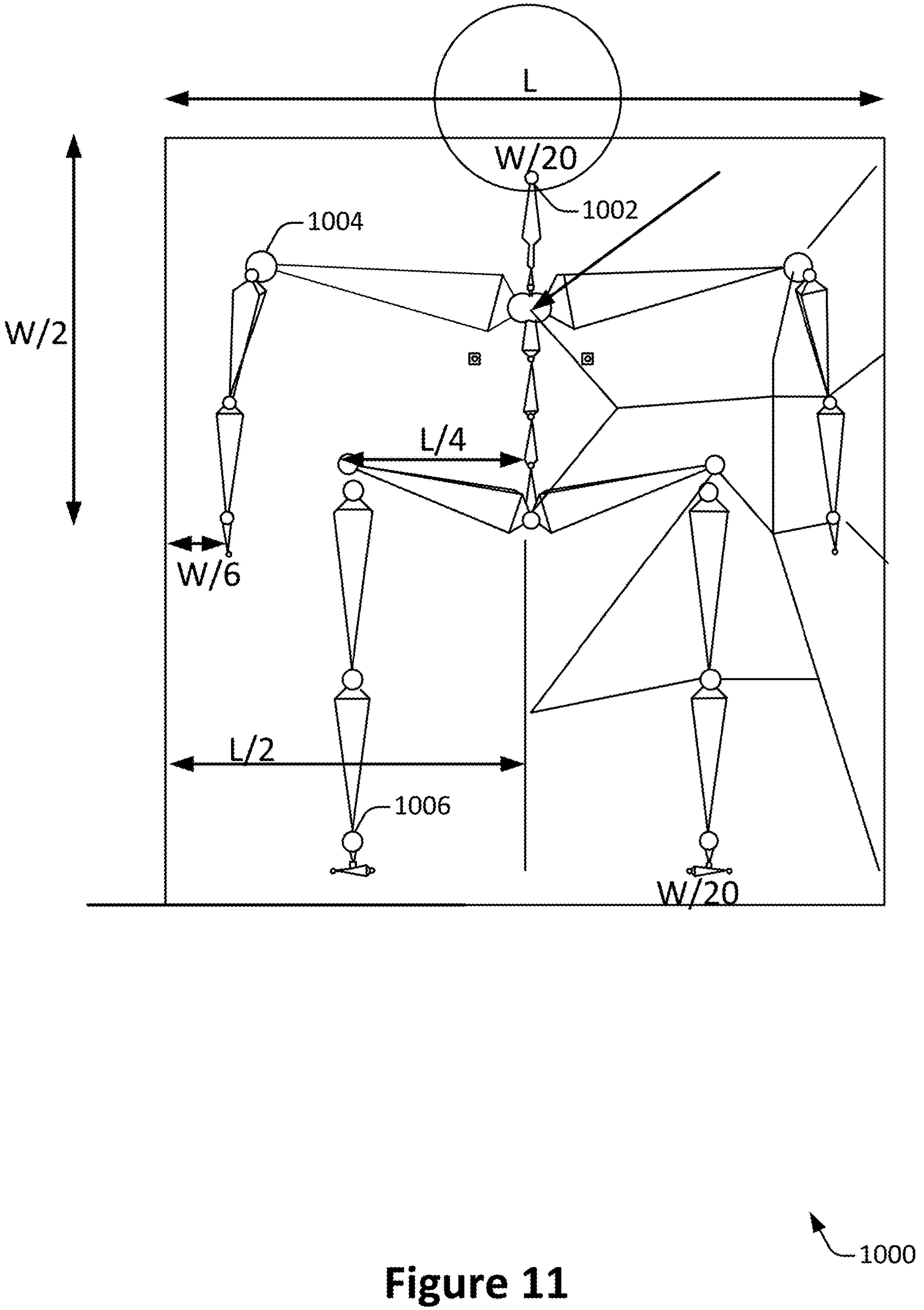

FIG. 10 and FIG. 11 illustrate views of a default human animation rig 1000, provided in accordance with one or more embodiments. According to various embodiments, an animation rig may include some number of joints. For example, the default human animation rig 1000 includes the joint 1002 corresponding to the top of the human head, the joint 1004 corresponding to the top of the right human shoulder, and the joint 1006 corresponding to the heel of the right human foot, among other joints.

In some embodiments, as shown in FIG. 10, the rig may be defined in a three-axis coordinate system allowing the joints to be repositioned in space to illustrate animation.

When the joints are repositioned, rendering the three-dimensional model may involve repositioning and/or distorting the portions of the model connecting the joints in accordance with the joint locations.

According to various embodiments, a default animation rig may be applied to any three-dimensional model by scaling it to fit the shape of the three-dimensional model. For instance, as shown in FIG. 11, if the height of the three-dimensional model is parameterized as W, then the head joint may be located on the midline from left to right at a distance of W/20 from the top of the model. Similarly, the right hip joint 1008 may be positioned at a distance of L/4 from the midline, where the width of the three-dimensional model is parameterized as L.

To aid in clarity, only a few of the specific joint vertices and their corresponding parameterized locations are not specifically called out in FIG. 10 and FIG. 11. According to various embodiments, the specific joint vertices employed, as well as their locations within the rig, may be dependent on the particular rig that is employed.

In some embodiments, a single default (e.g., human) animation rig may be used for any three-dimensional model not already associated with a dedicated animation rig. Alternatively, one or more type-specific three-dimensional models may be employed. For instance, an entity of the class of "four-legged animals" may be assigned an animation rig associated with four-legged animals, while an entity of the class "bird" may be assigned an animation rig associated with birds. In this way, any entity may be animated through use of a default rig, but the animation various types of entities may also be improved through the use of model-specific or type-specific animation rigs.

Returning to FIG. 5, weights for the animation rig are determined at 510. In some embodiments, the weights for the animation rig may be determined based on any of a variety of approaches. For example, the weights may be determined via skinning or vertex weighting. As a more specific example, an approach such as Linear Blend Skinning may be employed. Additional details are discussed in Magnenat-Thalmann, N., & Thalmann, D. (1988), "Human body deformations using joint-dependent local operators and finite element theory", which is hereby incorporated by reference in its entirety and for all purposes.

The entity is generated at 514 based on the determined information. In some embodiments, generating the entity may involve defining configuration data such as an initial location of the entity within the three-dimensional virtual environment, a three-dimensional model for the entity, an animation rig for the entity, one or more weights for the animation rig, and any other information.

In some embodiments, the generation of an entity for inclusion in a three-dimensional virtual environment may include one or more operations not shown in FIG. 5. For example, a generative language model may analyze the textual description and generate a response message to a user to elicit additional information, such as a clarification regarding the user's intent. For instance, consider a sentence such as "The chicken is ready to eat." Such a sentence is ambiguous, since it is unclear whether the user intends to convey that (1) the chicken is ready to eat something or that (2) the chicken is ready to be eaten. In the event that such ambiguity is unclear from context, the user may be asked to provide additional input clarifying the meaning reflected in the user input.

Figure 6:
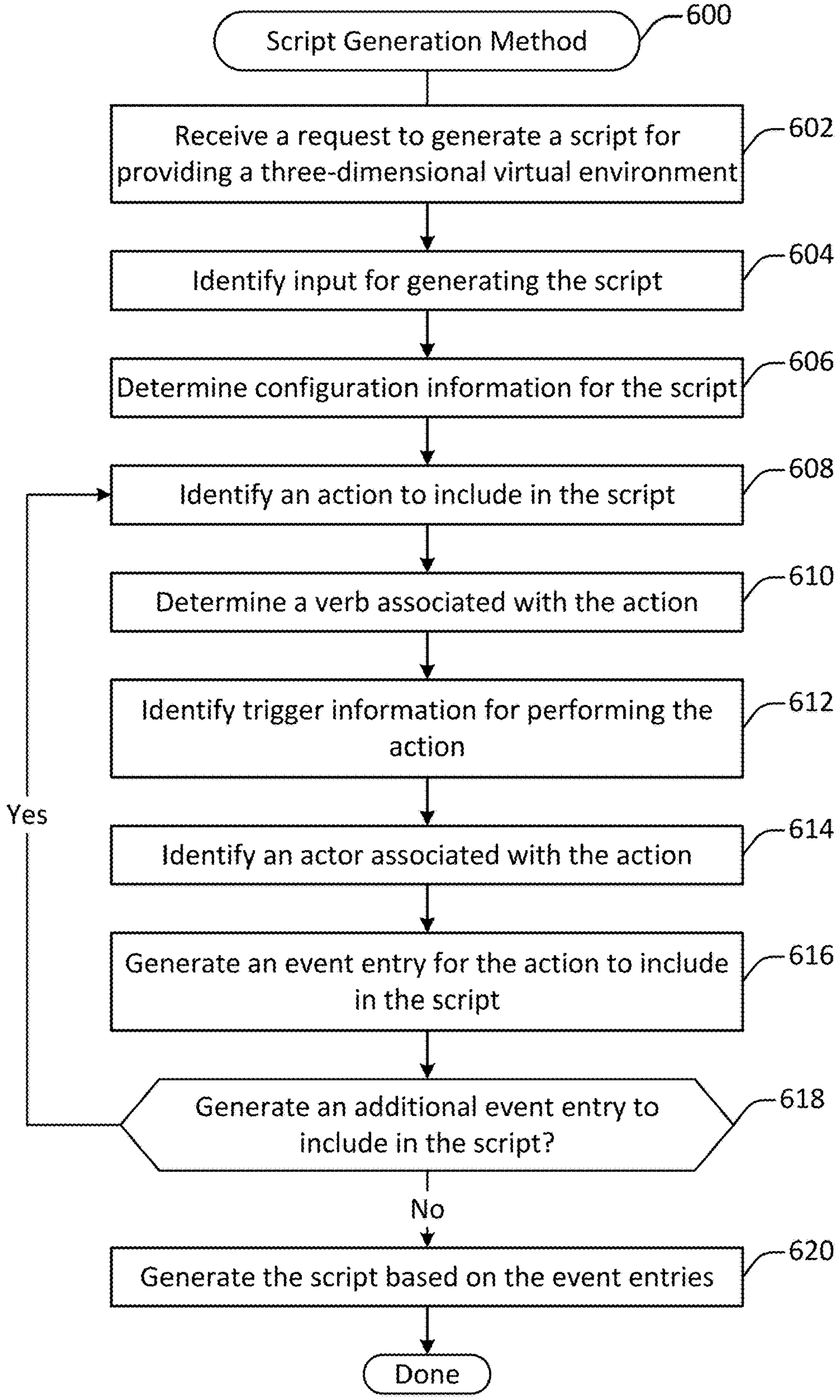
FIG. 6 illustrates a method for generating a script governing a three-dimensional virtual environment, performed in accordance with one or more embodiments.

FIG. 6 illustrates a method 600 for generating a script governing a three-dimensional virtual environment, performed in accordance with one or more embodiments. The method 600 may be performed at any suitable computing system, such as a server system configured to construct the three-dimensional virtual environment based on interactions from a client machine and/or serve the three-dimensional virtual environment to a client machine via the Internet. An example of such a system is discussed with respect to Section 2.

A request to generate a script for providing a three-dimensional virtual environment is received at 602. In some embodiments, the request may be generated as discussed with respect to the operation 412 shown in FIG. 4.

Input for generating the script is identified at 604. According to various embodiments, the input may include user input provided by a user. Such input may include, but is not limited to: natural language text, voice input transcribed to text, one or more emojis, one or more image files, one or more video files, one or more audio files, and/or any other information. Such information may be provided at a client machine and transmitted to the path large language model system 202 via the Internet.

Configuration information for the script is determined at 604. According to various embodiments, the configuration information may include data such as a script name, a unique identifier for the script, a URI for accessing the script, an author of the script, or the like.

An action to include in the script is identified at 608. The action may be determined by parsing the user input. For instance, natural language in the user input may be parsed to identify words associated with actions, such as verbs.

A verb associated with the action is determined at 610. In some embodiments, the verb associated with the action may be determined by using one or more words associated with the action to search the verb database for one or more matching entries. The verb may be specified as an identifier associated with an entry in the verbs database 240.

Trigger information for performing the action is identified at 612. In some implementations, the trigger information may be determined by parsing the user input to identify explicitly conditional words such as "when" and "if". Alternatively, or additionally, the trigger information may be determined by parsing the user input to identify implicit conditions, such as preferences or characteristics. For instance, a phrase such as "likes apples" or a smiling emoji combined with an apple emoji may be used to infer that an entity should exhibit a positive emotion when it encounters an apple. The triggering information may be specified as an event defined in accordance with the path large language model definition.

An actor associated with the action is identified at 614. In some embodiments, the actor may be an entity discussed with respect to the method 400 as being included in the three-dimensional virtual environment. Such an entity may be included at the time that the three-dimensional virtual environment is initialized or may be introduced later, for instance as the result of performing an action. The actor may be identified via an entity ID 224 included in an entity database entry in the entities database 220.

An event entry for the action is generated at 616. In some embodiments, the event entry may include structured text that contains the information determined at operations 608, 612, and 614. For instance, the event entry may be an entry in a JSON object that includes elements for one or more actors, triggers, and/or actions.

In particular embodiments, an element included within an event entry may include one or more arguments. Such arguments may correspond to characteristics such as adverbs, adjectives, or other modifiers to provide for a more nuanced action. Such information may be provided as text or may be provided as an identifier associated with an adverb, adjective, or other modifier included within the path large language model definition.

A determination is made at 618 as to whether to generate an additional event entry to include in the script. In some embodiments, the determination may be made based on whether the user input identifies any additional action-related information for governing the three-dimensional virtual environment.

Upon determining not to generate an additional event entry, the script is generated at 620 based on the event entries. In some implementations, generating the script may involve creating a file or string that includes the event entries generated at 616. The file or string may include additional information, such as the configuration information determined at 606.

Although the method 600 is shown for the purpose of illustration as being a linear process executed as a distinct series of steps, in some configurations one or more of the operations shown in FIG. 6 may be performed in parallel or in a different sequence. For example, some or all of the operations shown in FIG. 6 may be performed by a generative language model by completing an input prompt to generate novel text corresponding to all or a portion of the script. For example, a script generation input prompt may include natural language instructions for generating the script, information pertaining to one or more entities or verbs that may be included within the script, and user input and/or other dynamically determined instructions for generating the script. The generative language model may then determine novel text corresponding to the events determined as discussed with respect to the method 600 shown in FIG. 6.

4. Rendering a Three-Dimensional Virtual Environment

Figure 7:
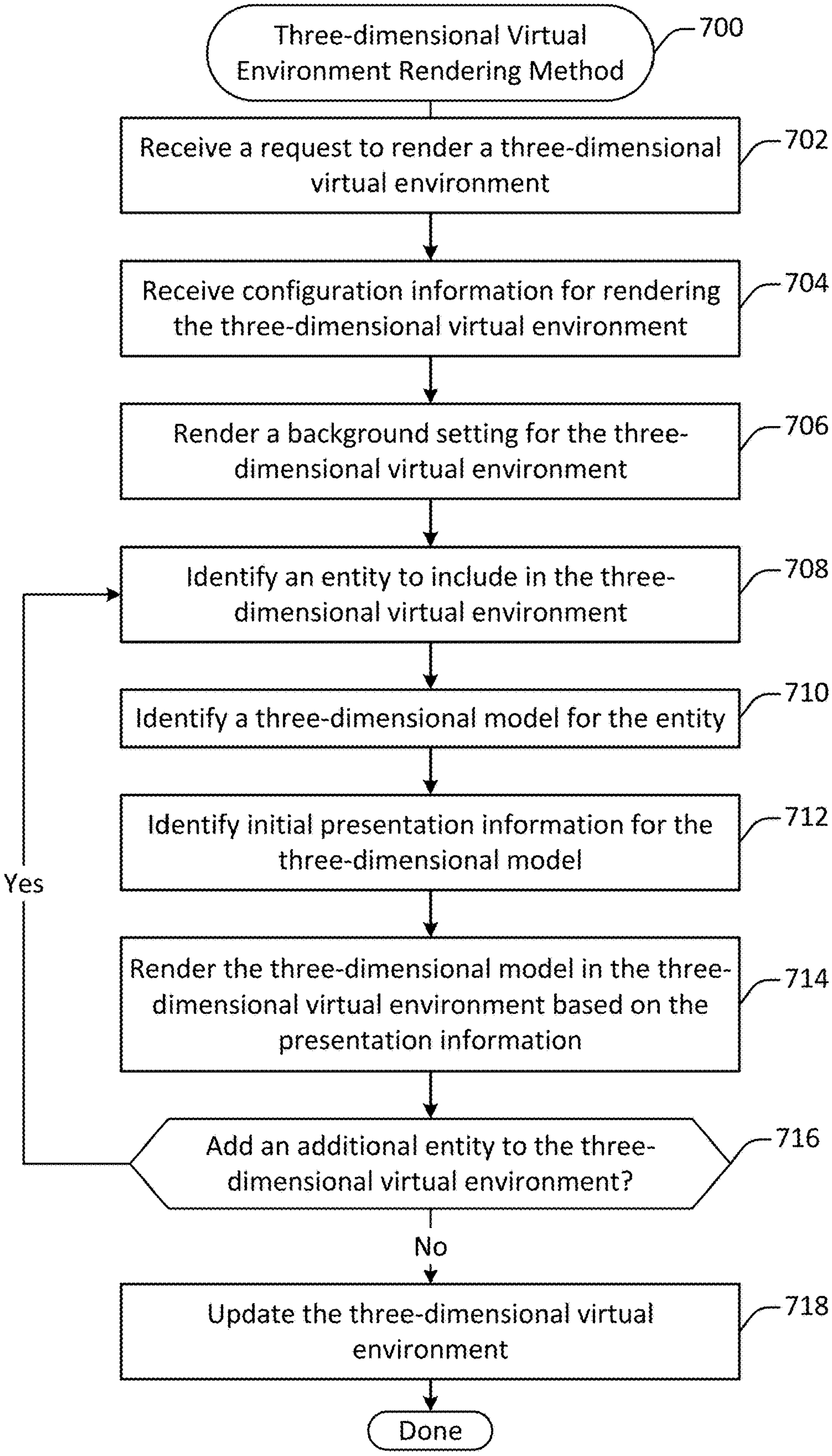
FIG. 7 illustrates a method of rendering a three-dimensional virtual environment, performed in accordance with one or more embodiments.

FIG. 7 illustrates a method 700 of rendering a three-dimensional virtual environment, performed in accordance with one or more embodiments. The method 700 may be performed at any suitable computing system, such as client machine in communication with a server system configured to construct the three-dimensional virtual environment based on interactions from a client machine and/or serve the three-dimensional virtual environment to a client machine via the Internet. An example of such an ecosystem is discussed with respect to Section 2.

A request to render a three-dimensional virtual environment is received at 702. In some embodiments, the request may be generated when a client machine visits a URL associated with a three-dimensional virtual environment. For instance, the URL may include an identifier uniquely identifier the three-dimensional virtual environment. Alternatively, the request may be generated when a dedicated mobile application at a client machine accesses a three-dimensional virtual environment through a communication interface.

Configuration information for rendering the three-dimensional virtual environment is received at 704. In some embodiments, the configuration information may be transmitted from the path large language model system 202 to the client machine in response to a request from the client machine. The configuration information may include data such as a background setting, one or more entity models, one or more animation rigs, and/or one or more scripts for providing the three-dimensional virtual environment.

A background setting for the three-dimensional virtual environment is rendered at 706. In some embodiments, the background setting may be rendered by the renderer 212A, which may be configured to produce a visual representation of a three-dimensional virtual environment.

An entity to include in the three-dimensional virtual environment is identified at 708. The entity may be identified based on an identifier included in the configuration information received at 704.

A three-dimensional model for the entity is identified at 710. In some embodiments, the three-dimensional model may be included in the configuration information received at 704. The three-dimensional model may be identified based on the entity identifier.

Presentation information for the three-dimensional virtual environment is identified at 712. In some implementations, the presentation information may be included in the configuration information received at 704. The presentation information may include, for instance, a characterization of an initial location within the three-dimensional virtual environment, an initial pose for the three-dimensional model, an initial action being performed by the three-dimensional model, and/or any other such information for initially rendering the three-dimensional virtual environment.

The three-dimensional model is rendered in the three-dimensional virtual environment at 714 based on the presentation information. For instance, the three-dimensional model may be located at a particular location within the three-dimensional virtual environment and arranged in a particular pose while performing a particular action, as discussed with respect to the operations 710*j* and 712. The rendering may be performed by the renderer 212A, which is configured to determine a visual representation of the three-dimensional virtual environment based on the background setting, one or more three-dimensional models, and the presentation information. Additional details regarding a method for rendering a three-dimensional model are discussed with respect to the method 2400 shown in FIG. 24.

A determination is made at 716 as to whether to add an additional entity to the three-dimensional virtual environment. In some embodiments, additional entities may be added until all entities in the configuration information received at 704 identified for initial presentation in the three-dimensional virtual environment have been rendered.

Upon determining not to add an additional entity to the three-dimensional virtual environment, the three-dimensional virtual environment is updated at 718. According to various embodiments, the three-dimensional virtual environment may be updated based on a script included in the configuration information received at 704 in conjunction with user input received at the client machine. Additional details regarding a process for updating the three-dimensional virtual environment are discussed with respect to the method 800 shown in FIG. 8.

According to various embodiments, one or more of the operations shown in FIG. 7 may be performed in an order different than that shown. For instance, two or more entities may be rendered in parallel by the renderer.

Figure 8:
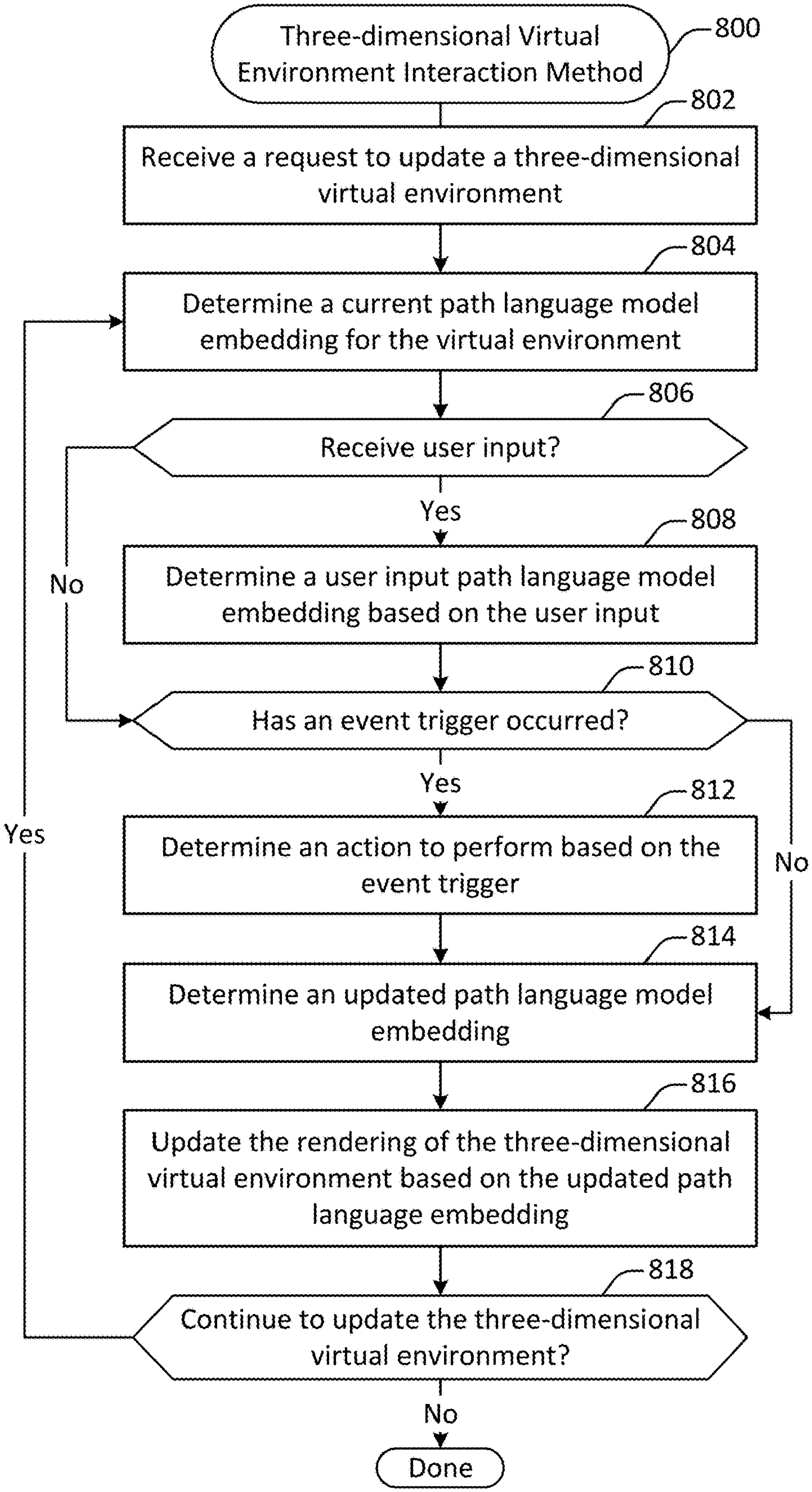
FIG. 8 illustrates a method of updating a three-dimensional virtual environment, performed in accordance with one or more embodiments.

FIG. 8 illustrates a method 800 of updating a three-dimensional virtual environment, performed in accordance with one or more embodiments. The method 800 may be performed at any suitable computing system, such as client machine in communication with a server system configured to construct the three-dimensional virtual environment based on interactions from a client machine and/or serve the three-dimensional virtual environment to a client machine via the Internet. An example of such an ecosystem is discussed with respect to Section 2.

A request to update a three-dimensional virtual environment is received at 802. In some embodiments, the request may be generated as discussed with respect to the operation 718 shown in FIG. 7.

A current path language model embedding for the three-dimensional virtual environment is determined at 804. In some embodiments, the current path language model embedding may describe a current state of the three-dimensional virtual environment. For instance, the path language embedding may include details such as the locations, poses, actions, and histories of entities within the three-dimensional virtual environment. Additional details regarding a path language model are discussed in Section 5.

In some implementations, the initial path language model embedding may simply reflect the state of the three-dimensional virtual environment at the time the three-dimensional virtual environment is initialized. For instance, the initial path language model embedding may specify the initial locations, poses, and actions being performed by the entities at the time the three-dimensional virtual environment is initialized. However, if the three-dimensional virtual environment has been updated after initialization, for instance based on user input, the path language model embedding may be updated to reflect the changes.

A determination is made at 806 as to whether input has been received. According to various embodiments, user input may be provided in any of various ways. Examples of suitable channels for providing user input include, but are not limited to: text, emoji, voice, other audio, images, videos, touch, and mouse clicks. For example, a three-dimensional virtual environment may permit a user to throw a water balloon at a moving target. Depending on the user's device and the configuration of the three-dimensional virtual environment, the user may perform such an action via a touch screen swipe, a voice instruction, a text message, a button click, or any other suitable input techniques.

Upon determining that user input has been received, a user input path language model embedding is determined at 810 based on the user input. For instance, the user input may specify that a particular entity is to be moved in a particular direction. Such information may then be processed by the player 208A to convert the information into a format consistent with the configuration of the three-dimensional virtual environment.

A determination is made at 810 as to whether an event trigger has occurred. In some embodiments, the determination may be made by evaluating the current path language model embedding and/or the user input path language model embedding in combination with the script. The event handler 210A may determine whether the user interaction and/or the normal operation of the three-dimensional virtual environment has triggered an event. For example, the script may include an event that is triggered if two different entities collide. Such a collision may be driven by user input, or may occur due to the two entities moving autonomously through the three-dimensional virtual environment.

Upon determining that an event trigger has occurred, an action to perform based on the event trigger is determined at 812. According to various embodiments, the action may include the performance of one or more verbs specified by the script and defined in the path large language model.

An updated path language model embedding is determined at 814. In some embodiments, the updated path language model embedding is determined by the event handler 210A based on the current path language model embedding, the user input path language model embedding, and/or one or more actions to perform.

In some configurations, the performance of a verb may trigger an additional event. For instance, the script may specify that an explosion occurs if two different entities collide. The script may also include an event that specifies that a song is to be played if an explosion occurs. Hence, the collision of the two entities may trigger an explosion which is reflected in an updated path large language model embedding. The updated path large language model embedding may then trigger the playing of the song.

In some embodiments, more than one action may be performed at 812, for instance in a chain reaction of events. Alternatively, a single action may be performed at 812, with subsequent actions occurring during a subsequent iteration of the loop represented by the operations 804 through 818.

The rendering of the three-dimensional virtual environment is updated at 816 based on the updated path language embedding. In some embodiments, the rendering may be updated by the renderer 212A. For static objects or for 3D rigid movement, updating the rendering of the three-dimensional virtual environment may involve operations such as adjusting which entities, media elements, and other elements are presented within the three-dimensional virtual environment. For animated entities, the animation may be performed as discussed with respect to the method 2400 shown in FIG. 24. Updating the rendering of the three-dimensional virtual environment at 816 may involve performing one or more of the operations in the method 700 shown in FIG. 7, such as updating the rendering of one or more entities included in the environment.

A determination is made at 818 as to whether to continue to update the three-dimensional virtual environment. In some embodiments, the determination may be made at least in part based on user input. For instance, the three-dimensional virtual environment may continue to be updated as long as it is being presented on a display screen at the client machine.

Figure 9:
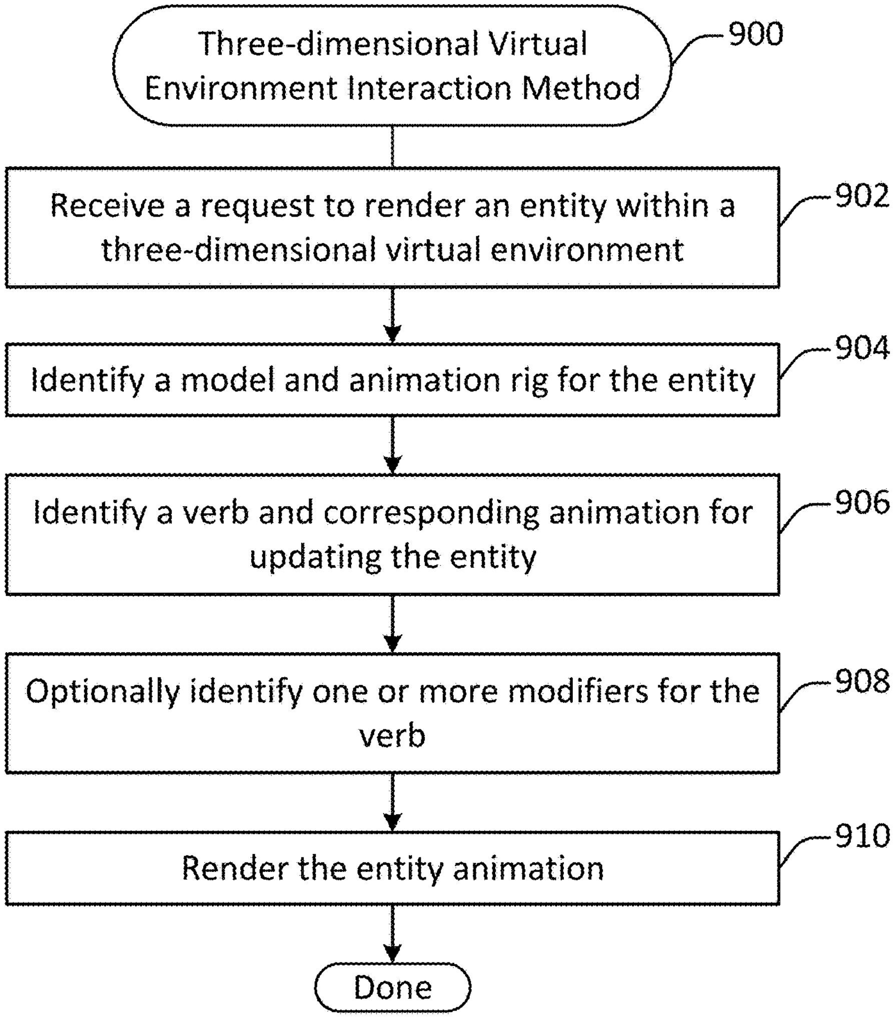
FIG. 9 illustrates a method for rendering an animated entity within a three-dimensional virtual environment, performed in accordance with one or more embodiments.

FIG. 9 illustrates a method 900 for rendering an animated entity within a three-dimensional virtual environment, performed in accordance with one or more embodiments. The method 900 may be performed at any suitable computing system, such as client machine in communication with a server system configured to construct the three-dimensional virtual environment based on interactions from a client machine and/or serve the three-dimensional virtual environment to a client machine via the Internet. An example of such an ecosystem is discussed with respect to Section 2.

A request to render an entity within a three-dimensional virtual environment is received at 902. In some embodiments, the request may be generated as discussed with respect to the operation 714 shown in FIG. 7. As discussed with respect to the operation 816 shown in FIG. 8, such a request may also be generated after the initial rendering of the environment. The request to render the entity may identify elements such as the entity to be animated, the verb that the entity is performing, optionally a trajectory in the three-dimensional virtual environment along with the entity is to be moving, and optionally one or more modifiers for the verb.

A three-dimensional model and an animation rig for the entity is identified at 904. In some embodiments, the three-dimensional model and the animation rig may be identified by accessing metadata information associated with the entity, which may be included in or referenced by the script. For instance, as discussed with respect to FIG. 2, an entity may be associated with a default animation rig or an animation rig specific to an entity or type of entity. The animation rig may include independently movable joints which may be moved through space to give the appearance that the entity is animated.

A verb and corresponding animation for updating the entity are identified at 906. As discussed herein, a verb may be associated with an animation. The animation may identify a set of movements corresponding to elements of an animation rig. For instance, the animation may identify trajectories through space within a coordinate system for the joints included in an animation rig in order to implement the animation.

One or more modifiers for the verb are optionally identified at 908. Modifiers may include adjectives or adverbs such as "slowly" that may affect how the animated entity is rendered. Such modifiers may be included in the script or may be determined dynamically, for instance based on user input.

The entity animation is rendered at 910 based on the 910. In some embodiments, rendering the entity animation may involve operations such as moving the joints of the three-dimensional model through space in a manner specified by the animation identified at 904 as optionally modified by one or more modifiers identified at 908. For instance, the movement may be increased or decreased in speed.

FIG. 12, FIG. 13, FIG. 14, and FIG. 15 illustrate views of entities (a box, a book, a bookshelf, and a shield) being animated, generated in accordance with one or more embodiments. According to various embodiments, the specific images shown in FIG. 12 through FIG. 15 are included for the purpose of illustration. An actual animation of a three-dimensional model may involve additional frames beyond those shown in FIG. 12 through FIG. 15.

According to various embodiments, because the entities shown in FIG. 12 through FIG. 15 correspond to objects traditionally considered inanimate, they are not associated with dedicated animation rigs, and instead a default human animation rig is applied to each of the models. As shown in these figures, applying the default animation human rig involves dividing the three-dimensional model into portions corresponding to the default human rig scaled to the region corresponding to the three-dimensional model. In this way, any object having a three-dimensional model can be animated.

Figure 12:
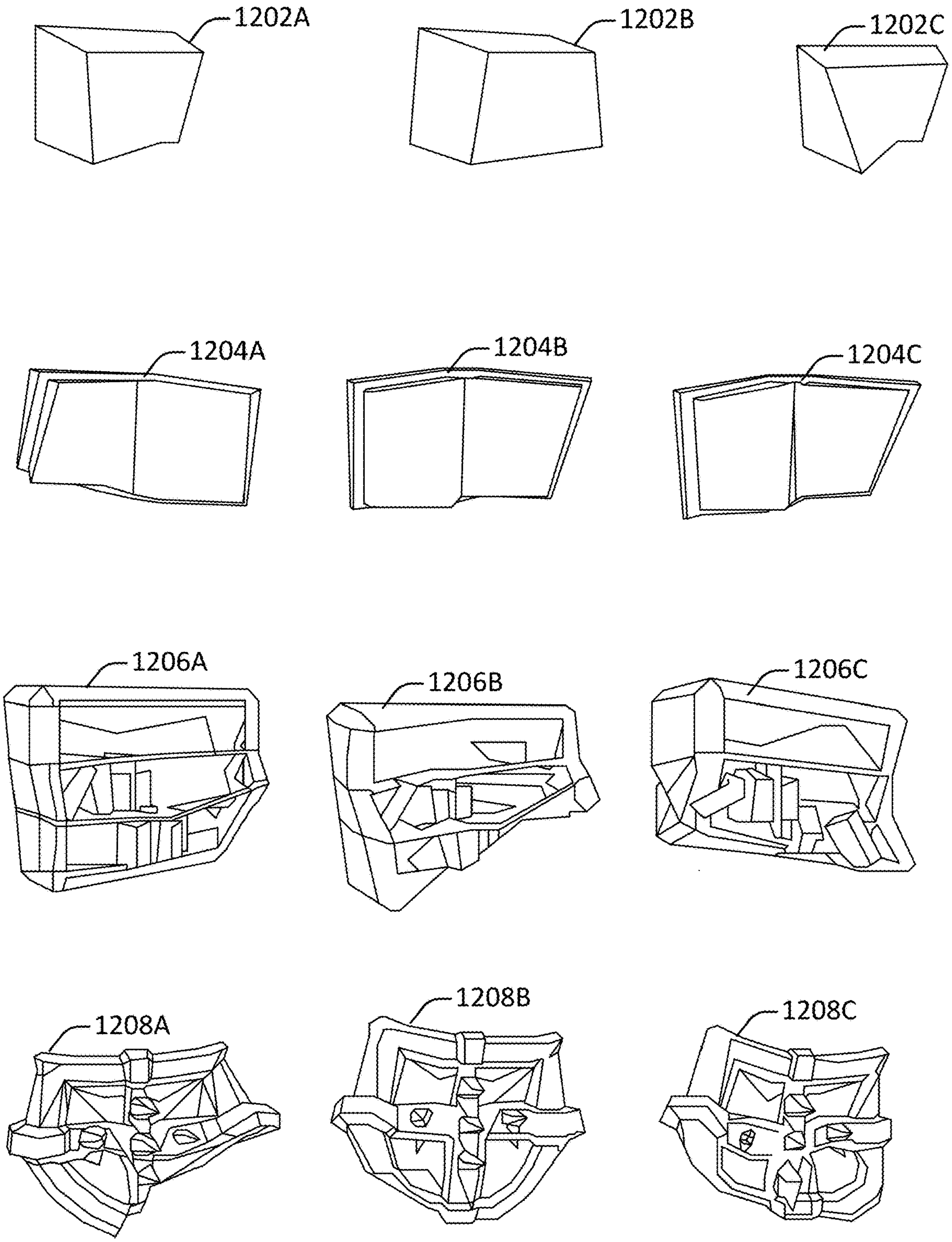
FIG. 12, FIG. 13, FIG. 14, and FIG. 15 illustrate views of entities being animated, generated in accordance with one or more embodiments.

In FIG. 12, the three-dimensional models are shown as walking. For example, 1202A illustrates a box, 1204A illustrates a book, 1206A illustrates a bookshelf, and 1208A illustrates a shield. Moving from left to right, at 1202B, 1204B, 1206B, and 1208B the entities each move forward a model portion corresponding with a human foot. At 1202C, 1204C, 1206C, and 1208C the entities each move forward a model portion corresponding with the other foot, creating the appearance of walking.

In FIG. 12, the three-dimensional models are shown as walking. For example, 1202A illustrates a box, 1204A illustrates a book, 1206A illustrates a bookshelf, and 1208A illustrates a shield. Moving from left to right, at 1202B, 1204B, 1206B, and 1208B the entities each move forward a model portion corresponding with a human foot. At 1202C, 1204C, 1206C, and 1208C the entities each move forward a model portion corresponding with the other foot, creating the appearance of walking.

Figure 13:
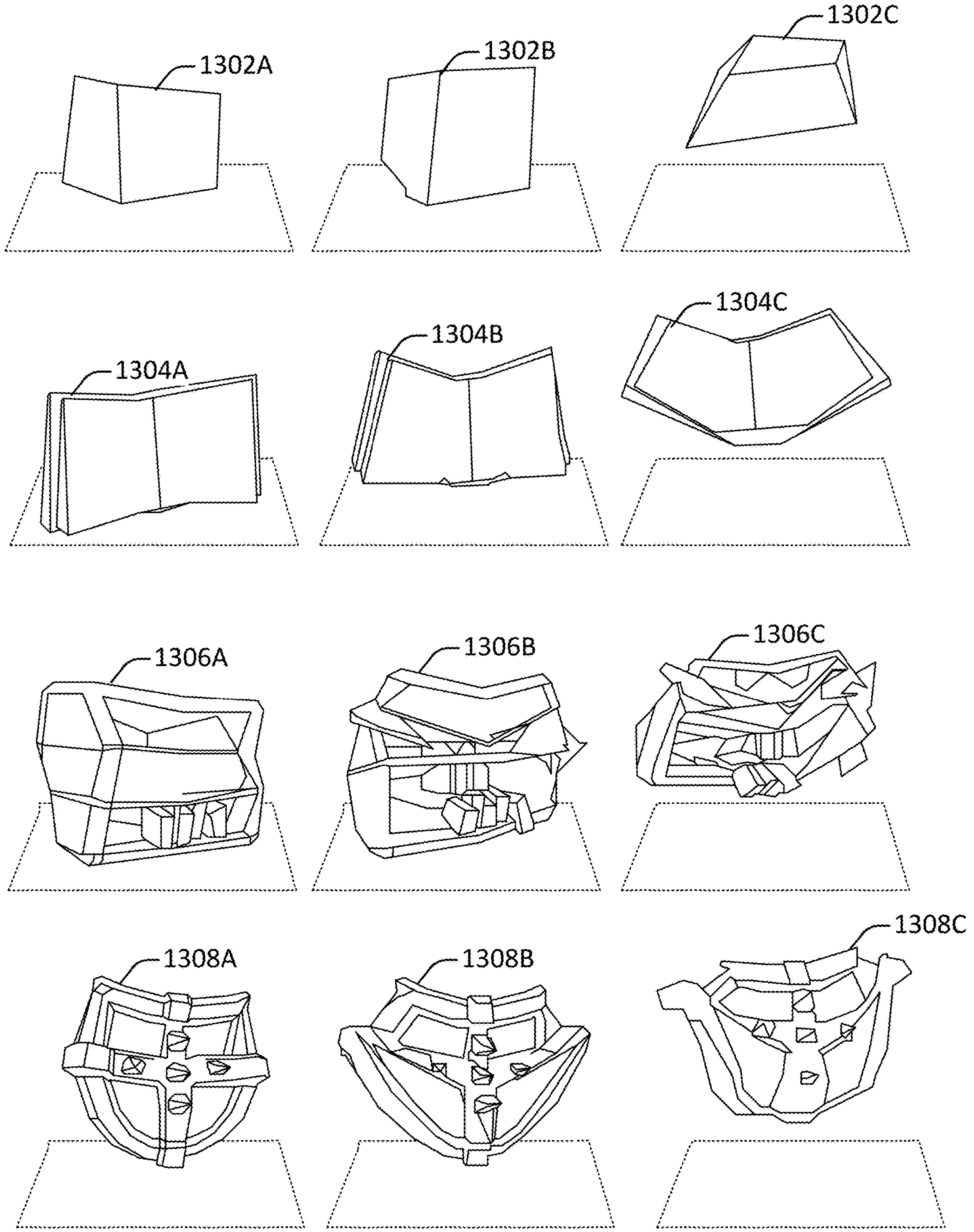

In FIG. 13, the three-dimensional models are shown as jumping. For example, at 1302A, 1304A, 1306A, and 1308A the entities are shown as being positioned near the floor, crouching to build energy for jumping. At 1302B, 1304B, 1306B, and 1308B the entities are shown as starting to leave the floor, with portions of the models corresponding to human hands raising in the air. At 1302C, 1304C, 1306C, and 1308C the entities are shown as being positioned above the floor, giving the appearance of jumping.

Figure 14:
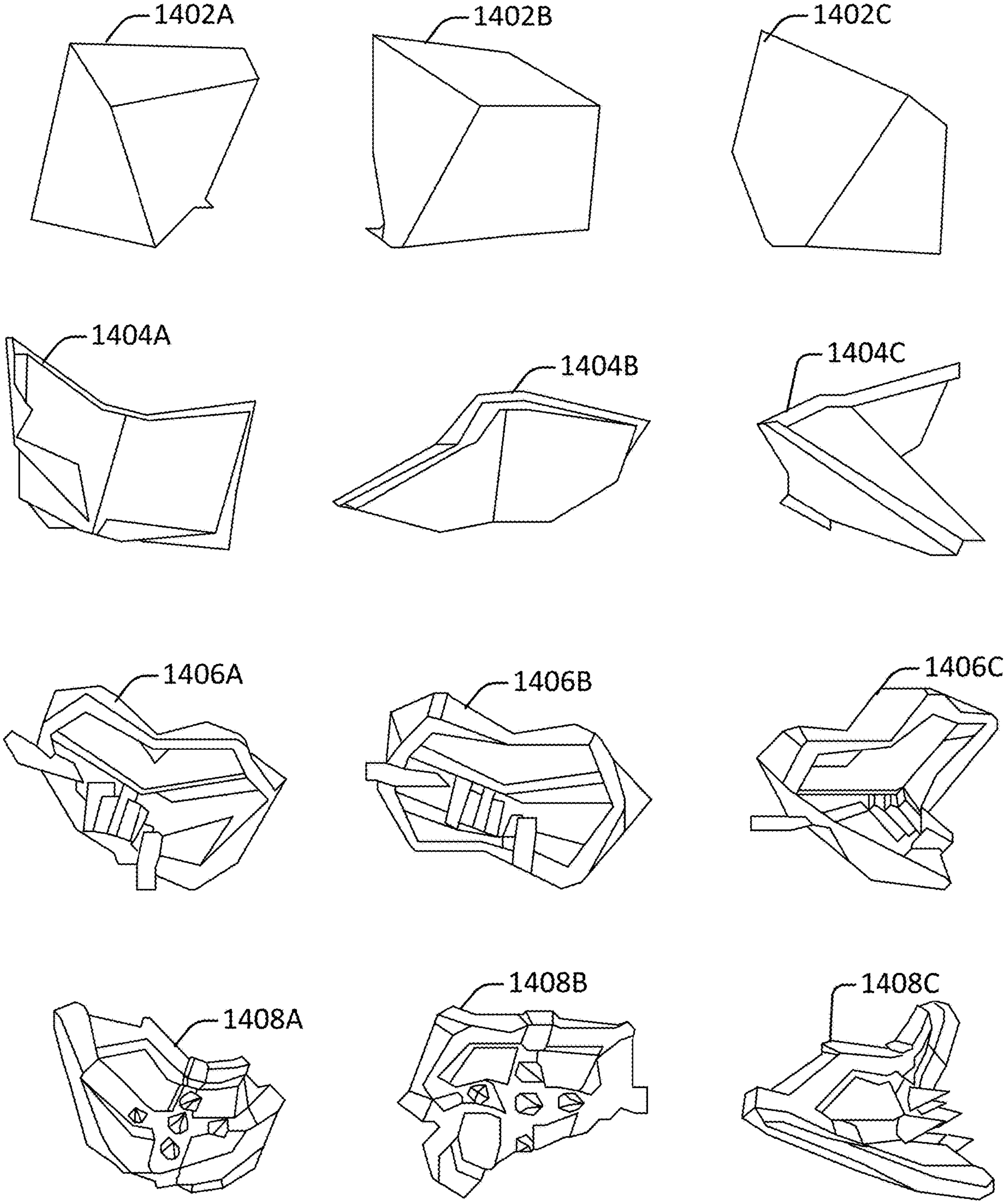
Figure 15:
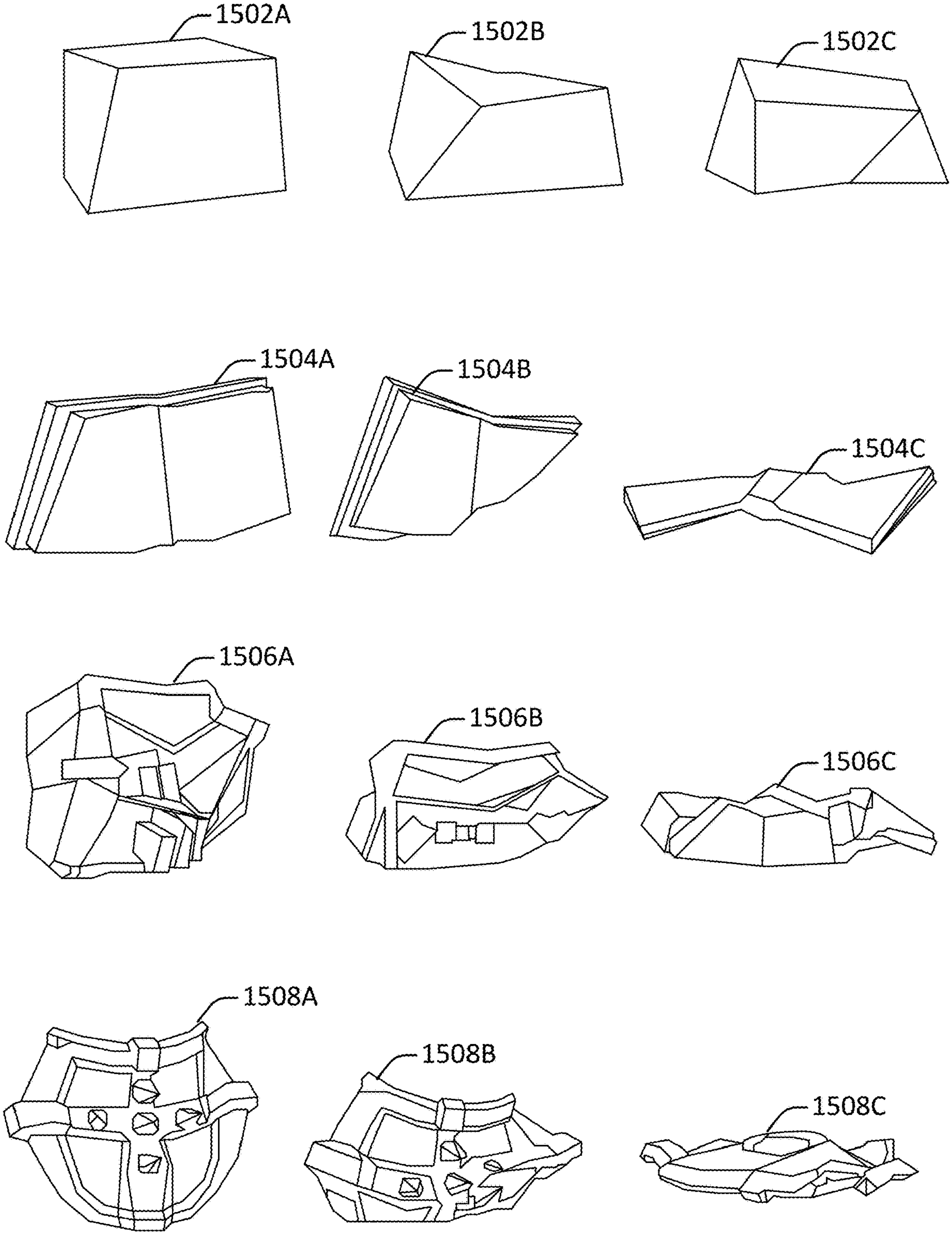

In FIG. 14, the three-dimensional models are shown as jumping. For example, at 1402A, 1404A, 1406A, and 1408A the entities are shown as being positioned with portions of the models corresponding with one human foot forward. At 1402B, 1404B, 1406B, and 1408B the entities are shown as starting to move the other foot. At 1402C, 1404C, 1406C, and 1408C the entities are shown as moving the other foot across the body, giving the appearance of dancing.

In FIG. 14, the three-dimensional models are shown as DYING. For example, at 1402A, 1404A, 1406A, and 1408A the entities are shown as being in a standing position. At 1402B, 1404B, 1406B, and 1408B the entities are shown as starting to collapse. At 1402C, 1404C, 1406C, and 1408C the entities are shown as having collapsed, giving the appearance of dying.

Figure 16:
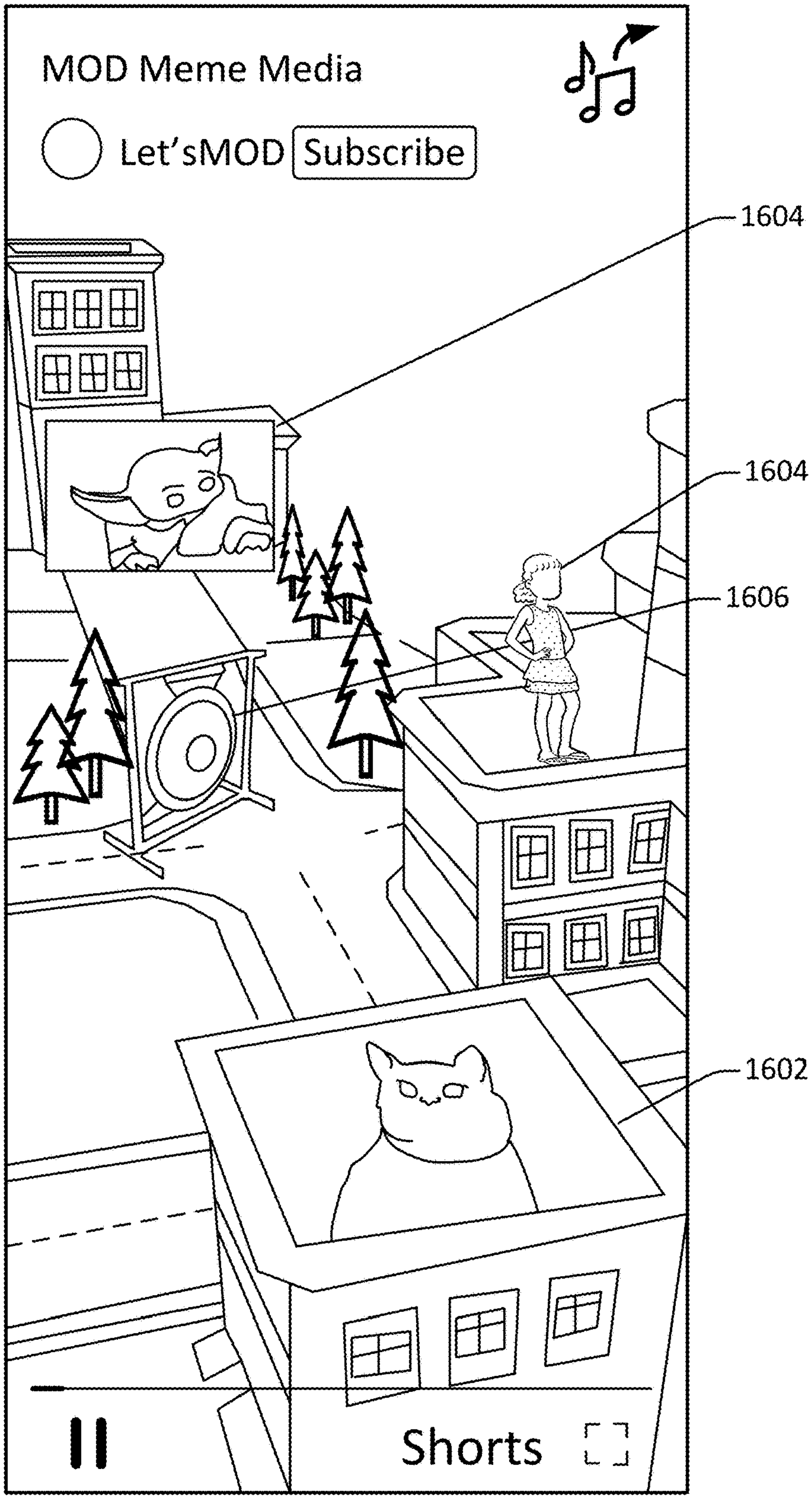
FIG. 16 illustrates an example of a three-dimensional virtual environment, generated in accordance with one or more embodiments.

FIG. 16 illustrates an example of a three-dimensional virtual environment 1600, generated in accordance with one or more embodiments. As discussed herein, the three-dimensional virtual environment may be dynamically configured based on user input, then presented at a client machine. Once presented at the client machine, a user may provide user input to interact with the three-dimensional virtual environment.

As shown in FIG. 16, potentially any entity within the three-dimensional virtual environment may perform potentially any verb within the path language model. For example, at 1602, a building displays an image of a cat. As another example, a girl is animated as dancing at 1604. As yet another example, a building is displaying a video at 1604, which does not play until the user touches or clicks on the video. As still another example, a picture of a gong is configured to play a sound when a triggering condition is met (e.g., receiving a click or touch by a user).

5. Path Language

Figure 17:
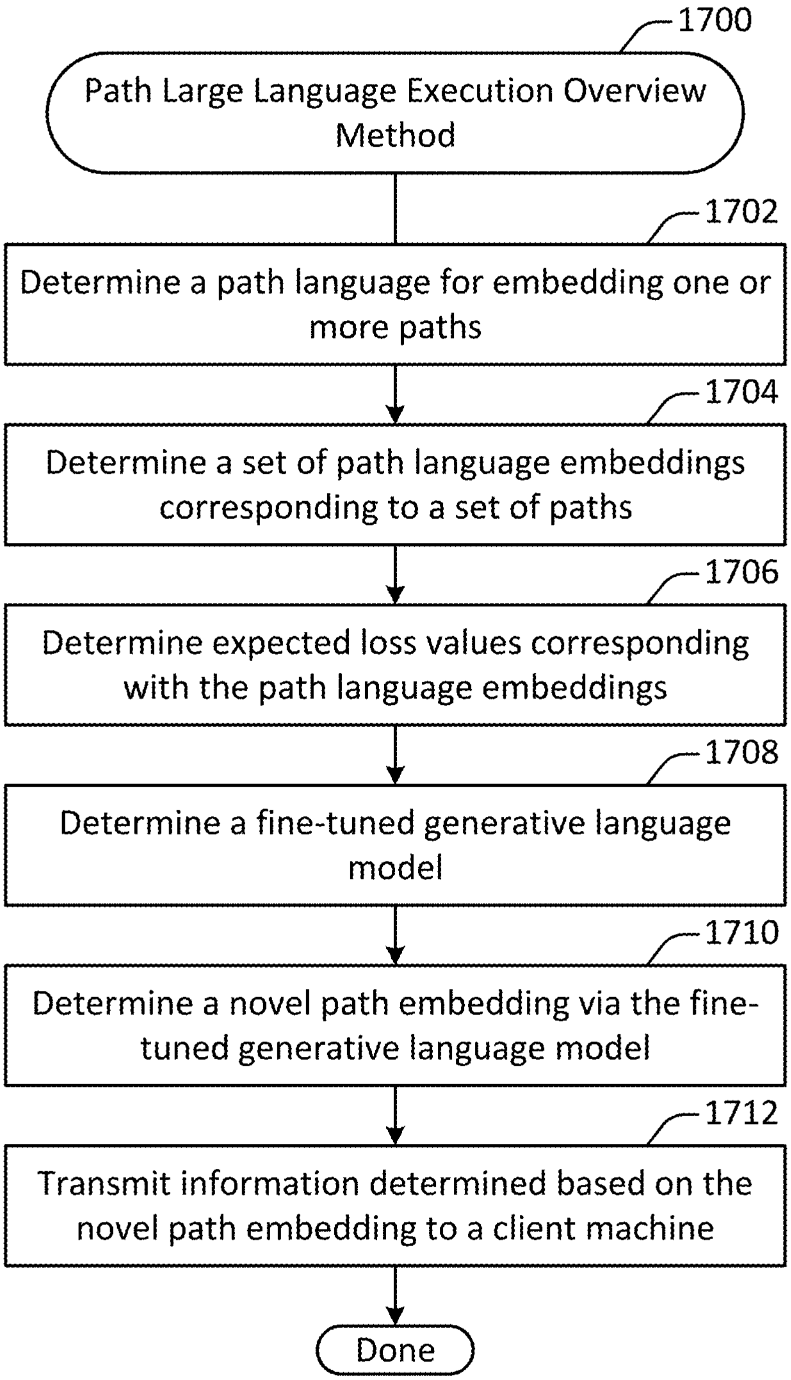
FIG. 17 illustrates an overview method for executing a path large language model, performed in accordance with one or more embodiments.

FIG. 17 illustrates an overview method 1700 for executing a path large language model, performed in accordance with one or more embodiments. According to various embodiments, the method 1700 may be performed at any suitable computing device, such as one or more of the computing devices shown herein.

A path language for embedding one or more paths is determined at 1702. Additional details regarding the determination of a path language are discussed with respect to the method 2000 shown in FIG. 20.

A set of path language embeddings corresponding to a set of paths are determined at 1704. Additional details regarding the determination of path language embeddings are discussed with respect to the method 2100 shown in FIG. 21.

Expected loss values corresponding with the path language embeddings are determined at 1706. Additional details regarding the determination of the expected loss values are discussed with respect to the method 2200 shown in FIG. 22.

A fine-tuned generative language model is determined at 1708. Additional details regarding the fine-tuning of a generative language model are discussed with respect to the method 2300 shown in FIG. 23.

According to various embodiments, as discussed herein, a generative language model need not necessarily be fine-tuned. Alternatively, or additionally, a standard generative language model may be taught to employ the PLLM within a prompt. For instance, the prompt may include a definition of the PLLM along with one or more examples of how to use the PLLM.

A novel path embedding is determined via the fine-tuned generative language model at 1710. Information determined based on the novel path embedding is transmitted to the client machine at 1712. According to various embodiments, novel path embeddings and information determined based on novel path embeddings may be determined in any of various contexts.

In some embodiments, a novel path may be generated so as to identify a new path through an embedded environment, for instance to solve a robotics problem. As another example, a novel path may be generated to aid in the design or alterative of an embedded environment. Additional details regarding such applications are discussed with respect to the method 2400 shown in FIG. 24.

In some embodiments, the capabilities of an environment part can be dynamically controlled by either a human operator or an AI system during different gameplay sessions, task executions, or iterations of the environment. This adaptive control mechanism allows for versatile interactions and task management, as the behavior of environment parts can be modified based on the specific requirements or conditions of the run.

In some embodiments, when a human operator controls an environment part, they can directly influence its capabilities and behavior. Such control may potentially introduce unique and unpredictable elements into the environment. Conversely, when an AI system controls an environment part, it can dictate the part's behavior based on predefined rules, learned behaviors, or adaptive algorithms. In this way, the AI may act to ensure consistent and/or optimized performance, and/or act to further some other goal such as engagement.

In some embodiments, the same environment part may be controlled by a human operator in one run and an AI system in another. This variation may facilitate the introduction of a range of dynamics and interactions into the environment. The PLLM may account for and learn from these variable control dynamics, enhancing its ability to manage and predict paths within the environment.

In some implementations, the PLLM may learn from the paths of both human-controlled and AI-controlled avatars within the environment. This concurrent learning mechanism may allow the PLLM to assimilate a broad range of experiences and strategies, enhancing its ability to predict and manage paths within the environment.

In some embodiments, the PLLM may be directed to learn from human-controlled paths, assimilating the unique strategies, creativity, and unpredictability that human players can introduce. Concurrently, the PLLM can also learn from AI-controlled paths, assimilating the consistent, optimized, and rule-based strategies that AI systems can introduce.

In some embodiments, the control of environment parts by AI systems can be further diversified. For instance, in some configurations a single AI system may control all AI-controlled parts. Alternatively, different AI-controlled parts may be managed by distinct AI system. Such variation may provide for a range of AI strategies and behaviors to be introduced into the environment, further enhancing the diversity of interactions and paths that the PLLM can learn from.

According to various embodiments, in scenarios where multiple human operators and/or multiple AI systems are involved in controlling various parts of the environment, the PLLM may manage this complex and dynamic environment effectively. For instance, the PLLM may learn from the broad range of interactions and strategies introduced by the multiple controllers, thereby enhancing its path prediction and management capabilities.

In some embodiments, initializing the PLLM may involve an independent provision of a finite set of environment parts. Provisioning an environment part may involve specifying its shape, function, utility, and/or other characteristics. The shape of an environment part may include a specification of its physical or virtual form and structure, while the function or utility of an environment part may identify its operational capabilities within the environment. The independent initialization of environment parts may allow the PLLM to fully comprehend the embodied environment in which it operates. In this way, the model may be configured to accurately interpret interactions with a part and effectively predict and manage the avatar's paths within the environment.

According to various embodiments, a static starting analysis can be performed as part of the initial construction of the Path Large Language Model (PLLM). The static starting analysis may involve identifying some or all of the possible paths that an avatar can take within the environment, for instance by considering factors such as the speed and movement capabilities of environment parts.

In some embodiments, the static starting analysis can be used to account for physical or virtual constraints within the environment. For instance, some interactions may not be possible initially due to the speed or position of certain environment parts. If two parts cannot get close enough within a certain timeframe, the paths requiring such interaction can be disregarded in the initial analysis. Thus, the static starting analysis may provide a foundational understanding of the feasible paths within the environment. By identifying feasible paths at the outset, the static starting analysis may allow the PLLM to focus on viable paths from the onset, enhancing the efficiency of its learning process and the effectiveness of its path prediction and management capabilities.

In some embodiments, a novel path may be generated so as to provide guidance or control instructions for causing an avatar to navigate an embedded environment. Additional details regarding such applications are discussed with respect to the method 2500 shown in FIG. 25.

According to various embodiments, the path large language model may be applied in any of a variety of ways. For example, in an educational setting, personalized feedback and suggestions may be provided to users for improving their understanding of complex topics or skills. As another example, in a commercial setting, customized shopping experiences may be created by learning customer preferences through interaction history and suggesting products or services accordingly. As yet another example, in a virtual reality (VR) and/or augmented reality (AR) application, user engagement and interaction may be enhanced via application of the path language in a simulated environment. As still another example, multi-avatar collaboration may be supported by allowing multiple avatars to work in unison by learning from each other's interaction paths, thus improving overall system performance.

Figure 18:
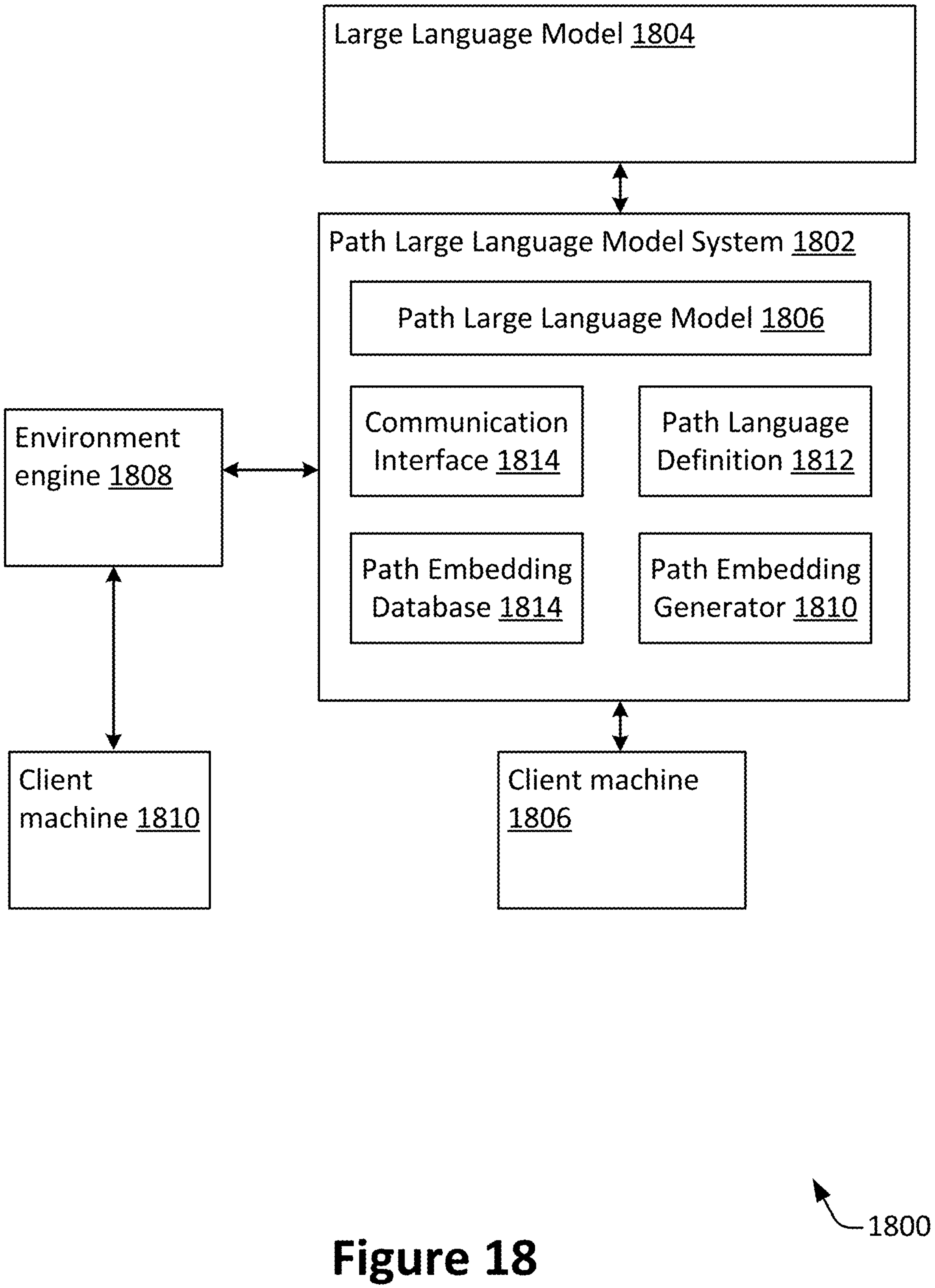
FIG. 18 illustrates a path large language model ecosystem, configured in accordance with one or more embodiments.

FIG. 18 illustrates a path large language model ecosystem 1800, configured in accordance with one or more embodiments. The path large language model ecosystem 1800 is an alternative configuration and/or alternative view of the path large language model ecosystem 200 shown in FIG. 2. The path large language model ecosystem 1800 includes a path large language model system 1802 in communication with a large language model 1804 and a client machine 1806 via a communication interface 1814. The path large language model system 1802 may also be in communication with an environment engine 1808, which may in turn communicate with a client machine 1810 via the communication interface 1814.

According to various embodiments, the environment engine 1808 may provide an embedded environment to the client machine 1810. For instance, the environment engine 1808 may provide an environment such as a game, a metaverse, or another simulated system. Alternatively, the environment engine 1808 may correspond to a physical environment as sensed by a robot.

According to various embodiments, the large language model 1804 may be any suitable large language model. For example, the large language model 1804 may be Google Bard, ChatGPT, or another such model.

In some embodiments, the large language model 1804 may be multimodal. A multimodal model supports input of more than one type. For example, a multimodal model may support input via a combination of video and text.

The path large language model system 1802 includes a path large language model 1806. In some implementations, the path large language model 1806 may be trained via fine-tuning as discussed with respect to FIG. 19 and FIG. 23.

The path large language model system 1802 also includes a path language definition 1812. In some embodiments, the path language definition 1812 may be determined as discussed with respect to the method 2000 shown in FIG. 20.

The path large language model system 1802 also includes a path generator 1810 configured to generate path embeddings, which may then be stored in the path embedding database 1814. The path generator 1810 may generate path embeddings as discussed with respect to the method 2100 shown in FIG. 21.

Figure 19:
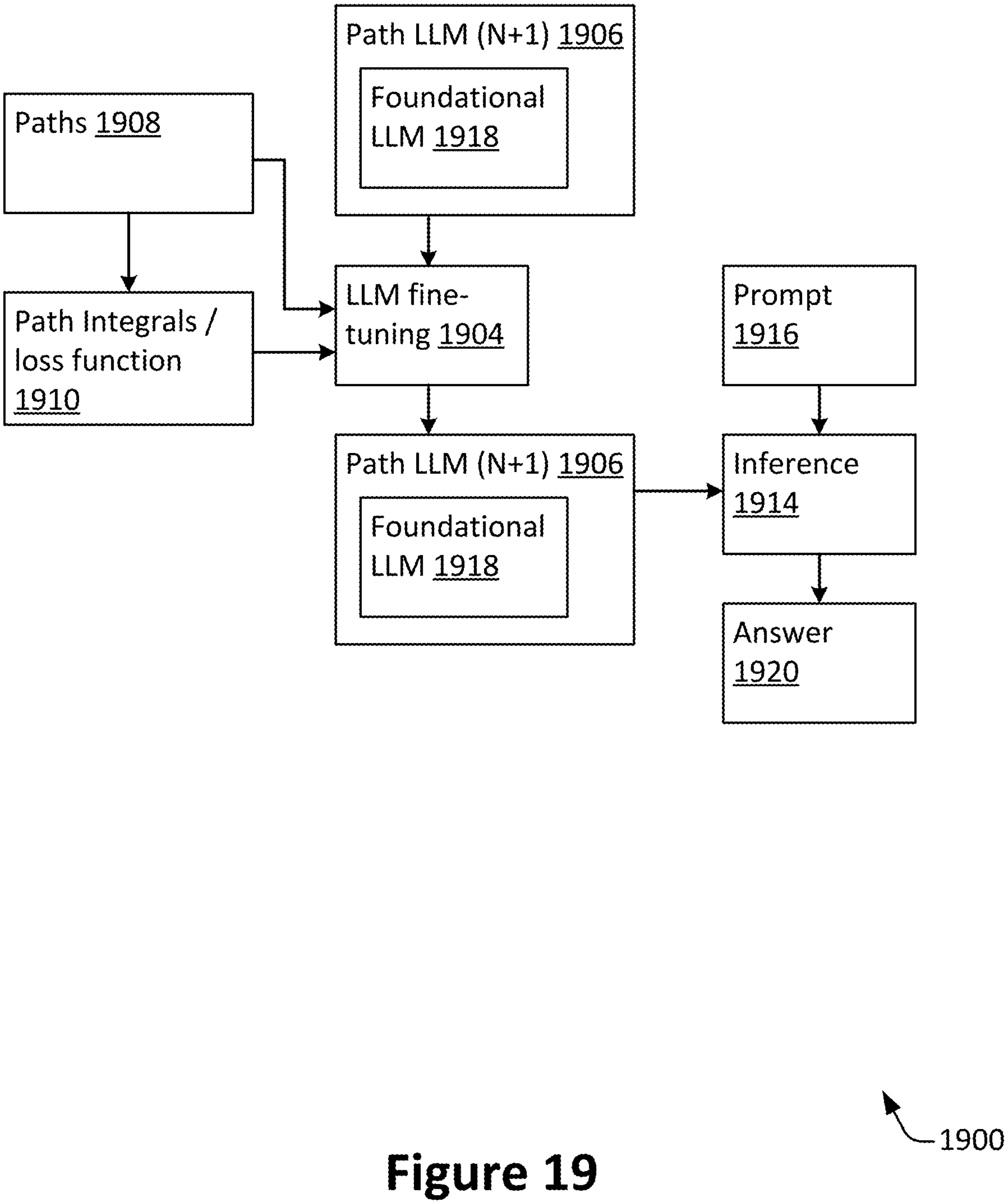
FIG. 19 illustrates a flow diagram of a process flow, performed in accordance with one or more embodiments.

FIG. 19 illustrates a flow diagram of a process flow 1900, performed in accordance with one or more embodiments. In the process flow 1900, a path LLM is determined by a fine-tuning process that is based on one or more paths. The paths 1908 are used to generate training data to fine-tune the path LLM at 1904. The paths 1908 are also used to determine a loss function by computing Feynman path integrals over path-level loss functions at 1910. The loss function is used to determine error values from the output of the path LLM during the fine-tuning at 1904. The fine-tuning yields an updated path LLM at 1906.

In some embodiments, the loss function may simply reflect the path probabilities. That is, the path large language model may be penalized for producing paths of low probabilities. Alternatively, the path probabilities may be used as an input for a more complex loss function. For instance, path probabilities may be weighted based on user engagement.

In this way, the large language model may be tuned to generate paths having higher probability for higher engagement rather than paths that have the overall highest probability.

In particular embodiments, different versions of a path language model may be tuned using different loss functions to accomplish different purposes. For example, in the robotics space, the loss function may prioritize the path having the highest chance of achieving a goal, subject to the constraint of not injuring a person or damaging the robot. As another example, in the gaming space, the loss function may prioritize user engagement, user retention, or some combination thereof. User engagement may be defined as, for instance, an amount of time a user spends in an environment. User retention may be defined as, for instance, a number of times a user enters an environment.

In some embodiments, the path LLM 1918 may be fine-tuned by using a low-rank adaptation (LoRA) process. Additional details regarding path LLM tuning are discussed with respect to the method 2300 shown in FIG. 23.

According to various embodiments, the path LLM 1918 may be iteratively tuned periodically, for instance when a sufficient amount of new path data is received. In this way, the path language is dynamic and evolves over time through continuous learning from new paths taken by the avatar. As new interactions occur, the PLLM also updates and refines the path language, incorporating the learned information to improve its decision-making capabilities. Additional details regarding path language refinement are discussed with respect to the method 2000 shown in FIG. 20.

According to various embodiments, this adaptability enables the PLLM to continuously optimize the avatar's interactions within the environment, ensuring the avatar's actions align increasingly with the desired objectives. In case the avatar is also controlled by a human, then PLLM can help to provide highly effective inputs and conversations.

After the PLLM has been trained, then it may be used for inference at 1914. During the inference phase, a prompt is provided at 1916. The prompt is pre-processed via the PLLM and then provided to the foundational LLM at 1918. The foundational LLM 1918 then produces the answer 1920.

Figure 20:
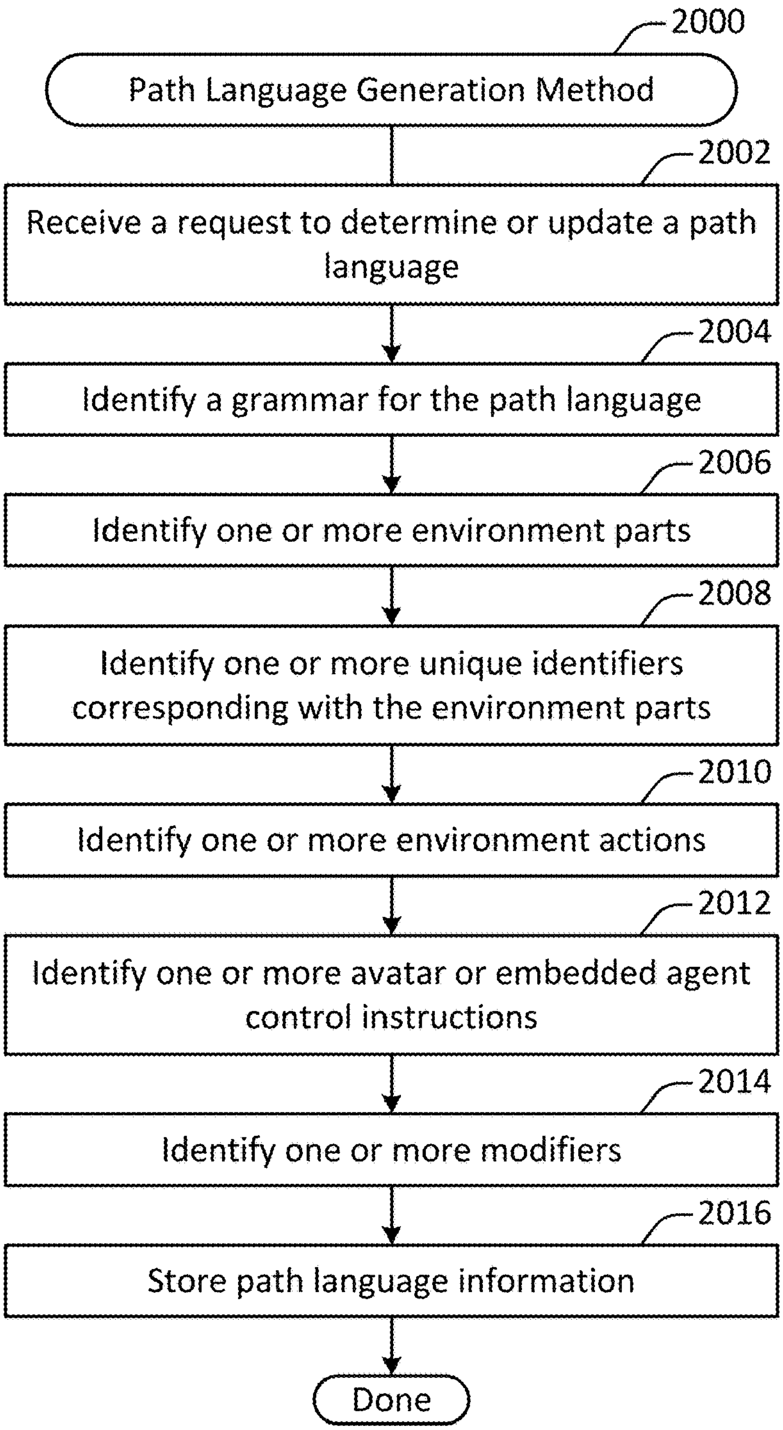
FIG. 20 illustrates a method of determining a path language, performed in accordance with one or more embodiments.

FIG. 20 illustrates a method 2000 of determining a path language, performed in accordance with one or more embodiments. According to various embodiments, the method 2000 may be performed at any suitable computing device, such as one or more of the computing device shown herein.

A request to determine or update a path language is received at 2002. In some embodiments, the request may identify an existing path language. Alternatively, an entirely new path language may be created. The request may be received at a system such as the system 1802 shown in FIG. 18.

A grammar for the path language is identified at 2004. In some embodiments, the grammar may be specified based on user input. Alternatively, or additionally, one or more configuration parameters may be consulted. The grammar may identify relationships between various parts of speech, and may be used to form sentences based on these parts of speech. The grammar may identify some number of different sentence types.

For example, one sentence type may be of the form "AVATAR VERB NOUN [OPTIONAL ADVERB]" and corresponds to interactions between an avatar and other elements of an embedded environment. In this example, NOUN corresponds to a part of the environment, while VERB corresponds to the action. AVATAR identifies that avatar and OPTIONAL ADVERB corresponds to an optional modifier such as a time period over which the action occurs.

As another example, another sentence type may be of the form "AVATAR VERB NOUN [OPTIONAL ADVERB]" and correspond to a control instruction issued by a human or autonomous control process. In this example, NOUN corresponds to the part of the environment at which the avatar is located, VERB identifies the control instruction, and OPTIONAL ADVERB identifies a modifier such as a time period over which the control instruction was issued.

As yet another example, one sentence type may be of the form "NOUN1 VERB NOUN2 [OPTIONAL ADVERB]" and corresponds to interactions between an elements of an embedded environment and other elements of an embedded environment. In this example, NOUN1 and NOUN2 correspond to parts of the environment, while VERB corresponds to the action. OPTIONAL ADVERB corresponds to an optional modifier such as a time period over which the action occurs.

As another example, another sentence type may be of the form "AVATAR SAID SENTENCE" and correspond to a text communication issued by a human or autonomous control process. In this example, SENTENCE can refer to parts of the environment. The foundational LLM makes it possible for PLLM to understand these sentences even if they are general conversation (e.g., a person's thoughts regarding the AVATAR's movement).

One or more environment parts are identified at 2006. According to various embodiments, an environment part may correspond to any element within one or more embedded environments. For example, an environment part may correspond to a platform, a door, a table, a two-dimensional plane, a three-dimensional region, a volume of liquid, a hazard, a ceiling, a wall, a room, or any other element that may be represented within an embedded environment.

In some embodiments, an environment part may be identified by analyzing environment specification and/or event information. For example, an environment may include an object library that uniquely identifies the objects within the environment. As another example, an environment may emit events while the environment is being executed. An event may identify one or more elements within the environment that are related to the event. Alternatively, an environment part may be identified based on user input.

One or more unique identifiers corresponding with the environment parts are identified at 2008. According to various embodiments, any suitable technique may be used to create a unique identifier for an environment part. As one example, the name of an environment in which the environment part occurs may be combined with a name corresponding to the environment part type and, optionally, a unique number. For instance, a room in a metaverse environment may be uniquely identified as "METAVERSE-ROOM-152".

One or more environment actions are identified at 2010. One or more avatar control instructions are identified at 2012. One or more modifiers are identified at 2014. According to various embodiments, the environment actions, embedded avatar control instructions, and/or modifiers may be identified in a manner similar to that of the identification of environment parts at 2006.

Path language information is stored at 2016. In some embodiments, the path language information may be stored at the system 202 so that the path language may be used to determine and decode path language embeddings.

Figure 21:
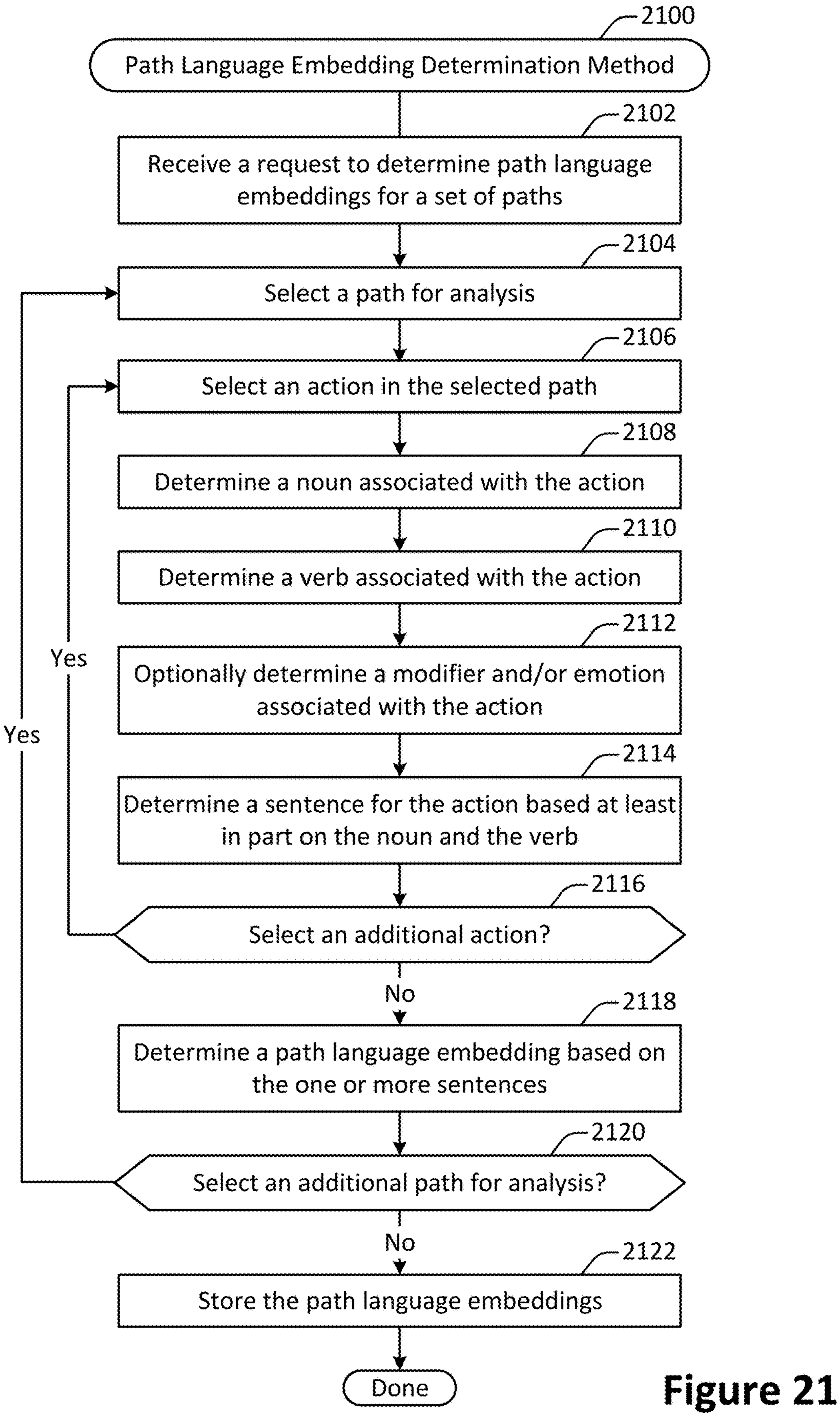
FIG. 21 illustrates a method of determining a path embedding for one or more paths, performed in accordance with one or more embodiments.

FIG. 21 illustrates a method 2100 of determining a path embedding for one or more paths, performed in accordance with one or more embodiments. According to various embodiments, the method 2100 may be performed at any suitable computing device, such as one or more of the computing device shown herein.

A request to determine path language embeddings for a set of paths is determined at 2102. According to various embodiments, the request may be received in any of variety of contexts. Such contexts may include, but are not limited to: tuning a large language model, developing a new embedded environment, changing an existing embedded environment, determining a novel path for navigating an embedded environment, and providing guidance for navigating an embedded environment.

A path is selected for analysis at 2104. According to various embodiments, paths may be selected in any suitable order, in sequence or in parallel. In some embodiments, a path may be specified via event data. For instance, an embedded environment may emit events characterizing actions, parts, and other aspects of the embedded environment.

In some embodiments, a path may be specified via image data. For instance, video or still images of an avatar or other aspects of an embedded environment may be recorded and then analyzed to determine information related to actions.

An action in the selected path is selected at 2106. In some embodiments, actions may be selected sequentially. Alternatively, actions may be selected in a different order. For instance, portions of the selected path may be analyzed in parallel. Depending on the application, an action may correspond with a period of time, one or more events reflected in event data, or some combination thereof.

A noun associated with the action is determined at 2108. In some embodiments, the noun may correspond to a part within the environment. For instance, the noun may correspond to a wall, a platform, a region of water, or some other such virtual object. Alternatively, a noun may correspond to an avatar or an embedded avatar.

A verb associated with the action is determined at 2110. In some embodiments, the verb may correspond to an interaction between an avatar and some part or parts in the environment. Alternatively, the verb may correspond to an instruction causing the avatar to perform an action, such as movement, within the embedded environment.

A modifier and/or emotion associated with the action is optionally determined at 2112. In some embodiments, the modifier may be any adverb, adjective, or other such part of speech that provides contextual information about a verb performed by or with respect to a noun. For instance, the modifier may be a length of time that the action was performed.

In some embodiments, a modifier and/or emotion may include a modifier as reflected by an emoji. For instance, a verb associated with movement may be modified by an emoji representing an emotion such as sadness, happiness, or anger.

A sentence for the action is determined based at least in part on the noun and the verb. In some embodiments, the sentence may be determined based on a grammar associated with the path language. For example, the path language may include one type of sentence describing interactions between parts of the environment and the avatar. Such sentences may include a noun characterizing the part of the environment interacting with the avatar, a verb characterizing the nature of the interaction, and an optional modifier specifying the length of the interaction. An example of a sentence generated in accordance with this sentence type may be: "The avatar was hit by the spike S-2902 for two seconds." In this example, "the spike S-2902" is the noun, "was hit by" is the verb", and "for two seconds" is the modifier.

As another example, the path language may include another type of sentence describing a control interaction associated with the embedded avatar. The control interaction may be based on an instruction determined at least in part based on user input. Alternatively, or additionally, the control interaction may be based on an instruction determined at least in part based on an autonomous control process or some other machine-based control technique. Such a sentence may include a noun identifying the avatar, a verb characterizing the control interaction, and optionally a modifier characterizing the length of the control action. An example of a sentence generated in accordance with this sentence type may be: "The avatar moved forward from platform-3123 for 10 seconds." In this example, the noun is "platform-3123", "moved forward" is the verb, and "for 10 seconds" is the modifier.

As still another example, the path language may include another type of sentence describing input by or to a human (e.g., a human controlling an avatar) or other controller of the system as a specific time. Such inputs may be provided via a chat environment where the player is in conversation with other parts in the same embodiment. For example, in a game environment, after an avatar captures 20 coins in a row, a non-playing character in the scene may say: "You nailed 20 coins in a row. This is rare." As another example, an avatar controller may be provided with a hint at a particular time. As the result of such communication, a player's engagement and/or success may increase.

According to various embodiments, a structured grammar allows for precise and detailed representation of the avatar's interactions, facilitating effective analysis and decision-making. The examples discussed above may be expanded to support more complex grammars. For example, an optional adjective can be used to identify the capabilities of the specific avatar. As another example, a sentence may support more than one noun, avatar, and/or modifier. As yet another example, a sentence may include more complex structures, such as objects or subordinate clauses. For instance, as discussed above, sentences describing actions can be combined with non-structured chat between and among the avatar, an avatar controller, and the environment parts.

A determination is made at 2116 as to whether to select an additional action. In some embodiments, additional actions may continue to be selected until the end of the path is reached. Alternatively, a different terminating condition may be used.

If it is determined not to select an additional action, then at 2118 a path language embedding is determined based on the one or more sentences. In some embodiments, the path language embedding may include the sentences determined at 2114, concatenated into a body of text.

A determination is made at 2120 as to whether to select an additional path for analysis. In some embodiments, additional paths may continue to be selected until all paths have been analyzed. Alternatively, a different terminating condition may be used.

If it is determined not to select an additional path for analysis, then at 2122 the path language embeddings are stored. The path language embeddings may be stored on any suitable storage device for use in any of a variety of applications as discussed herein. For instance, the path language embeddings may be stored in a database.

In particular embodiments, any or all of a variety of additional information may be stored in conjunction with the path language embeddings. For example, the database may store whether a given path was successful or not. As another example, the database may store a score value or other such indicator of performance. As yet another example, the database may store an indication of user engagement, such as the length of time spent in the environment. As still another example, the database may store an indication of user retention, such as the number of times a user returned to the environment. Such types of information may be used, for instance, to inform a loss function as discussed with respect to FIGS. 4 and 20.

Figure 22:
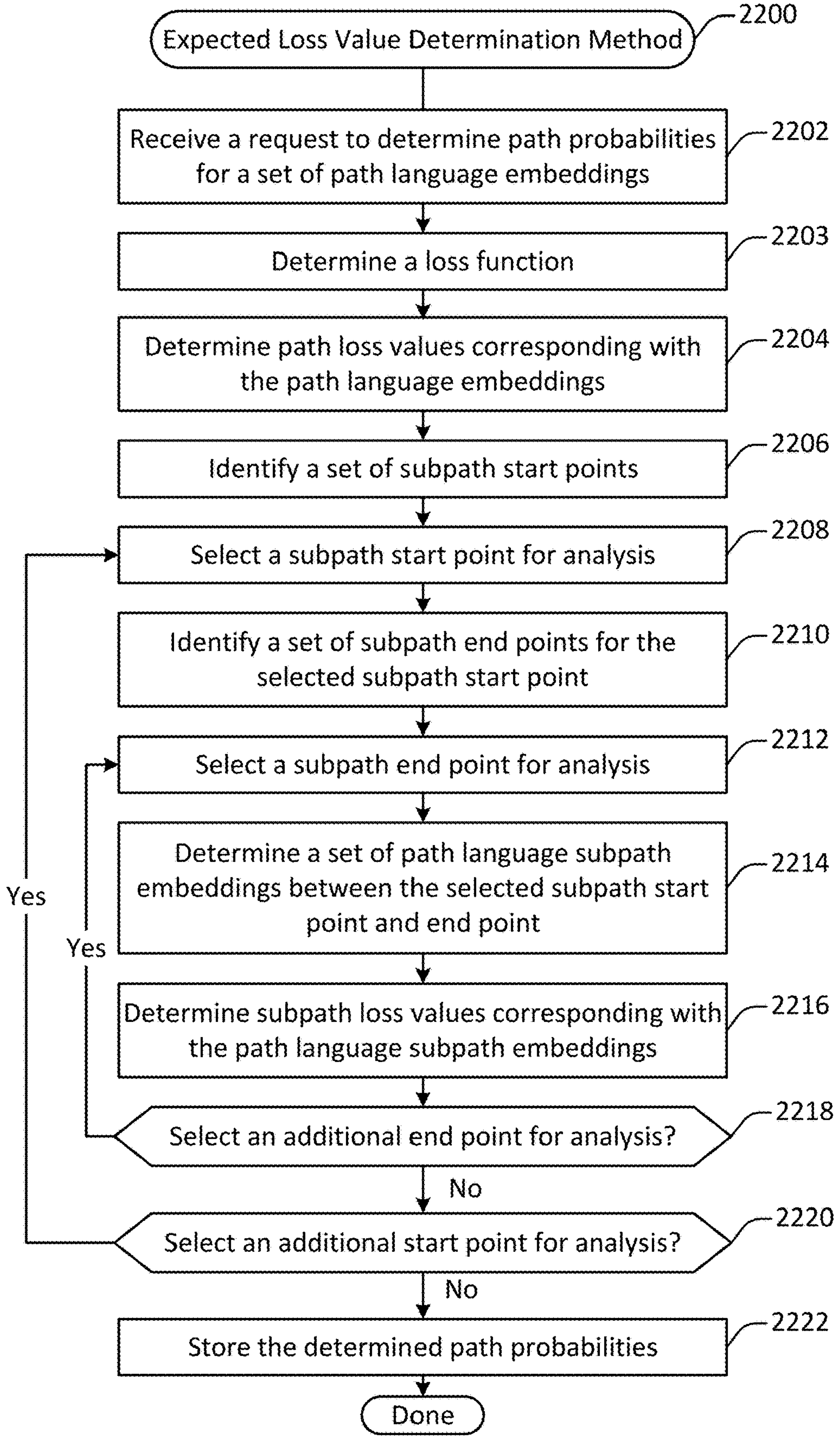
FIG. 22 illustrates a method of determining expected loss values for one or more paths, performed in accordance with one or more embodiments.

FIG. 22 illustrates a method 2200 of determining expected loss values for one or more paths, performed in accordance with one or more embodiments. According to various embodiments, the method 2200 may be performed at any suitable computing device, such as one or more of the computing device shown herein.

A request to determine path probabilities for a set of path language embeddings is determined at 2202. According to various embodiments, the request may be received when a large language model is initially tuned for the purpose of analyzing observed path language embeddings and generating novel path language embeddings. Alternatively, or additionally, an existing set of path probabilities may be updated based on newly observed paths.

A loss function is determined at 2203. According to various embodiments, the particular formulation of the loss function may depend on the use case. For example, a loss function may be formulated so as to penalize disengagement, non-retention, low-probability paths, failed paths, or some combination thereof.

Path loss values corresponding with the path language embeddings are determined at 2204. In some embodiments, the path loss values may be determined by computing a Feynman Path Integral of the loss function over the paths. For example, consider the following equation from quantum mechanics:

$$Z = \int D[x] e^{\frac{iS[x]}{h}}$$

In this equation, Z is the partition function, or the "sum over all histories", that is used to calculate observable quantities. The integral ∫D[x] represents an integral over all possible paths x(t) that the system can take. S[x] is the action, which is an integral over time from the initial to the final state of the Lagrangian of the system, L(x, dx/dt), where x is the position and dx/dt is the velocity. That is, S[x]=∫_t1^t2 L(x(t), dx(t)/dt) dt. Then, h is the reduced Planck's constant. The exponential term, exp(iS[x]/ℏ), provides a weight for each path, which is complex and depends on the action S[x].

In statistical mechanics, Feynman's path integral formulation takes a form that is very similar to the original quantum mechanical version, but with a significant difference: the factor of i (the imaginary unit) in the action's exponent is replaced with −1, changing the nature of the integral from a quantum superposition to a statistical sum. The Feynman path integral in statistical mechanics can then be used to calculate a partition function, for instance to compute a statistical average. The partition function Z in statistical mechanics is given by:

$$Z = \int D[x] e^{\frac{-S[x]}{kT}}$$

In this formulation, S[x] is again the action associated with the path x, while k is Boltzmann's constant, T is the temperature, and D[x] represents an integral over all possible paths.

In some embodiments, in the context of a PLLM, the Feynman path integral (or its statistical mechanics variant) may be used to calculate a sum over all paths (plays), where each path is weighted by the exponential of the negative of its "action" or loss function. For instance, consider the example of a loss function defined based on total churn rate. In this case, the Feynman path integral itself would provide a measure of the total churn over all paths in the game, taking into account the probability of each path.

As an illustrative example, let P(p) denote the probability of path p which can be estimated from the play data and let S(p) denote the "action" of path, which is the loss function (i.e., the total churn rate over the path, in this example). Then, the Feynman path integral approximation in this context and using established computational methods like Monte Carlo would take a discrete form as following:

$$I = \sum pP(p)e^{-S(p)}$$

In this equation, the sum over p is over all possible (e.g., all observed) paths. The integral effectively gives a measure of the total loss (e.g., "churn") over all paths in the game, taking into account both the probability of each path and its loss. In the context of reinforcement learning, the system may seek to identify a move that reduces or minimizes this integral by finding a move that leads to paths with a high probability and low loss. That is, at each step the system may choose a move that minimizes (or approximately minimizes) the Feynman path integral over possible paths between the next (e.g., recommend) part position and the goal.

A set of subpath start points are identified at 2206. According to various embodiments, a subpath start point may be a part associated with the path language model. The subpath start points for an embedded environment may thus include some or all of the parts associated with that embedded environment.

In some embodiments, subpath start points may be identified by determining environment parts that are particularly significant. For example, subpath start points in a game may include key locations (e.g., the beginning or end of a level or stage), key rewards (e.g., coins), and/or key hazards (e.g., spike traps). As another example, subpath start points in a robotics context may include key locations in a physical environment. As yet another example, subpath start points in a metaverse context may include key virtual locations within the metaverse.

In some embodiments, one or more subpath start points may be identified based on user input. Alternatively, or additionally, one or more subpath start points may be identified by analyzing the path language embeddings. For instance, environment parts that seem to form key branching points in the path language embeddings may be selected as subpath start points.

A subpath start point is selected for analysis at 2208. According to various embodiments, subpath start points may be analyzed in any suitable order, in sequence or in parallel.

A set of subpath end points for the selected subpath start point are identified at 2210. According to various embodiments, the subpath end points may be identified in a manner similar to the identification of the subpath start points. Additionally, subpath end points may be restricted based on the observed path embeddings. For example, if the only paths from a subpath start point A to a prospective subpath end point B traverse at least one other subpath start point in between points A and B, then the prospective subpath end point B may be rejected as a subpath end point.

A subpath end point is selected for analysis at 2212. According to various embodiments, subpath end points may be analyzed in any suitable order, in sequence or in parallel.

A set of path language subpath embeddings between the select subpath start point and end point are determined at 2214. In some embodiments, the path language subpath embeddings may be determined by analyzing the path language embeddings identified in the request received at 2202 to identify portions of the path language embeddings that start at the selected subpath start point and end at the selected subpath end point.

Subpath loss values corresponding with the path language subpath embeddings are determined at 2216. According to various embodiments, the subpath loss values may be determined in a manner similar to the path loss values, as discussed with respect to operation 2204.

A determination is made at 2218 as to whether to select an additional end point for analysis. If it is determined not to select an additional end point for analysis, then a determination is made at 2220 as to whether to select an additional start point for analysis. According to various embodiments, additional start points and end points may continue to be selected until all suitable combinations identified have been analyzed.

If it is determined not to select an additional start point for analysis, then at 2222 the determined path probabilities are stored. In some embodiments, not all path probabilities and/or subpath probabilities may be stored or even computed. For example, to reduce computational complexity, statistically insignificant or highly improbable paths may be pruned, focusing computational resources on the most relevant and informative interactions.

In some embodiments, to ensure scalability and efficiency in complex environments, one or more optimization algorithms may be employed to streamline the calculation of path probabilities. For example, parallel processing techniques may be used to analyze multiple paths simultaneously, enhancing computational efficiency.

In some embodiments, the operations shown in FIG. 22 may be performed in an order different from that shown. For example, subpath probabilities may be computed first and then used to aid in the calculation of parent probabilities.

Figure 23:
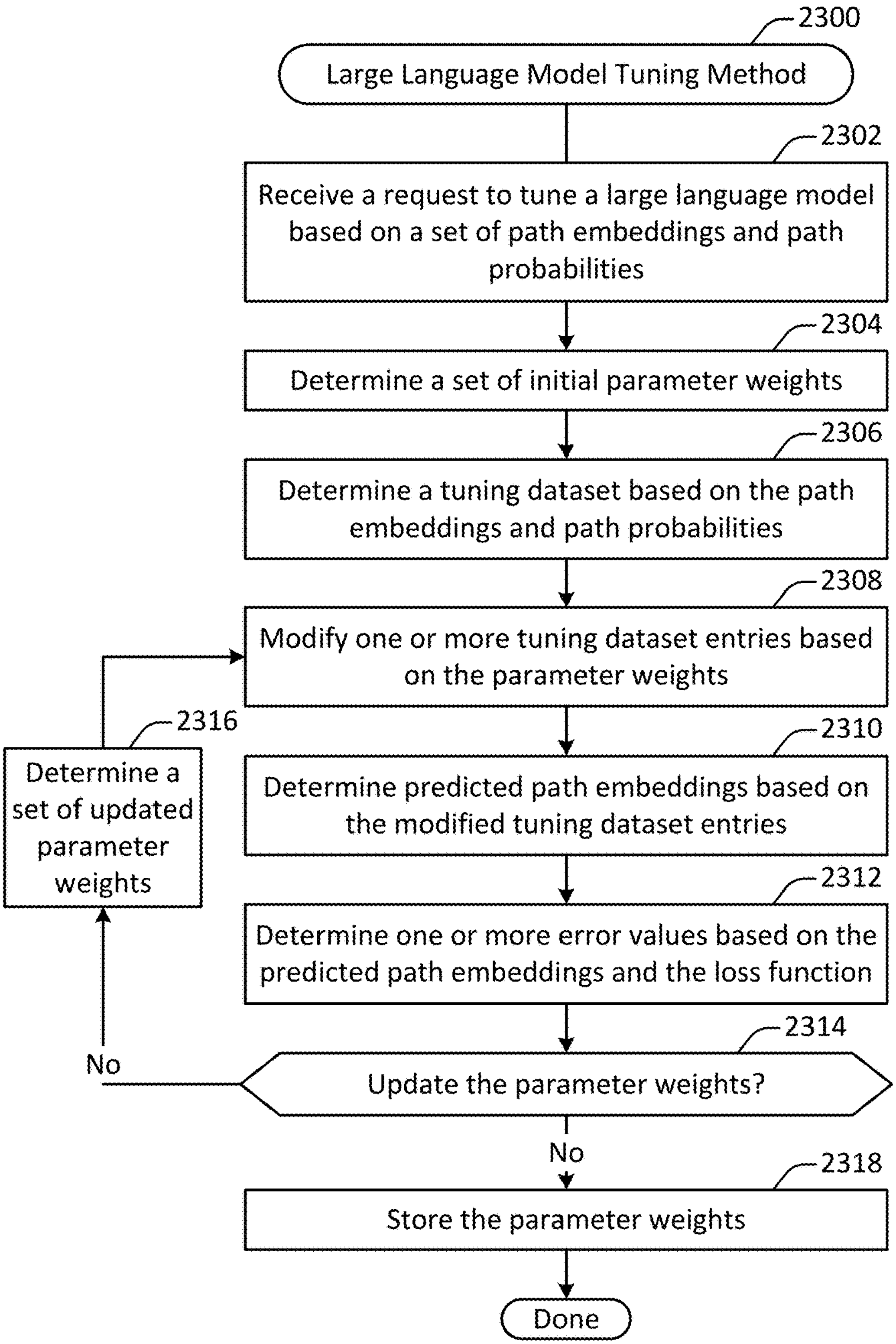
FIG. 23 illustrates a method of tuning a language model, performed in accordance with one or more embodiments.

FIG. 23 illustrates a method 2300 of tuning a language model, performed in accordance with one or more embodiments. According to various embodiments, the method 2300 may be performed at any suitable computing device, such as one or more of the computing device shown herein.

A request to tune a large language model based on a set of path embeddings and path probabilities is received at 2302. In some embodiments, the large language model may be initially tuned based on a set of path embeddings, and then may be periodically re-tuned as additional path embeddings are received. In particular embodiments, the tuning may involve a low-rank adaptation procedure.

A set of initial parameter weights is determined at 2304. In some embodiments, the parameter weights may be initialized using any suitable initialization procedure.

A tuning dataset is determined at 2306 based on the path embeddings and path probabilities. In some embodiments, the tuning dataset may be determined by generating training data observations that include some elements of the path embeddings with other elements removed. For instance, the large language model may be given the first X words from a path embedding and be asked to predict the next Y words.

As discussed with respect to the method 2200 shown in FIG. 22, expected loss values may be determined based at least in part on the path probabilities. These expected loss values may be included in the tuning dataset to penalize the large language model for generating paths having a high expected loss.

In some embodiments, the loss function may simply reflect the path probabilities. That is, the path large language model may be penalized for producing paths of low probabilities. Alternatively, as discussed above, the path probabilities may be used as an input for a more complex loss function. For instance, path probabilities may be weighted based on user engagement and/or user retention. In this way, the large language model may be tuned to generate paths having higher engagement and/or retention rather than paths that have the highest probability or the greatest chance of success.

One or more tuning dataset entries are modified at 2308 based on the parameter weights. In some embodiments, a tuning dataset entry may be embedded in the input parameter space for the large language model. The resulting embedding may then be multiplied by the parameter space.

Predicted path embeddings are determined based on the modified tuning dataset entries at 2310. In some embodiments, the predicted path embeddings may be determined by providing the modified tuning dataset entries to the large language model and then parsing the responses received from the large language model.

One or more error values are determined at 2312 based on the predicted path embeddings and the loss function. In some embodiments, the error values may be determined by penalizing the model for generating paths that produce high loss values under the loss function.

A determination is made at 2314 as to whether to update the parameter weights. In some embodiments, the determination may be made at least in part by determining whether an error value exceeds a designated threshold.

At 2316, if it is determined to update the parameter weights, then a set of updated parameter weights are determined. According to various embodiments, any suitable method (e.g., gradient descent) may be used to update the parameter weights.

At 2318, if it is determined not to update the parameter weights, then the parameter weights are stored. The parameter weights may then be used to pre-process any input provided to the large language model.

Figure 24:
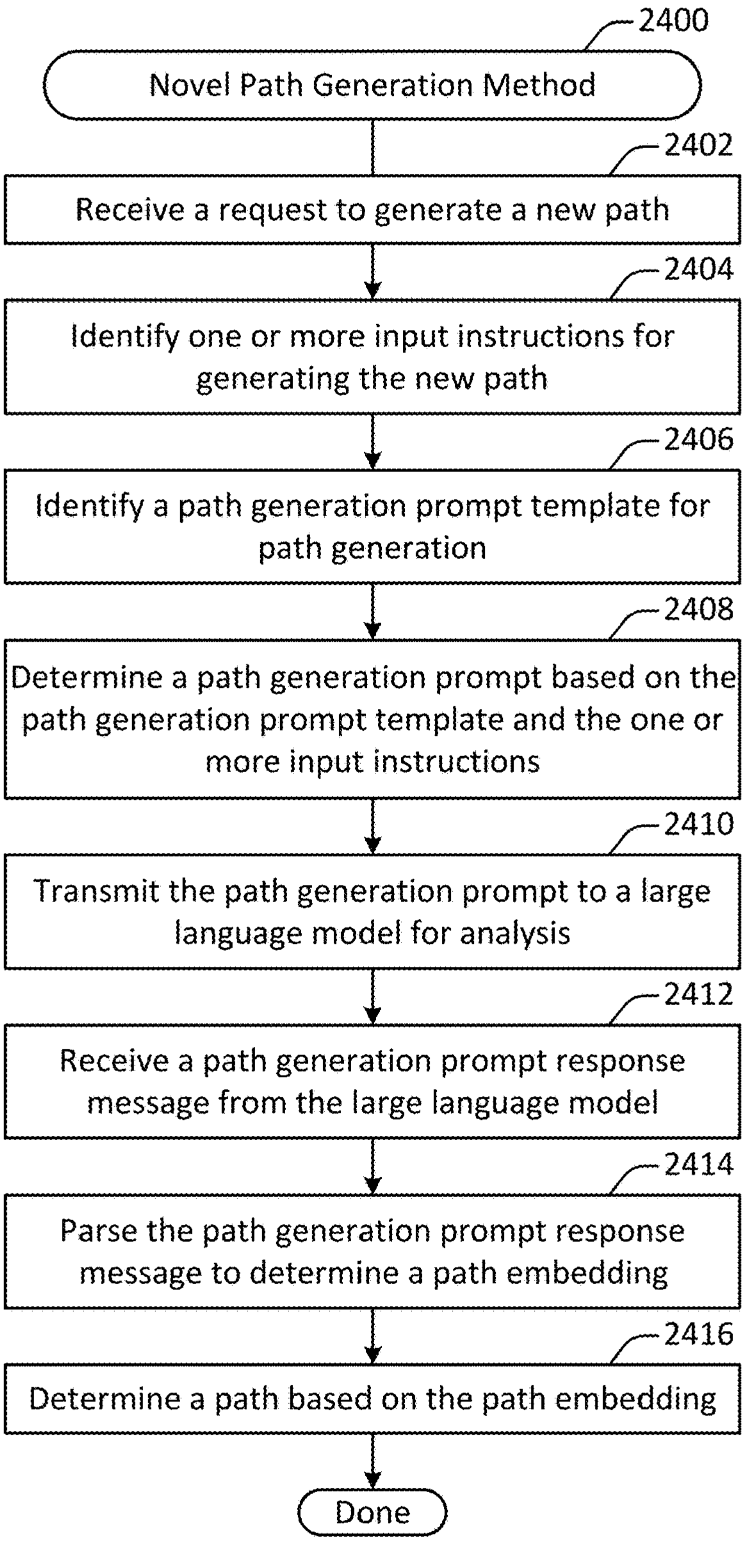
FIG. 24 illustrates a method of determining a novel path, performed in accordance with one or more embodiments.

FIG. 24 illustrates a method 2400 of determining a novel path, performed in accordance with one or more embodiments. According to various embodiments, the method 2400 may be performed at any suitable computing device, such as one or more of the computing device shown herein.

A request to generate a new path is received at 2402. In some embodiments, the request may be generated in the context of creating a new embedded environment. Alternatively, the request may be generated in the context of altering an existing embedded environment. As still another possibility, the request may be generated so as to provide instructions for an autonomous embedded avatar such as a robot in a physical environment or a non-playing character within a game or metaverse.

One or more input instructions for generating the new path are identified at 2404. In some embodiments, some or all of the input instructions may be provided in natural language. The input instructions may be provided via user input. Alternatively, or additionally, some or all of the input instructions may be retrieved from a storage system, where they are for instance stored as configuration parameters.

According to various embodiments, the nature of the input instructions may depend in part on the context in which the new path is requested. For example, the input instructions may instruct the tuned large language model to generate a path having a designated probability. As another example, the input instructions may instruct the tuned large language model to generate a path having particular characteristics. For instance, the path may involve a particular noun, verb, and/or modifier.

A path generation prompt template for path generation is identified at 2406. In some embodiments, the path generation prompt template may include natural language template instructions to the large language model instructing the large language model to generate a path. The path guidance prompt template may include one or more fillable portions in which information such as the input instructions and the prior path information may be embedded to create a prompt.

A path generation prompt is determined at 2408 based on the path generation prompt template and the one or more input instructions. In some embodiments, the path generation prompt may be determined by filling one or more fillable portions in the path generation prompt template with the input instructions.

The path generation prompt is transmitted to a large language model for analysis at 2410. A path generation prompt message is received from the large language model at 2412.

The path generation prompt response message is parsed at 2414 to determine a path embedding. In some embodiments, parsing the path generation prompt response message may involve extracting a portion of the prompt that includes a path embedding. The path embedding may identify, for instance, one or more sentences expressed in the path large language model grammar.

A path is determined at 2416 based on the path embedding. According to various embodiments, the way in which the path is determined at 2416 may vary based on the context in which the novel path is generated. For example, if the novel path is generated in the context of a robotics application, then the novel path may be generated by translating from the path embedding into one or more instructions interpretable by a controller device at a robot. As another example, if the novel path is generated in the context of environment design, then the novel path may be translated into environment components, events, or other such objects interpretable by an environment engine supporting the design or execution of the environment.

Figure 25:
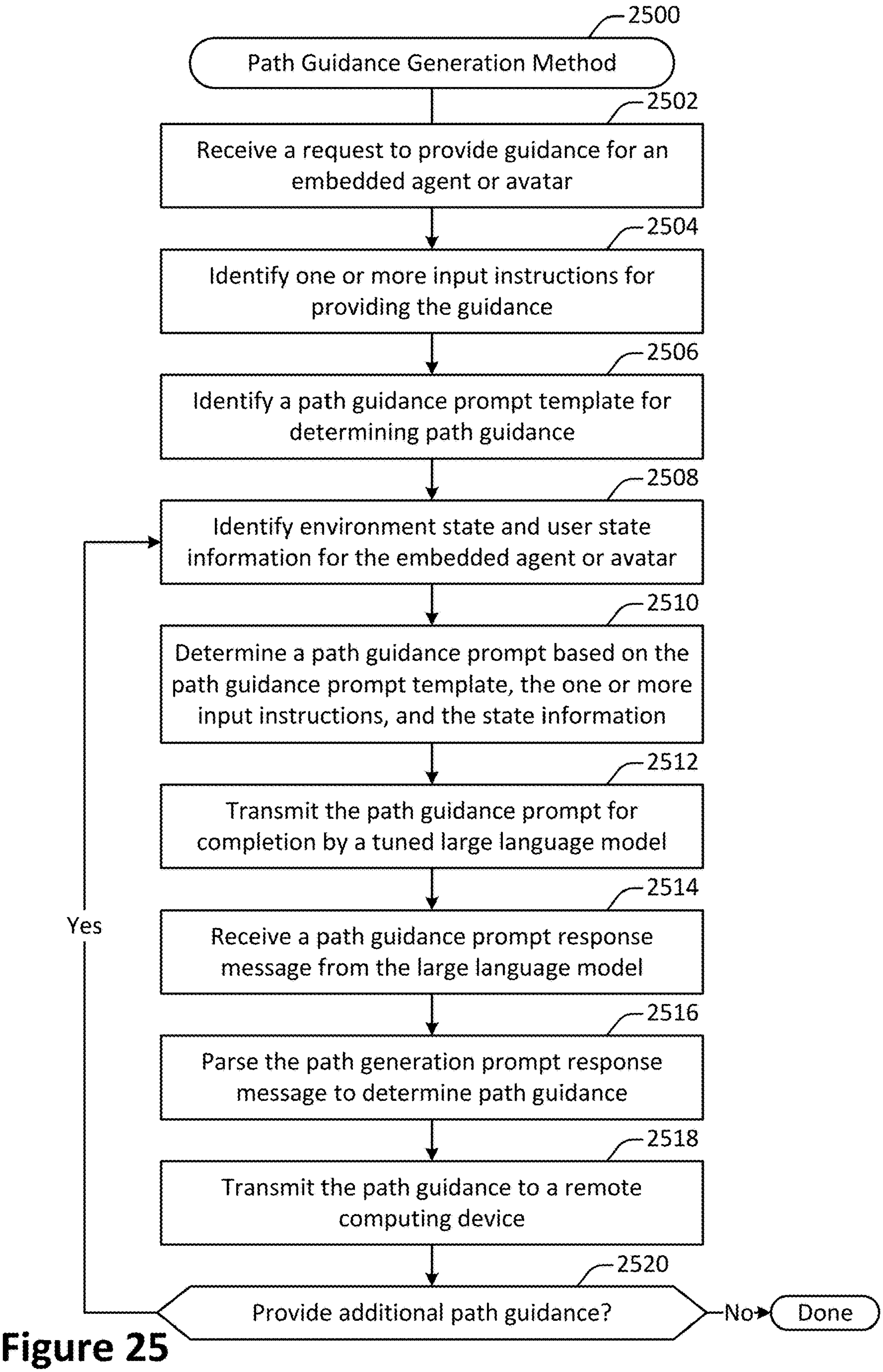
FIG. 25 illustrates a method of determining path guidance, performed in accordance with one or more embodiments.

FIG. 25 illustrates a method 2500 of determining path guidance, performed in accordance with one or more embodiments. According to various embodiments, the method 2500 may be performed at any suitable computing device, such as one or more of the computing devices shown herein.

In some embodiments, the method 2500 may be used for training a human or autonomous controller of an avatar. The probabilities computed using the Feynman Path Integral concept may serve as the foundation for formulating a reward function within the PLLM for reinforcement learning. This reward function represents the success rate or objectives achieved by the avatar. By optimizing interactions based on this reward function, the PLLM guides the avatar through the environment, actively searching for the highest cumulative reward and improving its decision-making capabilities over time.

A request to provide guidance for an embedded avatar is received at 2502. In some embodiments, the request may be generated in the context of a game. For example, a user may provide user input indicating a request to receive guidance. As another example, guidance may be requested automatically based on some triggering condition. For instance, guidance may be requested when an avatar has repeatedly failed to overcome the same obstacle.

One or more input instructions for providing the guidance are identified at 2504. According to various embodiments, the one or more input instructions may be determined based on one or more configuration parameters. For example, in a "difficult" mode the one or more input instructions may instruct the language model to provide only a hint, while in an "easy" mode the one or more input instructions may instruct the language model to identify the best path.

A path guidance prompt template for determining path guidance is identified at 2506. In some embodiments, the path guidance prompt template may include natural language template instructions to the large language model instructing the large language model to generate guidance. The path guidance prompt template may include one or more fillable portions in which information such as the input instructions and the prior path information may be embedded to create a prompt.

Environment state and user state information for the embedded avatar is identified at 2508. In some embodiments, environment state may include any information characterizing the status or location of the embedded avatar. For instance, such information may include as a current environment part at which the avatar is located, a path traveled by the avatar to reach the current point in the embedded environment, and/or condition information associated with the avatar.

In some embodiments, user state information may characterize any information about the actor or autonomous system controlling the embedded avatar. For example, the user state information may characterize a user skill level, a user experience level, a user engagement level, a user retention level, or other such information.

A path guidance prompt is determined at 2510 based on the path guidance prompt template, the one or more input instructions, and the state information. In some embodiments, the path guidance prompt may be determined by filling one or more fillable portions in the path guidance prompt template with the input instructions and the state information.

At 2512, the path guidance prompt is transmitted for completion by a tuned large language model. A path guidance prompt response message is received from the tuned large language model at 2514.

The path generation prompt response message is parsed at 2516 to determine path guidance. In some embodiments, parsing the path generation prompt response message may involve extracting a portion of the prompt that includes a path embedding. The path embedding may identify, for instance, a suggested path that the actor controlling the avatar is advised to pursue. The path embedding may then be translated into information more immediately interpretable by an actor such as a human or an autonomous control process.

In some embodiments, parsing the path generation prompt response message may involve extracting information for providing one or more clues other than an explicit path. For instance, the completed prompt may include a natural language instruction to "Look around for another way through" rather than providing an explicit indication of a specific path to pursue.

The path guidance is transmitted to a remote computing device at 2518. In some embodiments, the path guidance may be sent as a message, sound (e.g., via text-to-speech) or graphic (e.g., an arrow) that is presented within the embedded environment.

A determination is made as to whether to provide additional path guidance at 2520. According to various embodiments, additional path guidance may continue to be provided until a terminating condition is met. For example, the avatar may overcome a designated obstacle. If additional path guidance is to be determined, then updated prior path information is determined at 2508, for instance based on one or more actions taken in response to the provided guidance.

Figure 26:
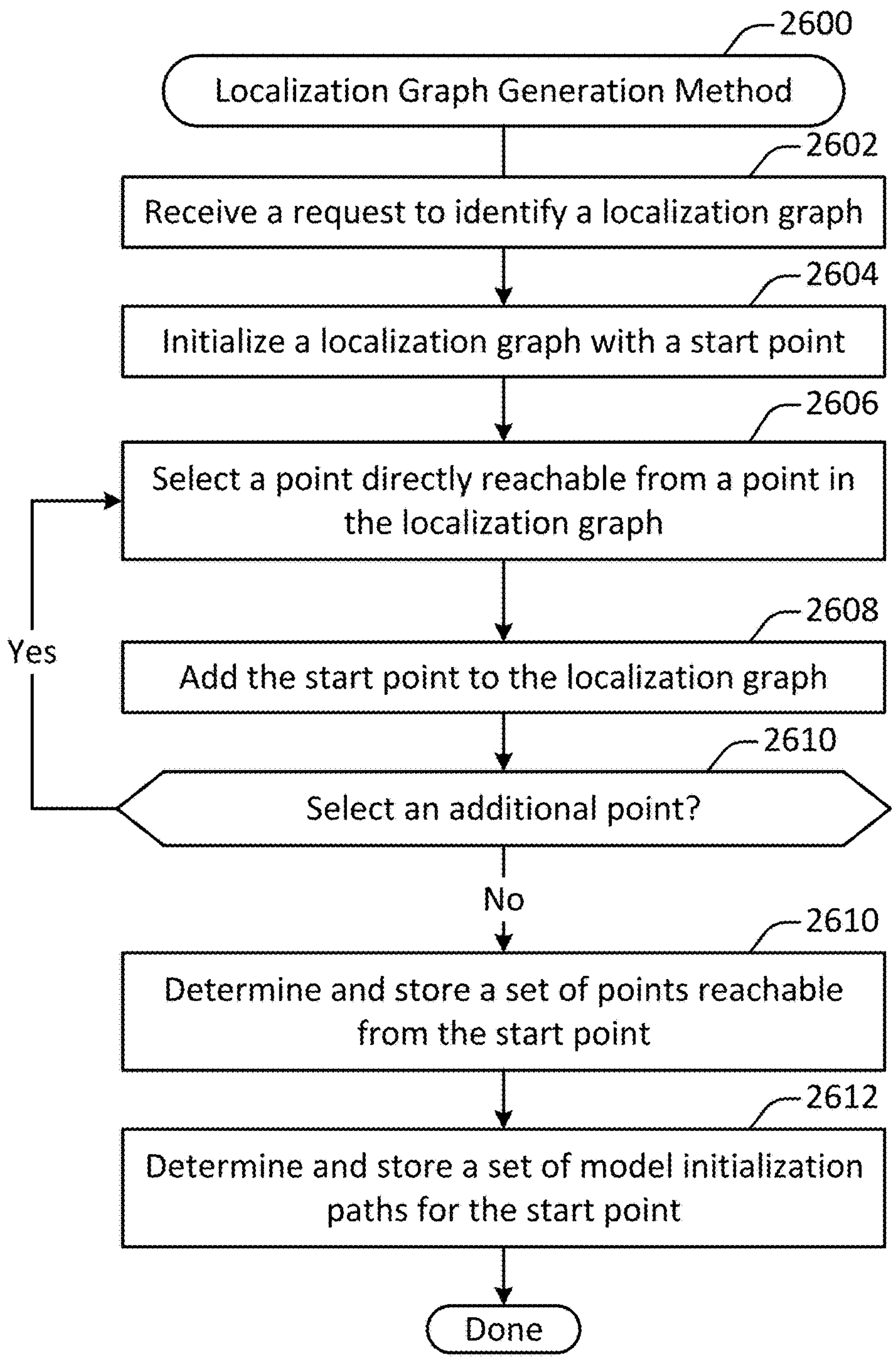
FIG. 26 illustrates a localization graph generation method, performed in accordance with one or more embodiments.

FIG. 26 illustrates a localization graph generation method 2600, performed in accordance with one or more embodiments. According to various embodiments, the method 2600 may be performed at any computing device described herein.

In some embodiments, the method 2600 may be used to determine a set of points (e.g., parts) reachable from a start point (e.g., a current part in a path). Alternatively, or additionally, the method 2600 may be used to identify a set of paths that may follow from a start point, for instance in solving a cold start problem by generating data to initially tune a PLLM.

A request to identify a localization graph is received at 2602. The request may be received initially, before path data is available, or later in a periodic fashion, when new path data has been received.

A localization graph is initialized with a start point at 2604. The start point may be any part in the environment reachable by an avatar or embedded avatar. The localization graph may be a directed graph that begins at the start point.

A point directly reachable from a point in the localization graph is selected at 2606. The start point is added to the localization graph at 2608. In some embodiments, a constraint may be imposed on point selection. For example, the point that is closest to the start point and that is not yet in the localization graph may be selected. As another example, a point may not be selected if the shortest path from the start point to the selected point were to exceed a designated threshold distance. As yet another example, a point may not be selected if the selected point is not reached from the start point in any path yet observed.

In some embodiments, a point directly reachable from a point in the localization graph may be identified by analyzing observed path data. Alternatively, or additionally, such a point may be identified by analyzing the environment itself. For instance, characteristics of an actual or simulated environment may be analyzed to identify a part that is reachable from another part.

At 2610, a determination is made as to whether to select an additional point. In some embodiments, additional points may continue to be selected until a terminating condition is met. For instance, additional points may continue to be selected until no selectable points remain, as discussed based on criteria such as those referred to with respect to operation 2608. As another example, additional points may continue to be selected until the localization graph reaches a designated size.

Upon determining not to select an additional point, a set of points reachable from the start point via the localization graph is determined and stored at 2610. The set of points may include any that have been added to the localization graph. In some embodiments, this set of points may be used to filter sentences in paths generated by the PLLM. For instance, when the PLLM generates a recommended path, the set of sentences included in the recommended path may be scanned to identify any that include a point that was not identified as reachable. If such a point is detected, the sentence that includes the identified point may be removed.

In some embodiments, this set of points may be used to filter paths determined by the PLLM. For instance, when the PLLM generates a recommended path, the set of sentences included in the recommended path may be scanned to identify any that include a point that was not identified as reachable. If such a point is detected, the recommended path may be rejected. Repeated instances in which the PLLM generates rejected paths may cause the model to be retuned.

A set of model initialization paths for the start point are optionally determined and stored at 2612. In some embodiments, the set of model initialization paths may be paths from the start point to any of the points in the localization graph. The initialization paths may be used as an initial input to the PLLM to tune the PLLM before sufficient empirical path data has been observed.

Figure 27:
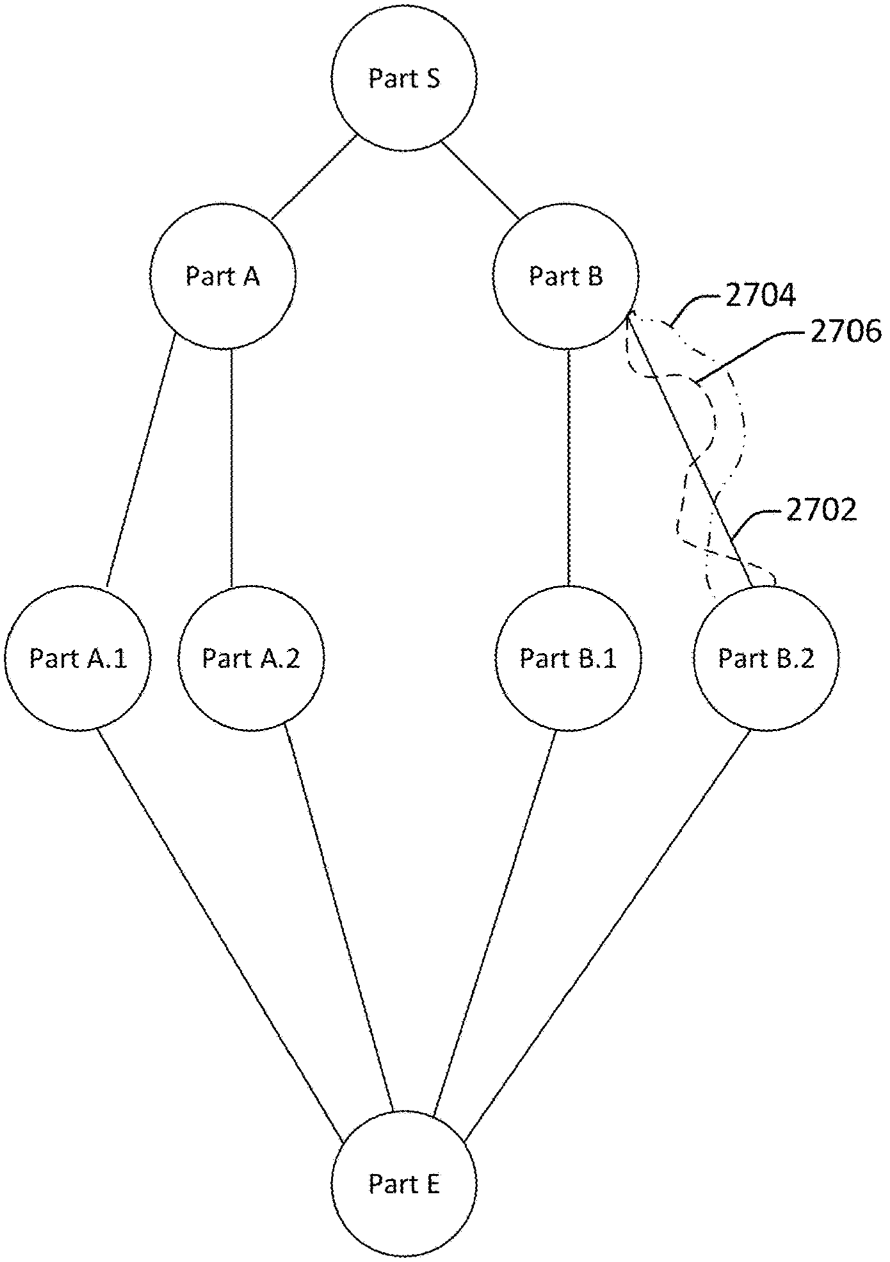
FIG. 27 illustrates a path diagram generated in accordance with one or more embodiments.

FIG. 27 illustrates a path diagram generated in accordance with one or more embodiments. In FIG. 27, the circles represent parts and the solid lines represent paths between parts. The dotted lines represent individual plays. As discussed herein, paths may use semantic embedding to effectively smooth out differences between similar plays. For instance, the subplay 2704 is different from the subplay 2706. However, because both subplays start at Part B and end at point B.2, the subpaths that result from these subplays are identical when converted to path language. For instance, both subplays may correspond to the sentence: "The Avatar moved to Part B.2", depending on the characteristics of the grammar.

The techniques and mechanisms described above may be expanded in various ways. For example, the concept of a "path" may be expanded to encompass not only single events or sequences within one game or robotics task, but also to multiple games plays and/or multiple tasks performed over time. Such an approach may allow the system to incorporate information learned from multiple iterations and variations. As another example, loss functions may be expanded to account for financial transactions, more complex user engagement metrics, churn rates, and the like, providing a more holistic view of an avatar's interactions within the environment. As yet another example, the history of actions performed in an environment and/or modifications to an environment may be recorded on a blockchain, for instance to ensure transparency and accountability. As still another example, environment modifications may be coupled with a revenue distribution model, for instance a model managed by a Decentralized Autonomous Organization (DAO) to compensate creators of game modifications or robotic task sequences. Additional details regarding these and other expansions are discussed in the following passages.

In some implementations, the path language and PLLM may be refined to take into account not only single events or sequences within one task or game, but also the avatar's history across multiple tasks or games. Incorporating such past activity introduces the capacity to learn from the history of the avatar's interactions and adapt future actions accordingly. For example, if a robot has executed a particular task sequence across multiple environments, these historical interactions can be used to optimize the robot's future actions. As another example, a person who has performed a particular task sequence in one environment may have learned from the experience and on that basis be guided to a different task sequence in another environment. Such adaptation allows the system to create a more nuanced and effective path optimization process, improving the avatar's ability to manage complex and evolving environments.

According to various embodiments, the loss function used in reinforcement learning may be expanded in various ways. In the gaming or virtual environment context, the loss function may be expanded to include metrics such as churn minimization, player retention, player interaction rates, engagement maximization, and the like. In the robotics context, the loss function may be expanded to cover a robot's task execution sequence to minimize downtime, maximize efficiency, reduce task abandonment rates, reduce operation failure rates, reduce the number of unnecessary movements, or improve the quality of task completion. In both contexts, the loss function may be expanded to consider an avatar's history across multiple games and/or environments. Expanding the loss function to encompass a variety of situations may allow the system to select and/or optimize paths based not only on outcomes within the environment, but also on external factors.

In some embodiments, a loss function may be specified over more than one variable. For example, a loss function may penalize path recommendation based on a combination of task abandonment and unnecessary movement. As another example, a loss function may penalize path recommendation based on a combination of player engagement and player retention.

In some embodiments, the path language of the PLLM may be expanded to include a new class of nouns representing cryptocurrency transactions associated with actions within the paths. A cryptocurrency transaction may be linked with a unique identifier, similar to the identifiers used for environment parts. Such a linkage may facilitate the precise representation and optimization of financial transactions within the environment, such as purchasing virtual goods or equipment in a video game or allocating resources in a robotic task. For instance, a robot tasked with building a structure in the physical world or an avatar building a structure in a virtual world such as a metaverse may use resources in the course of such construction. These resources may be represented as cryptocurrency transactions. By integrating cryptocurrency transactions into the path language of the PLLM, the system may optimize not only the actions performed by or recommended to the avatar or robot, but also the associated financial transactions. For instance, the system may return a course of action that minimizes costs.

In some embodiments, a path language grammar may include various types of sentences that capture additional facets of avatar's interactions within the environment. The types of sentences may include, but are not limited to, sentence types for avatar control, interaction of avatars and other parts, interactions between parts, avatar decisions, execution of cryptocurrency transaction, and user actions. For example, a sentence type may capture a user action such as completing a task successfully. As another example, a sentence type may capture a user action such as liking and/or sharing a game modification, a game play, or a robotic task with others. Such expansions provide for a more detailed and nuanced representation of the avatar's actions and interactions within the environment. As one example of an additional type of sentence, a sentence such as "The robot moved OBJECT X to LOCATION Y, spending Z amount of cryptocurrency resources" where each of X, Y, and Z may be filled based on the particular activity being captured by the sentence.

According to various embodiments, in the context of user-generated content (UGC) games or user-programmed robotic tasks, the history of modifications (MODs) to a game environment or robotic task sequence may be recorded on a blockchain. The blockchain provides a transparent, immutable, and verifiable record of changes made to the game or task sequence, ensuring accountability. For instance, if a user modifies a game environment or alters a robotic task sequence, such a modification may be recorded on the blockchain. Such recordation may facilitate clear tracking of modifications, for instance helping resolve disputes about the origin of specific modifications.

In some embodiments, the unique identifier may be linked with a unique transaction ID on a blockchain. For instance, a MOD may be represented as a non-fungible token (NFT). MODs may then be linked with one or more cryptocurrency transactions. Such a linkage may allow a MOD to be bought, sold, licensed, and/or traded, with transactions recorded on the blockchain. For example, smart contracts may be used to automate licensing agreements. As another example, cryptocurrency transactions may be used to facilitate the purchase of virtual goods or equipment in a video gaming or metaverse environment. As yet another example, cryptocurrency transactions may be used to allocation resources in a robotics context.

In some embodiments, the unique identifier may be created by applying a function to one or more sentences expressed in the path language. The function may provide a one-to-one mapping between the path language and an identifier space. Accordingly, the function may be used to produce a unique identifier from a corresponding path sentence. Similarly, the function may be used to produce a corresponding path sentence from a unique identifier. Because a MOD may be expressed as one or more sentences in the path language, the function may then provide a mechanism for storing a MOD on a blockchain as a unique identifier and/or reconstructing a MOD from an identifier stored on a blockchain.

In some implementations, the association of a MOD with a unique identifier stored on a blockchain may facilitate a revenue distribution model. For instance, a percentage of revenue generated from a game modification or a robotic task sequence may be distributed to a creator associated with all or part of the game modification or robotic task sequence. When multiple creators are involved, revenue can be divided among them. Such an arrangement may encourage innovation by ensuring that those who create more new modifications or task sequences receive a larger portion of the revenue. At the same time, such an arrangement can also be used to reward the original creators, maintaining a balance between encouraging innovation and rewarding original creation. The specific ratio of revenue distribution can be dynamically adjusted based on factors such as the complexity of the modification, the number of users who use or benefit from the modification, and the overall impact of the modification on the game or task sequence. For instance, the revenue distribution may be configured to as to allocate a larger portion of the revenue to the creator of the new modification or task sequence and a smaller portion to the creator of a previous modification or task sequence on which the new modification or task sequence is based.

In some implementations, Decentralized Autonomous Organizations (DAOs) may be used to facilitate transactions related to MODs, UGC games, and/or robotic tasks. DAOs are organizations represented by transparent rules encoded as a computer program. A DAO is controlled by the members of the organization rather than rules established by a central government. For example, a DAO may be configured to provide for a decentralized and democratic decision-making process regarding the allocation of revenue shares among the contributors to a game modification or a robotic task sequence. Such an arrangement may facilitate a fairer and more transparent system for revenue distribution, fostering a sense of community and shared ownership among contributors. As another example, a DAO may be used in conjunction with the PLLM to govern a metaverse. For instance, By understanding the rules, regulations, and communal resources of the metaverse, the PLLM could predict and guide democratic decisions within the metaverse.

In some embodiments, smart contracts may be used to facilitate transactions related to MODs, UGC games, and/or robotic tasks. Smart contracts are self-executing contracts with the terms of the agreement directly written into lines of code. They are stored on the blockchain and automatically execute transactions when predetermined terms and conditions are met. In the context of the PLLM, specific actions or achievements may be configured to trigger automatic rewards in the form of cryptocurrency transactions based on linkages between the blockchain and MODs and/or paths.

According to various embodiments, the association of a MOD with a unique identifier may be used to evaluate a MOD. For example, the unique identifier may be used to replay a sequence of modifications leading to a MOD. As another example, the unique identifier may be used to review the evolution of an environment. As yet another example, the unique identifier may be used to facilitate debugging efforts.

In some embodiments, the unique identifier for a MOD may be used to perform command and control operations. For instance, the unique identifier may be translated into interpretable instructions. For example, instructions may be interpreted by a controller device at a robot. As another example, instructions may be interpreted by an environment engine supporting the design and/or execution of an environment.

In some embodiments, the unique identifier for a MOD may be used to guide or evaluate MOD creation decisions. For example, the unique identifier may be used as input for training AI/ML models to learn common or successful MODing sequences. Models trained in this fashion may then be used to suggest such sequences to users. Alternatively, or additionally, models trained in this fashion may be used to predict the potential impact of a MODing sequence before it is implemented.

In some embodiments, a virtual economy using cryptocurrencies within a metaverse or gaming environment may be provided. The PLLM may be utilized to learn and predict economic behaviors of avatars, thereby enhancing the overall economic dynamics of the environment. For instance, optimal behavior may be learned and predicted, which may be used to provide recommendations for future actions.

In some embodiments, the PLLM may be extended to encompass Decentralized Finance (DeFi) transactions and operations within a metaverse or gaming environment. For instance, the model may learn and predict financial interactions such as lending, borrowing, or earning interest on cryptocurrencies. Such an extension may be used to influence the path-selection process.

In some embodiments, NFTs may be integrated into the path language used by the PLLM. NFTs may be used to uniquely identify avatars or objects within the environment. Such identification may enhance the PLLM's ability to understand and predict interactions involving unique virtual items.

In some implementations, the PLLM may perform real-time path adjustment based on dynamic changes in the environment. These real-time path adjustments may enhance the PLLM's adaptability and help to ensure that a robot's or avatar's actions remain recommended in the face of unexpected environmental changes.

In some embodiments, the PLLM may be applied in augmented reality/virtual reality (AR/VR) settings. By understanding and predicting user interactions in AR/VR, the PLLM may enhance user immersion in a metaverse or gaming environment.

In some embodiments, the PLLM may predict user behavior based on past paths. Such extension may allow the system to provide personalized experiences and proactive guidance within the environment.

In some implementations, social interactions between multiple avatars may be modeled and managed. For instance, the avatars may interact within a metaverse setting. By understanding the social dynamics of the environment, the PLLM may predict and guide social interactions.

In some embodiments, the PLLM may be applied across different platforms and devices. In this way, the user may be provided with a consistent user experience in a game or metaverse environment irrespective of the device used.

In some embodiments, privacy and security mechanisms for protecting user data and transactions within the environment may be incorporated into the PLLM. For instance, the PLLM may learn and predict potential security risks, which may allow it to contribute to building trust and promoting wider adoption of the metaverse or game.

Figure 28:
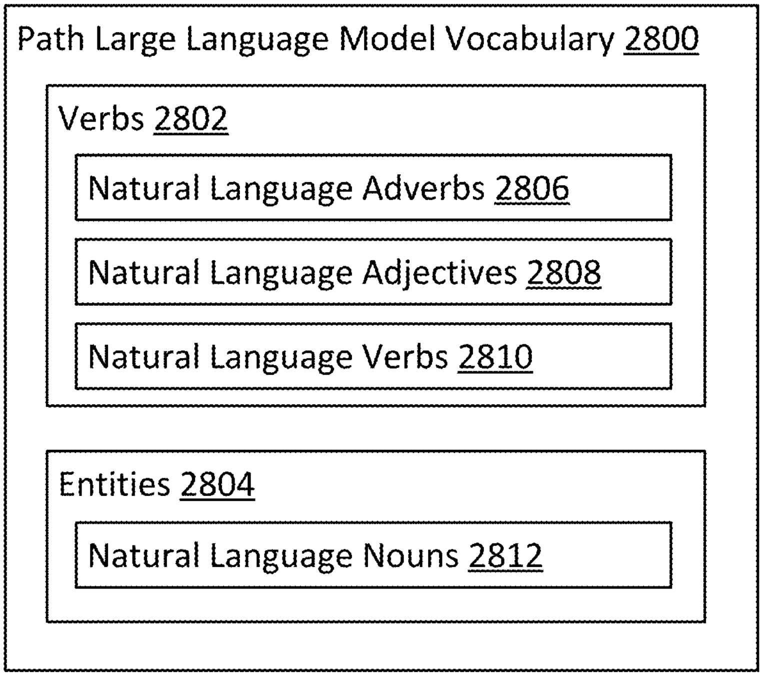
FIG. 28 shows a conceptual diagram of the path large language model vocabulary, configured in accordance with one or more embodiments.

FIG. 28 shows a conceptual diagram of the path large language model vocabulary 2800. As discussed herein, the path large language model vocabulary 2800 includes verbs 2802 and entities 2804. The path large language model entities 2804 correspond conceptually with natural language nouns 2812, while the path large language model verbs 2802 correspond conceptually with natural language adverbs 2806, natural language adjectives 2808, and natural language verbs 2810.

In some embodiments, a single triggering event can lead to the performance of multiple verbs by the same adjective. For instance, a script may indicate that an entity is "happy walking slowly" if a triggering event is detected. Such an action description includes a verb (i.e., "walking"), an adjective (i.e., "happy"), and an adverb (i.e., "slowly"). Such an entity may be animated as slowly moving from one point to another using a walking animation while expressing a happy emotion.

6. Agentic Pipeline

Figure 29:
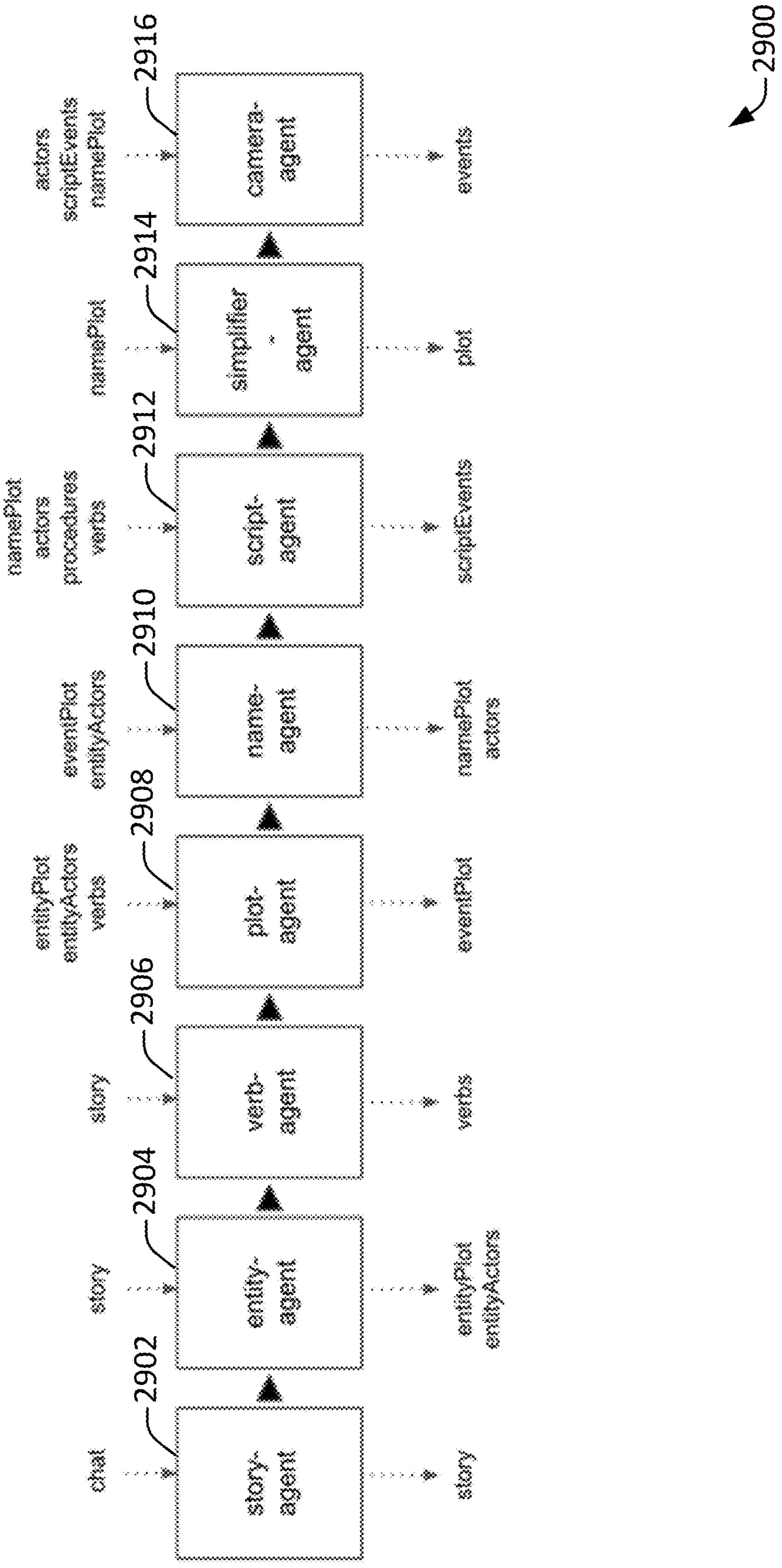
FIG. 29 illustrates an example pipeline for generating a 3D interactive script, configured in accordance with one or more embodiments.

In some embodiments, techniques and mechanisms described herein for generating a 3D interactive script may employ an agentic configuration. FIG. 29 illustrates an example pipeline 2900 for generating a 3D interactive script, configured in accordance with one or more embodiments. In FIG. 29, the different boxes correspond to generative language model agents. The elements above the boxes correspond to inputs, while the elements below the boxes correspond to outputs. It should be noted that the pipeline 2900 shown in FIG. 29 is only an example of a pipeline that may be used, and that a 3D interactive script consistent with techniques and mechanisms described herein may be configured in a different manner.

At 2902, a story agent receives as input chat input and generates a story from the chat input. At 2904, an entity agent receives as input the story and determines an entity plot and entity actors. At 2906, a verb agent receives as input the story and determines the verbs to employ in the 3D interactive script. At 2908, a plot agent receives as input the entity plot, entity actors, and entity verbs and generates an event plot. At 2910, a name agent receives as input the event plot and the entity actors and generates as output the name of the plot and the actors. At 2912, the script agent receives as input the name of the plot and the actors, the procedures, and the verbs and generates a script that includes one or more events. At 2914, a simplifier agent receives as input the name of the plot and generates the plot. For instance, the simplifier agent may replace duplicative elements in the plot such as similar events for different entities with parameterized events that may be applied to different entities. At 2916, the camera agent receives as input the actors, the script events, and the name of the plot and generates the set of events to include in the final script.

According to various embodiments, each of the agents shown in FIG. 29 may correspond to one or more prompts that are completed by a generative language model. For instance, the story agent may correspond to a prompt that includes natural language instructions to generate a story based on the chat input.

In some embodiments, the path language model is conducive to a highly agentic configuration. Conventional techniques for generating animation convert text input directly to video output. In contrast, various embodiments described herein generate multiple intermediate elements, including a story, a plot, one or more actors, one or more verbs, and one or more events. These different intermediate elements can be generated by different agents, eliminating the need for a monolithic process.

In some embodiments, the path language model is conducive to granular revision of a 3D interactive script. Because conventional techniques for generating animation convert text input directly to video output, the generated animation cannot be directly revised in a semantic sense. That is, the elements included in an animation generated using conventional techniques do not have semantic meaning in the final animation. In contrast, a 3D interactive script generated in accordance with one or more embodiments described herein includes components such as a story, a plot, one or more actors, one or more verbs, and one or more events. Accordingly, the system can support iterative editing of such a 3D interactive script by using the intermediate elements along with user input to revise the intermediate elements. For instance, the system could, responsive to user input, revise an entity, a verb, or an event within the 3D interactive script while leaving other elements of the 3D interactive script intact.

Provided below is a simplified example of inputs and outputs used to generate an example 3D interactive script, in accordance with one or more embodiments. The final output includes events that can be interpreted by an interpreter to provide a 3D interactive experience. As discussed herein, in some embodiments verbs can correspond to animations that apply to any entity, including entities without predefined animation rigs.

Inputs and Outputs:

{
“chat”: “I'd like to create an interactive scene with a little girl, who continually says 'Hi' until tapped three times. After the third tap, she stops saying 'Hi' and randomly plays one of these sounds: [https://cdn.freesound.org/previews/704/704965_15251455-lq.mp3, https://cdn.freesound.org/previews/704/704965_15251455-lq.mp3]. Once a sound has played, she exclaims 'Yay!' ending the interaction.”,
“story”: “A little girl, continually says 'Hi' until she is tapped three times. After the third tap, she stops saying 'Hi' and randomly plays one of these sounds: [https://cdn.freesound.org/previews/704/704965_15251455-lq.mp3, https://cdn.freesound.org/previews/704/704965_15251455-lq.mp3]. Once a sound has played, she exclaims 'Yay!' ending the interaction.”,
“entityActors”: [
{
“type”: “Young Girl”
}
],
“entityPlot”: “A little girl, continually says 'Hi' until she is tapped three times. After the third tap, she stops saying 'Hi' and randomly plays one of these sounds: [https://cdn.freesound.org/previews/704/704965_15251455-lq.mp3, https://cdn.freesound.org/previews/704/704965_15251455-lq.mp3]. Once a sound has played, she exclaims 'Yay!' ending the interaction.”,
“eventPlot”: “At %SceneStarts% <Young Girl> repeatedly |Say| +Hi+. When <Young Girl> is %Tapped% 3 times, she will |DisableEvent|, |Say| +Hi+ and |PlayAnyOfSoundURLs| : ˆhttps://cdn.freesound.org/previews/704/704965_15251455-lq.mp3ˆ, ˆhttps://cdn.freesound.org/previews/704/704965_15251455-lq.mp3ˆ. After the sound %CompletedEvent%, <Young Girl> will |Say| +Yay+ and then |EndMOD|.”,
“actors”: [
{
“name”: “Emily”,
“type”: “Young Girl”
}
],
“namePlot”: “At %SceneStarts% <Emily> repeatedly |Say| +Hi+. When <Emily> is %Tapped% 3 times, she will |DisableEvent|, |Say | +Hi+ and |PlayAnyOfSoundURLs|: ˆhttps://cdn.freesound.org/previews/704/704965_15251455-lq.mp3ˆ, ˆhttps://cdn.freesound.org/previews/704/704965_15251455-lq.mp3ˆ. After the sound %CompletedEvent%, <Emily> will |Say| +Yay+ and then |EndMOD|.”,
“plot”: “When the scene starts, Emily repeatedly says 'Hi'. When Emily is tapped three times, she stops saying 'Hi' and randomly plays one of several sounds. After the sound finishes, Emily says 'Yay' and the scenario ends.”,
“scriptEvents”: [
{
“id”: 0,
“repeatable”: true,
“enabled”: true,
“trigger”: {
“triggerType”: “AlwaysActive”,
“args”: { }
},
“action”: {
“actionType”: “Say”,
“args”: {
“sentence”: “Hi”, -continued

```
            "actor": {
              "name": "Emily"
            }
          }
        }
      },
      {
        "id": 1,
        "repeatable": false,
        "enabled": true,
        "trigger": {
        "triggerType": "Tapped",
          "args": {
            "actor": {
            "name": "Emily"
            },
            "occurrences": 3
          }
        },
        "action": {
          "actionType": "DisableEvent",
          "args": {
            "eventId": 0
          }
        }
      },
     {
        "id": 2,
        "repeatable": false,
        "enabled": true,
        "trigger": {
          "triggerType": "CompletedEvent",
          "args": {
            "eventId": 1
          }
        },
        "action": {
          "actionType": "PlayAnyOfSoundURLs",
          "args": {
          "soundList": [
            {
              "url": "https://cdn.freesound.org/previews/704/704965_15251455-lq.mp3",
              "durationMs": 2115
            },
            {
              "url": "https://cdn.freesound.org/previews/704/704965_15251455-lq.mp3",
              "durationMs": 10143
            }
          ]
          }
        }
     },
     {
        "id": 3,
        "repeatable": false,
        "enabled": true,
        "trigger": {
          "triggerType": "CompletedEvent",
          "args": {
            "eventId": 2
          }
        },
        "action": {
          "actionType": "Say",
          "args": {
            "sentence": "Yay!",
            "actor": {
            "name": "Emily"
          }
        }
     },
     {
        "id": 4,
        "repeatable": false,
        "enabled": true,
        "trigger": {
          "triggerType": "CompletedEvent",
          "args": {
            "eventId": 3
```

-continued

```
          }
        },
        "action": {
          "actionType": "EndMOD",
          "args": { }
        }
      }
    ],
    "events": [
      {
        "id": 0,
        "repeatable": false,
        "enabled": true,
        "trigger": {
          "triggerType": "SceneStarts",
          "args": { }
        },
        "action": {
          "actionType": "LookAt",
          "args": {
            "actor": {
              "name": "Camera"
            },
            "targetActor": {
              "name": "Emily"
            }
          }
        }
      },
      {
        "id": 1,
        "repeatable": true,
        "enabled": true,
        "trigger": {
          "triggerType": "AlwaysActive",
          "args": { }
        },
        "action": {
          "actionType": "Say",
          "args": {
            "sentence": "Hi",
            "actor": {
              "name": "Emily"
            }
          }
        }
      },
      {
        "id": 2,
        "repeatable": false,
        "enabled": true,
        "trigger": {
          "triggerType": "Tapped",
          "args":{
            "actor": {
              "name": "Emily"
            },
            "occurrences": 3
          }
        },
        "action": {
          "actionType": "DisableEvent",
          "args": {
            "eventId": 1
          }
        }
      },
      {
        "id": 3,
        "repeatable": false,
        "enabled": true,
        "trigger": {
          "triggerType": "CompletedEvent",
          "args": {
            "eventId": 3
          }
        },
        "action": {
          "actionType": "Shake",
```

-continued

```
        "args": {
          "strength": "weak",
          "durationMs": 1000,
          "actor": {
            "name": "Camera"
          }
        }
      },
      {
        "id": 4,
        "repeatable": false,
        "enabled": true,
        "trigger": {
          "triggerType": "CompletedEvent",
          "args": {
            "eventId": 2
          }
        },
        "action": {
          "actionType": "PlayAnyOfSoundURLs",
          "args": {
            "soundList": [
              {
                "url": "https://cdn.freesound.org/previews/704/704965_15251455-lq.mp3",
                "durationMs": 2115
              },
              {
                "url": "https://cdn.freesound.org/previews/704/704965_15251455-lq.mp3",
                "durationMs": 10143
              }
            ]
          }
        }
      },
      {
        "id": 5,
        "repeatable": false,
        "enabled": true,
        "trigger": {
          "triggerType": "CompletedEvent",
          "args": {
            "eventId": 4
          }
        },
        "action": {
          "actionType": "Say",
          "args": {
            "sentence": "Yay!",
            "actor": {
              "name": "Emily"
            }
          }
        }
      },
      {
        "id": 6,
        "repeatable": false,
        "enabled": true,
        "trigger": {
          "triggerType": "CompletedEvent",
          "args": {
            "eventId": 5
          }
        },
        "action": {
          "actionType": "EndMOD",
          "args": { }
        }
      }
    ]
  }
```

Figure 30:
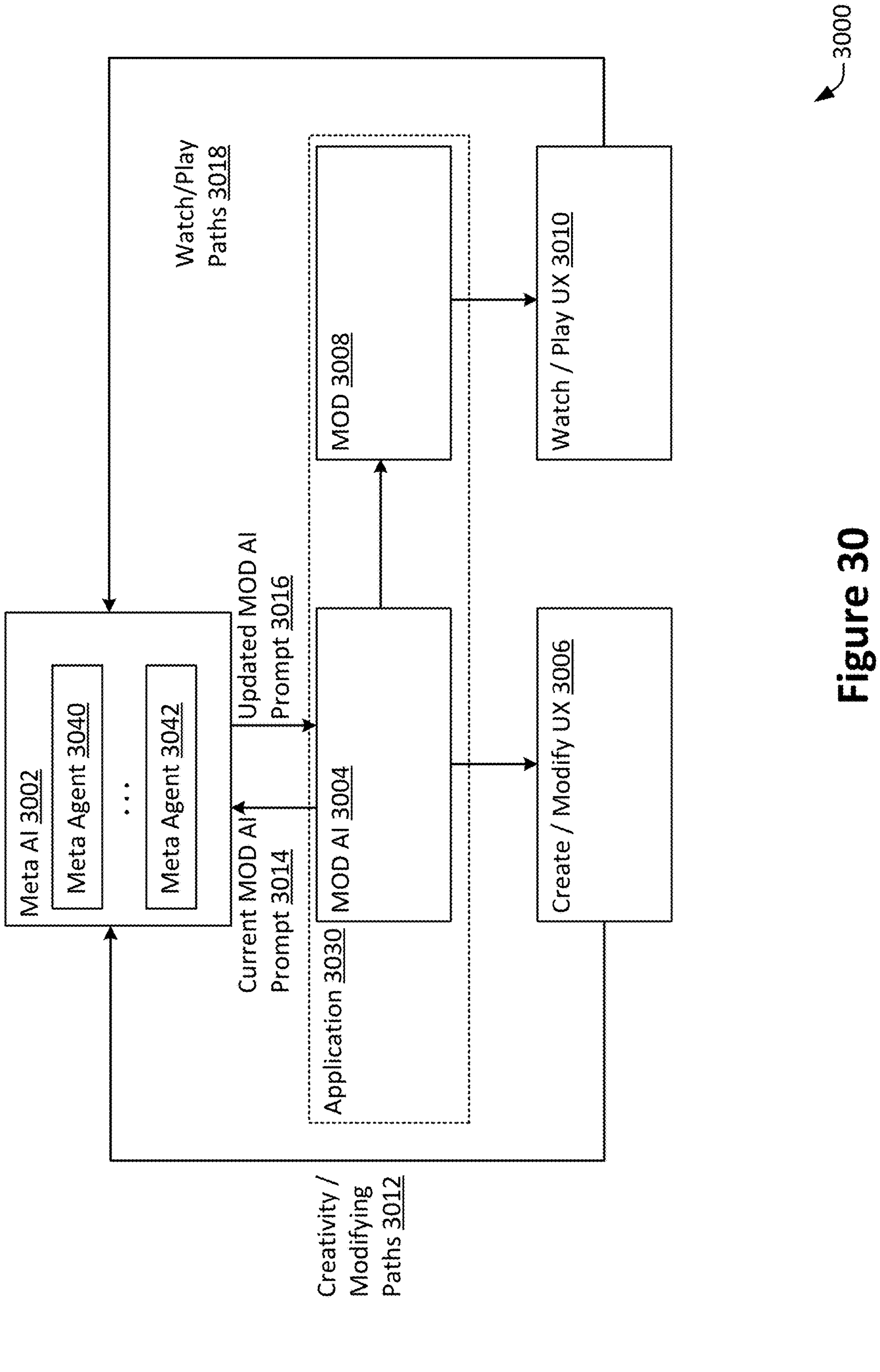
FIG. 30 illustrates a diagram of an ecosystem for providing a three-dimensional interactive virtual environment, configured in accordance with one or more embodiments.

FIG. 30 illustrates a diagram of an ecosystem 3000 for providing a three-dimensional interactive virtual environment, configured in accordance with one or more embodiment. For the purpose of exposition, a three-dimensional interactive virtual environment is referred to in FIG. 30 as a MOD.

In some embodiments, an interactive three-dimensional virtual environment 3008 can be watched, played, or interacted with via a user interface at a client machine 3010. The interactive three-dimensional virtual environment 3008 can be created via an artificial intelligence environment creation process 3004. Additional details regarding the creation process 3004 are discussed throughout the application as filed, for instance with respect to the flow 2900 shown in FIG. 29.

In some embodiments, a meta interactive three-dimensional virtual environment refinement process 3002 may be used to refine an interactive three-dimensional virtual environment via reinforcement learning with human feedback (RLHF). For example, the meta interactive three-dimensional virtual environment refinement process 3002 may receive as input watch, play, and interaction paths 3018 that are generated via the client machine interface 3010. As another example, the meta interactive three-dimensional virtual environment refinement process 3002 may receive as input the current prompt from the existing the interactive three-dimensional virtual environment at 3014. As yet another example, the meta interactive three-dimensional virtual environment refinement process 3002 may receive as input one or more paths 3012 generated by a dedicated creation/modification interface 3006 for directly modifying the interactive three-dimensional virtual environment. As still another example, the meta interactive three-dimensional virtual environment refinement process 3002 may receive as input detailed analytics on the performance of the interactive three-dimensional virtual environment.

In some embodiments, one or more operations within the meta AI 3002 may be implemented via a meta agent such as the meta agents 3040 through 3042. The meta agents may be responsible for changing elements of the system itself, such as prompts used by the agents shown in FIG. 29 to determine various elements of a path language embedding. Each meta agent may be composed of one or more meta prompts, which each may include one or more meta components and one or more named components.

In some embodiments, such input can be accompanied by loss function output for a path indicating, for instance, which paths are more or less preferred. The loss function may be similar or identical to that used for the path large language model.

According to various embodiments, FIG. 30 illustrates a configuration in which input content (e.g., text, image, sound, and/or video) may be received and used to create an interactive three-dimensional virtual environment. The interactive three-dimensional virtual environment can be repetitively refined to create updated (e.g., better) interactive three-dimensional virtual environments. Input for refining the interactive three-dimensional virtual environment may be received from a user who generated the interactive three-dimensional virtual environment, from another user accessing the interactive three-dimensional virtual environment via the internet, and/or other sources (e.g., a robot or autonomous actor navigating the interactive three-dimensional virtual environment).

In some embodiments, the output of the refinement process may include updated prompts used to create the three-dimensional virtual environment. By executing these prompts, the refinement may be reflected in the script of the interactive three-dimensional virtual environment, in the actions of agents within the interactive three-dimensional virtual environment, or in any other aspect of the interactive three-dimensional virtual environment.

In some embodiments, the refinement process may involve fine tuning of a generative language model underlying the generation of the interactive three-dimensional virtual environment. For instance, one or more weights may be adjusted to cause a large language model to generate a different interactive three-dimensional virtual environment for the same prompt. In some embodiments, the generative language model may be refined in combination with revisions to the prompt.

In some embodiments, the meta interactive three-dimensional virtual environment refinement process 3002 may include an autotest agent. The autotest agent may employ a set of test media inputs to determine whether an updated interactive three-dimensional virtual environment is improved relative to the same loss function. The changes may be accepted if an improvement is detected. Otherwise the changes may be discarded.

In some embodiments, the meta interactive three-dimensional virtual environment refinement process 3002 may be used to repeatedly update the interactive three-dimensional virtual environment over time. The interactive three-dimensional virtual environment may continue to be updated until a triggering condition is met. For example, the interactive three-dimensional virtual environment may continue to be updated until a user indicates that the interactive three-dimensional virtual environment is finalized. As another example, the interactive three-dimensional virtual environment may continue to be updated until further refinement does not yield significant improvement.

Figure 31:
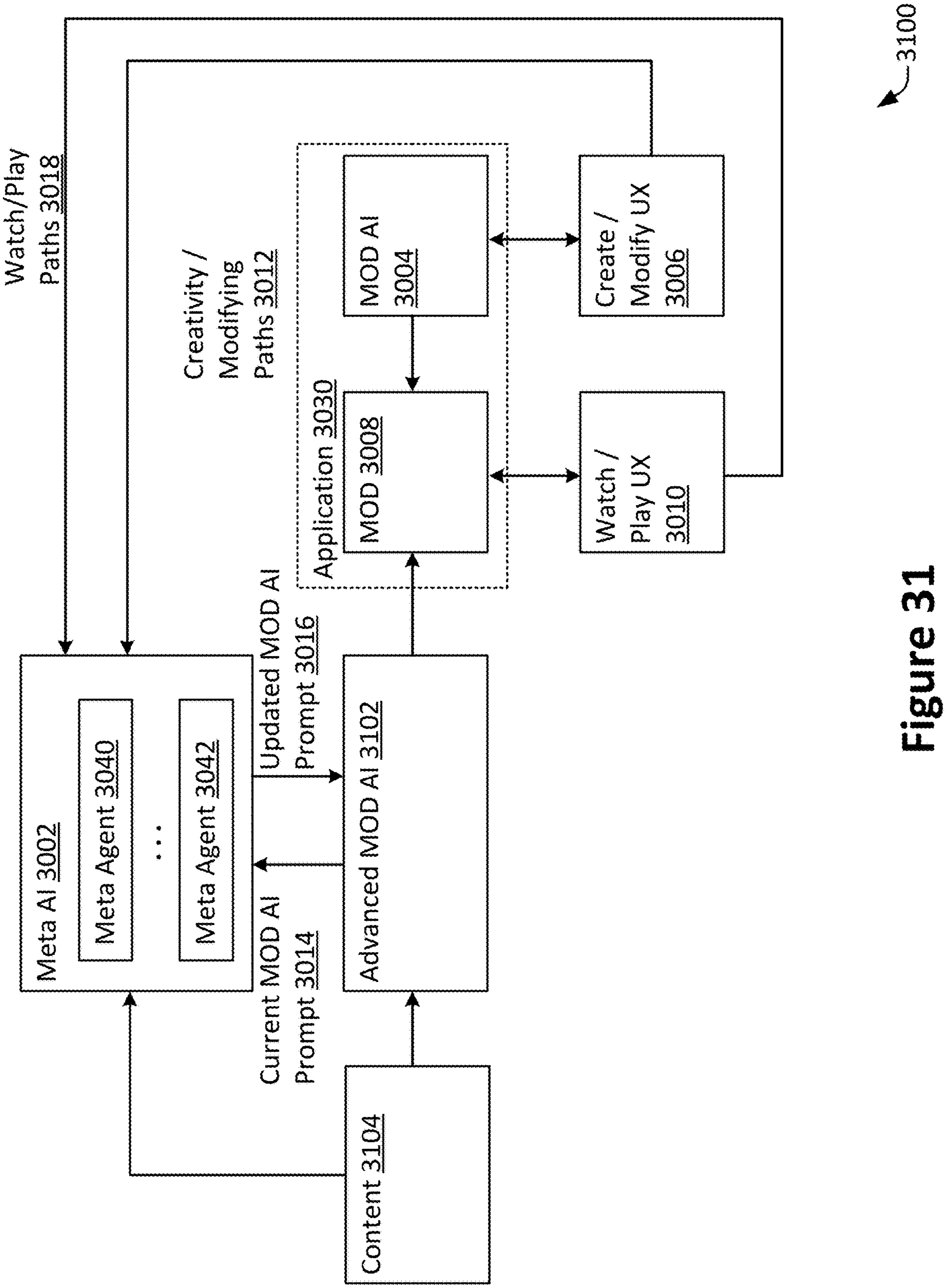
FIG. 31 illustrates a diagram of an ecosystem for providing a three-dimensional interactive virtual environment, configured in accordance with one or more embodiments.

FIG. 31 illustrates a diagram of an ecosystem 3100 for providing a three-dimensional interactive virtual environment, configured in accordance with one or more embodiment. In many respects, the ecosystem 3100 is the same as the ecosystem 3000 shown in FIG. 30. However, in FIG. 31, an interactive three-dimensional virtual environment may be further improved by one or more experts via an advanced interactive three-dimensional virtual environment refinement process 3102.

In some embodiments, the advanced interactive three-dimensional virtual environment refinement process 3102 may be used to refine a plan or story that has proven to be highly effective. For instance, a plan or story may be used to generate a highly engaging three-dimensional virtual environment or a highly effective script for a robot agent. For example, an expert may refine a three-dimensional virtual environment by changing the inputs in one or more stages of creating the three-dimensional virtual environment as discussed with respect to the flow illustrated in FIG. 29.

In some embodiments, an expert may provide human feedback to the three-dimensional virtual environment generation process. This human feedback may aid in creating three-dimensional virtual environments that score better under the loss function. The interactions may be captured in the creation path.

In some embodiments, the system may support such expert interaction while at the same time providing a simpler version of the creation process at 3004 that is more accessible to non-expert users. Thus, a three-dimensional virtual environment may be created and/or refined based on input from one or more non-expert creators, one or more expert creators, and/or potentially many end users interacting with the three-dimensional virtual environment. Input from any or all of these users may be captured in the modifying path.

Figure 33:
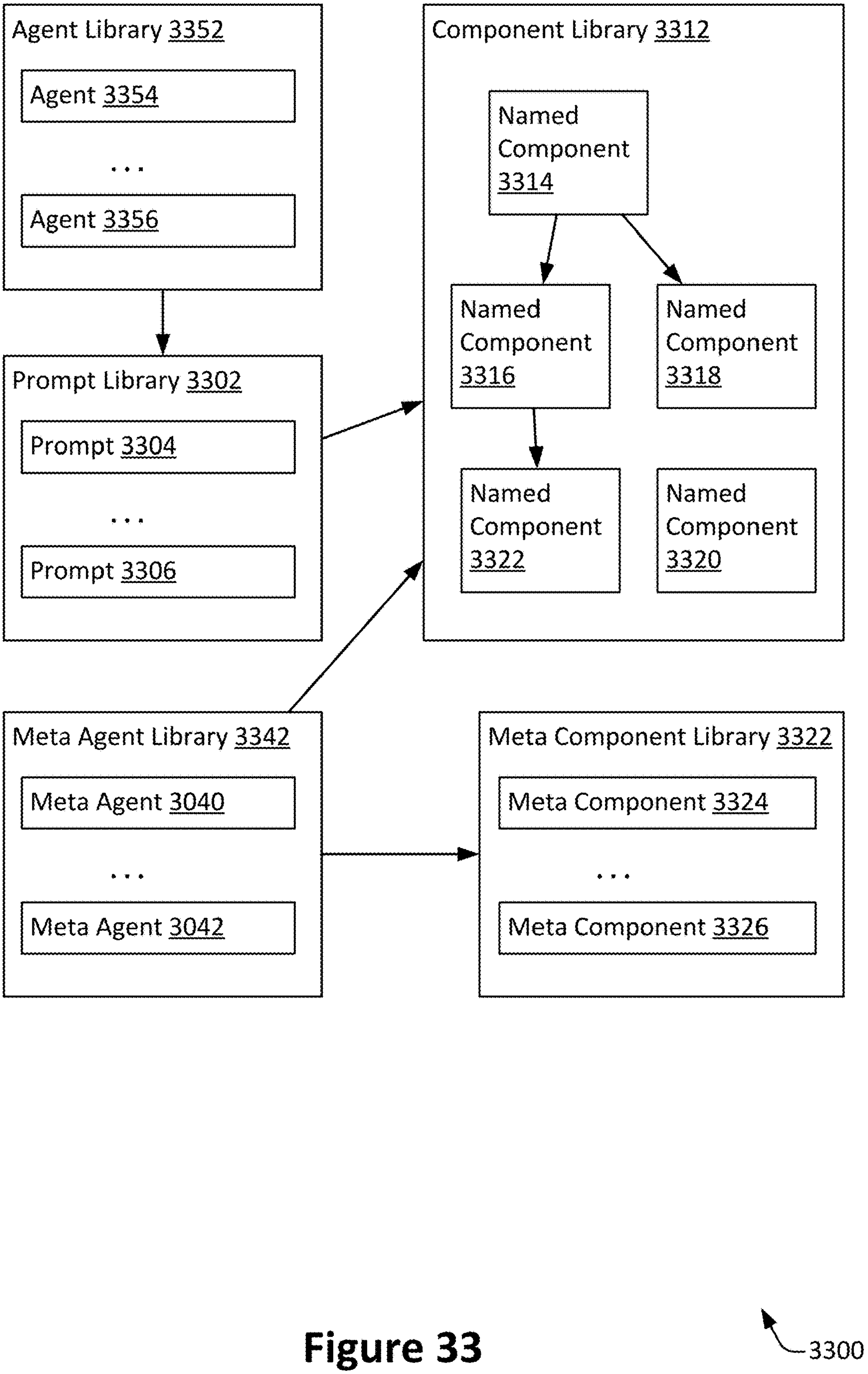
FIG. 33 illustrates a data model diagram, configured in accordance with one or more embodiments.

FIG. 33 illustrates a data model diagram 3300, configured in accordance with one or more embodiments. The data model diagram 3300 illustrates various elements for organizing agents and prompts in accordance with a normal form agentic AI architecture data model.

In some embodiments, agents 3354 through 3356 are stored in an agent library 3352. Examples of the agents 3354 through 3356 are shown in FIG. 29. For example, an agent may be responsible for determining scripts, determining entities, determining actions, and/or performing other such operations.

In some embodiments, an agent may rely on one or more prompts, such as the prompts 3304 through 3306. Prompts may be completed by a generative language model to generate novel text, such as elements of path language embeddings and/or scripts. Prompts may be stored in the prompt library 3302.

In some embodiments, prompts may be specified in terms of components. The components 3314 through 3322 (including 3316, 3318, 3320, and potentially many more) may be stored in the component library 3312.

In some embodiments, components may refer to other components by name, as shown in FIG. 33. Thus, components may be arranged in a graph-like data structure. Further, the need for duplication may be eliminated, so that a portion of text defined as a component can then be referenced by the name of the component without needing to be repeated.

In some embodiments, a component may be a portion of text. Components, and other elements shown in FIG. 33, may be stored in a version control system, such as Git. In this way, the changing characteristics of the components over time may be reflected.

In some embodiments, meta agents such as the meta agent 304 through the meta agent 3042 may be stored in the meta agent library 3342. Meta agents may be composed of components and meta components. Meta agents may be tasked with improving the agents 3354 through 3356, for instance by adding or modifying prompts and components and/or by modifying the prompts and components included in the agents.

In some embodiments, the meta components 3324 through 3326 may be stored in meta component library 3322. The meta components 3324 through 3326 may specify higher level operations related to the modification of components and prompts. For example, a meta component may specify an operation for splitting an agent into two different agents. Such higher level operations need not be included in the agents that are producing path language embeddings and scripts, but may be needed when modifying the agents themselves.

According to various embodiments, the data model and architecture shown in FIG. 33 may support the flexible updating of a variety of elements discussed herein. For example, the agents 3354 through 3356 may apply prompts stored in the prompt library 3302 to dynamically determine elements of path language embeddings and scripts. As another example, the meta agents 3040 through 3042 may dynamically update the agents 3354 through 3356 by dynamically updating the components and/or meta components that make up the prompts included in or referenced by the agents.

Figure 34:
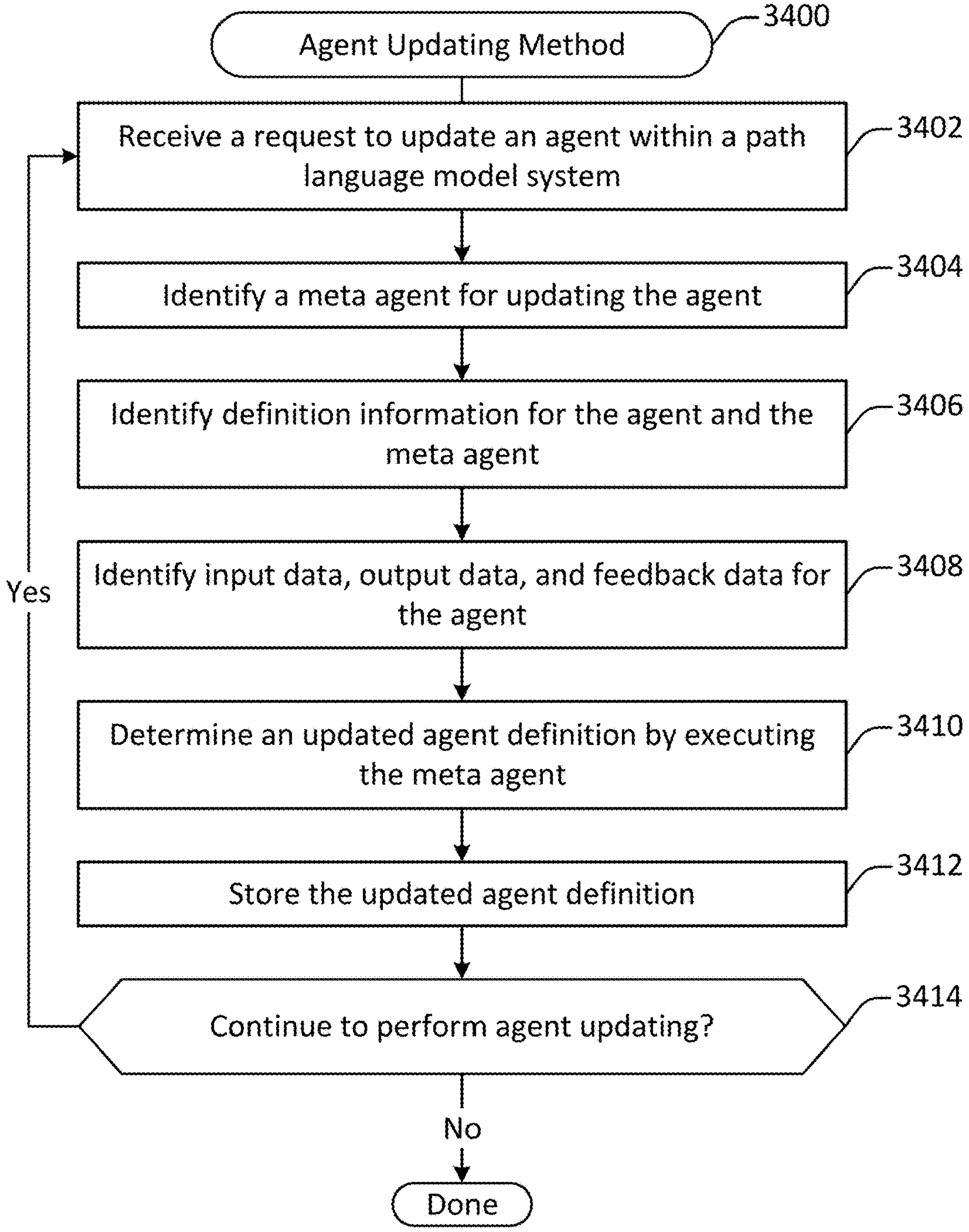
FIG. 34 illustrates a method for updating an agent, performed in accordance with one or more embodiments.

FIG. 34 illustrates a method 3400 for updating an agent, performed in accordance with one or more embodiments. The method 3400 may be performed to update one or more of the agents in the agentic AI pipeline shown in FIG. 29.

A request to update an agent within a path language model system is received at 3402. In some embodiments, the request may be generated periodically, for instance once on a daily or weekly basis. Alternatively, an agent may be updated when a determination is made that the agent's performance has fallen below a designated threshold based on feedback data collected in the system.

A meta agent for updating the agent is identified at 3404. In some embodiments, as shown in FIG. 33, a meta agent may include one or more components and/or meta components that collectively form prompts for updating one or more agents. A meta agent may correspond to one or more agents. For instance, a meta agent may include components corresponding with an agent as well as one or more meta components for updating those components.

Definition information for the agent and the meta agent is identified at 3406. In some embodiments, the definition information may be retrieved from the normal form agentic AI data model shown in FIG. 33.

Input data, output data, and feedback data for the agent are identified 3408. In some embodiments, the input data may include user input, intermediate values, and/or other information used by the agent to generate a path language model representation. The output data may include a path language model representation, intermediate values, or other information generated by executing the agent. The feedback data may include a loss function, loss function output values, user feedback, or other information for evaluating the output data.

An updated agent definition is determined at 3410 by executing the meta agent. In some embodiments, executing the meta agent may involve determining a prompt for the meta agent. The prompt for the meta agent may include one or more meta components, one or more components, and/or some or all of the input data, the output data, and the feedback data. As discussed with respect to FIG. 33, the meta components may include instructions for updating the components based on the input data, the output data, and/or the feedback data.

In some embodiments, the prompt may then be completed by a generative language model to determine updated definition information for the agent. The updated definition information may reflect any of various changes to the agent definition. For example, the text included in one or more of the components may be changed. As another example, new components may be added to and/or removed from the agent. As yet another example, a preexisting component may be split into two or more different components.

The updated agent definition is stored at 3412. The agent definition may be stored in accordance with the data model shown in FIG. 33. The updated agent definition may be used to execute the agent within the agent pipeline as shown in FIG. 29 to generate path language model definitions.

A determination is made at 3414 as to whether to continue to perform agent updating. In some embodiments, additional agent updating may be performed until updated component information is determined for all agents identified in the request received at 3402. Alternatively, or additionally, updated outcome information may be determined based on the updated agent definition, for instance by executing the updated agent. The updated outcome information may then be compared with feedback data to determine whether to continue updating the agent.

7. Video Generation

Figure 32:
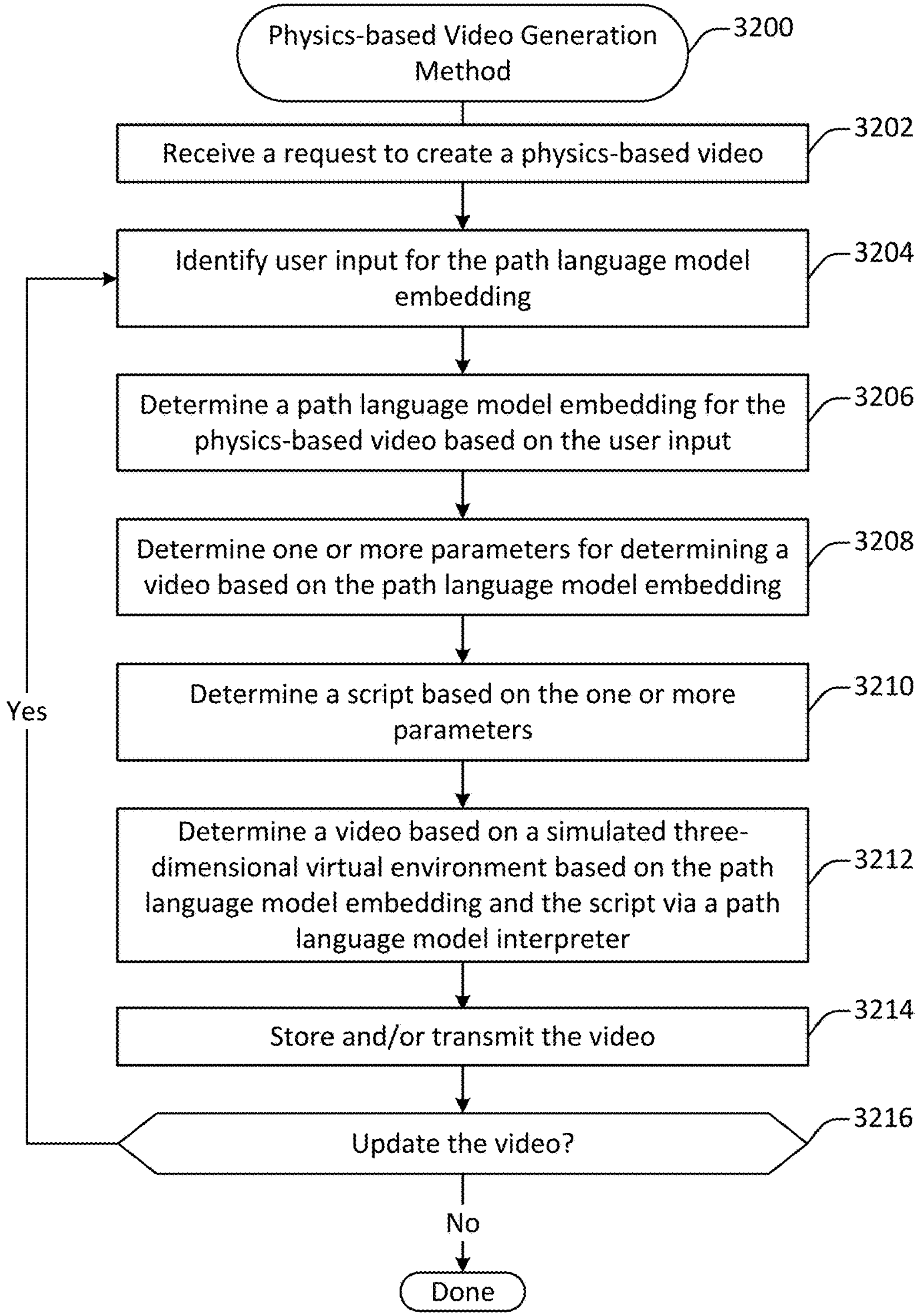
FIG. 32 illustrates a method of generating a video in accordance with such techniques, performed in accordance with one or more embodiments.

As discussed herein, various embodiments support the creation of videos, which may or may not be interactive. FIG. 32 illustrates a method 3200 of generating a video in accordance with such techniques, performed in accordance with one or more embodiments. Although these techniques are already described elsewhere in the application, FIG. 32 is provided to illustrate the power of such techniques for video generation.

A request to create a physics-based video is received at 3202. According to various embodiments, the request may be generated as discussed with respect to operations 102, 602, and 604. User input for the path language model embedding is identified at 3204. As discussed herein, various types of user input may be received, including text, images, video, sounds, other types of input, and/or multimodal input.

At 3206, an original path language model embedding is determined for the physics-based video based on the original user input. According to various embodiments, such a path language model embedding may be determined as described herein, for instance with respect to the method 600 shown in FIG. 6.

One or more parameters for determining a video based on a path language model embedding are determined at 3208. According to various embodiments, the one or more parameters may be used to determine a sequence of states for the a three-dimensional representation of the path language model embedding for the purpose of rendering a video.

In some embodiments, the one or more parameters may be determined by a machine learning and/or artificial intelligence model. For example, such a model may be trained based on historical path data collected from client machines. The model may then receive the path language embedding as input and produce one or more parameters for determining a script representative of an actual playthrough by a person.

In some embodiments, the one or more parameters may be determined based on natural language input and/or other types of user input. For example, a user may provide natural language input, one or more clicks, or other such input leading to one or more events, actions, states, or other characteristics to occur in the three-dimensional environment during the video.

According to various embodiments, the script may represent a sequence of events to occur in a simulation based on the path language embedding. For example, one object moves near to another object, which then reacts based on the proximity of the first object. As another example, simulated user input representing a user mouse click activates a portion of the user interface at a particular point in time. The events represented in the script may then be processed based on the triggers included in the path language embedding and the physics engine in which the three-dimensional virtual environment is simulated. The physics engine may provide for various types of actions that need not be explicitly simulated. For instance, objects represented in the three-dimensional virtual environment may be affected by virtual gravity.

A video is determined at 3212 via a path language model interpreter. In some embodiments, the video may be determined based on a simulated three-dimensional virtual environment, which may be generated based on the path language model embedding and the one or more parameters. Determining the video may involve simulating the three-dimensional virtual environment via a physics engine and then recording a video of the simulated three-dimensional virtual environment from the perspective of one or more virtual cameras within the simulated three-dimensional virtual environment. The location of the one or more virtual cameras may be determined automatically or may be determined based on the one or more parameters.

According to various embodiments, such a video may be generated as described herein, for instance with respect to the method 700 shown in FIG. 7. The path language model interpreter may be a game engine, a 3D simulator, a physics engine, or any other type of engine capable of interpreting and rendering the path language model embedding.

In some embodiments, the state of the simulated three-dimensional virtual environment may be determined based on the one or more parameters determined at 3208. For instance, one or more entities within the simulated three-dimensional virtual environment may act in accordance with the one or more parameters.

The video is stored and/or transmitted at 3214. The video may be stored on any suitable storage device at the server. Alternatively, or additionally, the video may be transmitted to a client machine. The client machine to which the video is transmitted may be the client machine from which the request to generate the video originated. Alternatively, or additionally, the video may be transmitted to a different client machine, for instance a client machine accessing the video via a video sharing website.

A determination is made at 3216 as to whether to update the video. In some embodiments, the determination may be made based on user input. For example, the receipt of user input is discussed with respect to operation 108 shown in FIG. 1, as well as with respect FIG. 29, FIG. 30, and FIG. 31. A request to update the path language model embedding may be received from a user interface implemented at the client machine.

In some embodiments, one or more of the operations performed as discussed with respect to the method 3200 may be performed by an agent as shown in FIG. 29. For instance, a script may be determined by the script agent 2912, while one or more entities may be determined by the entity agent 2904.

Upon determining to update the video, additional user input for updating the path language model embedding and/or the one or more parameters is identified at 3204. According to various embodiments, any of the types of user input discussed herein may be received. For example, a user may provide or indicate user input such as text, touch, video, audio, or multi-modal input via a user interface at the client machine. As another example, paths traveled in the video if the video is implemented as an interactive 3D virtual environment may be provided as input.

According to various embodiments, the additional user input may be used to update the path language model embedding, the one or more parameters for determining the simulated three-dimensional virtual environment, or both. For example, the user input may lead to adding, changing, or removing one or more entities, verbs, or other elements to the path language model embedding. As another example, the user input may lead to a different configuration of elements within the three-dimensional virtual environment that is simulated based on the path language model embedding.

According to various embodiments, in the event that the path language model embedding is updated based on user input, the updated path language model may be determined based on the original user input, the additional user input, and the previous path language model embedding(s). The updated path language model embedding may be determined as discussed with respect to the method 600 shown in FIG. 6. In this way, the previously created path language model embedding, which is encoded as text, may be conversationally modified via the updated user input. Alternatively, the video may be conversationally modified without modifying the path language model embedding. For instance, different parameters may be specified, which may lead to a different video even though the path language embedding has not changed.

The techniques described herein may provide for physics-based video generation in a manner that offers significant improvements over conventional approaches. For example, conventional approaches to video generation using generative AI models proceed directly from input to video generation, without an intermediate phase in which an embedding is produced (e.g., operation 3204). Producing videos via such a conventional approach typically involves tens of millions of tokens and significant computing costs. Furthermore, videos produced via such a conventional approach are not modifiable based on additional user input, but rather must be entirely recreated based on new user input. That is, a user who wishes to modify a video produced via such a conventional approach would need to alter the original user input and recreate the video entirely.

In contrast to conventional approaches, techniques and mechanisms described herein provide for the generation of an intermediate path language model embedding in the course of generating the video. Because the intermediate path language model embedding is encoded as text, the path language model embedding may be conversationally modified based on updated user input. That is, a previously-created path language model embedding may serve as input for creating an updated path language model embedding, along with potentially the original user input and updated user input. The video may then be re-rendered based on the updated path language model embedding.

Further, in contrast to conventional approaches, techniques and mechanisms described herein provide for significantly lower computing costs. By separating the generation of the video into a path language model embedding generation phase and a video rendering phase, the generative model can be restricted to generating text and need not generate individual pixel values to include in the video. Because the number of words in a path language model embedding is far less than the number of pixels in a video created based on such an embedding, the computation cost for rendering the video via the path language model embedding is significantly lower (potentially by many orders of magnitude) than generating a video via other generative AI techniques.

8. Conclusion

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of short, interactive videos. However, the techniques of the present invention apply to a wide variety of video applications. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A computing system comprising:

a communication interface configured to receive from a first client machine a natural language description of a three-dimensional environment;

a path embedding generator configured to determine a path language representation of a three-dimensional virtual environment based on the natural language description and via a large language model interface, the path language representation being generated in accordance with a path language definition, the path language representation including one or more entities to include within the three-dimensional virtual environment, the path language representation including a script governing behavior of the one or more entities, the script including one or more events, an event of the one or more events corresponding to a verb object within the path language definition, an entity of the one or more entities corresponding to an entity object within the path language definition;

a video engine configured to determine a video of the three-dimensional virtual environment based on the path language representation of the three-dimensional virtual environment; and a storage system configured to store configuration information for the three-dimensional virtual environment and to provide the video for transmission to and presentation at a second client machine via the Internet upon request.

2. The computing system recited in claim 1, wherein the event includes a triggering condition for triggering the event and an action to perform upon the triggering condition being satisfied.

3. The computing system recited in claim 1, wherein the entity includes a three-dimensional model of the entity, wherein the entity includes an entity animation rig for animating the entity.

4. The computing system recited in claim 3, wherein the entity animation rig includes a plurality of joints and a plurality of regions connecting the joints, and wherein the verb object is associated with an animation definition defining an animation based on movement of the plurality of joints, and wherein rendering the video includes animation of the entity in accordance with the animation definition.

5. The computing system recited in claim 4, wherein the entity animation rig is specific to the entity.

6. The computing system recited in claim 4, wherein the entity animation rig is a default animation rig that is scaled to a size corresponding with the three-dimensional model of the entity.

7. The computing system recited in claim 1, wherein the natural language description includes one or more emoji, wherein an emoji of the one or more emoji corresponds with the entity, the verb object, or a modifier within the path language definition.

8. The computing system recited in claim 1, wherein the path embedding generator includes an agentic pipeline that includes a plurality of generative language model agents, each of the plurality of generative language model agents being configured to generate natural language output text based on natural language input text.

9. The computing system recited in claim 8, wherein an agent of the plurality of generative language model agents includes an agent prompt, and wherein the agent prompt includes a plurality of text portions corresponding to a plurality of named components within a normal form agentic AI data model, the normal form agentic AI data model including a plurality of references to and between the plurality of named components.

10. The computing system recited in claim 9, wherein the path embedding generator includes one or more generative language model meta agents, and wherein one or more of the plurality of generative language model agents are updated by executing the one or more generative language model meta agents.

11. The computing system recited in claim 10, wherein updating one or more of the plurality of generative language model agents involves updating one or more of the plurality of text portions.

12. The computing system recited in claim 1, wherein the verb object is associated with a three-dimensional rigid movement through space, and wherein rendering the video includes movement of the entity through the three-dimensional virtual environment in a manner corresponding with the three-dimensional rigid movement through space.

13. The computing system recited in claim 1, wherein the natural language description includes an entity description portion describing the entity, and wherein the path embedding generator is configured to search an entity database to identify the entity based on the entity description portion.

14. The computing system recited in claim 1, wherein the natural language description includes a verb description portion describing the verb object, and wherein the path embedding generator is configured to search a verb database to identify the verb object based on the verb description portion.

15. The computing system recited in claim 1, wherein the three-dimensional virtual environment includes a background setting providing a visual representation of a background region of the three-dimensional virtual environment.

16. A method comprising:

receiving from a first client machine a natural language description of a three-dimensional environment via a communication interface;

determining a path language representation of a three-dimensional virtual environment at a path embedding generator including a hardware processor, the path language representation being determined based on the natural language description and via a large language model interface, the path language representation being generated in accordance with a path language definition, the path language representation including one or more entities to include within the three-dimensional virtual environment, the path language representation including a script governing behavior of the one or more entities, the script including one or more events, an event of the one or more events corresponding to a verb object within the path language definition, an entity of the one or more entities corresponding to an entity object within the path language definition;

determining a video of the three-dimensional virtual environment via a video engine based on the path language representation of the three-dimensional virtual environment; and storing the video on a storage system; and providing the video for transmission to and presentation at a second client machine via the Internet upon request.

17. The method recited in claim 16, wherein the event includes a triggering condition for triggering the event and an action to perform upon the triggering condition being satisfied.

18. The method recited in claim 16, wherein the entity includes a three-dimensional model of the entity, wherein the entity includes an entity animation rig for animating the entity.

19. The method recited in claim 18, wherein the natural language description includes an entity description portion describing the entity, and wherein determining the path language representation comprises searching an entity database to identify the entity based on the entity description portion, wherein the entity animation rig includes a plurality of joints and a plurality of regions connecting the joints, and wherein the verb object is associated with an animation definition defining an animation based on movement of the plurality of joints, and wherein rendering the video includes animation of the entity in accordance with the animation definition.

20. One or more non-transitory computer readable media having instructions stored thereon for performing a method, the method comprising:

receiving from a first client machine a natural language description of a three-dimensional environment via a communication interface;

determining a path language representation of a three-dimensional virtual environment at a path embedding generator including a hardware processor, the path language representation being determined based on the natural language description and via a large language model interface, the path language representation being generated in accordance with a path language definition, the path language representation including one or more entities to include within the three-dimensional virtual environment, an entity of the entities including a three-dimensional model of the entity, the path language representation including a script governing behavior of the one or more entities, the script including one or more events, an event of the one or more events corresponding to a verb object within the path language definition, an entity of the one or more entities corresponding to an entity object within the path language definition;

determining a video of the three-dimensional virtual environment via a video engine based on the path language representation of the three-dimensional virtual environment; and storing the video on a storage system; and providing the video for transmission to and presentation at a second client machine via the Internet upon request.

* * * * *